US012225555B2

(12) United States Patent
Simon et al.

(10) Patent No.: US 12,225,555 B2
(45) Date of Patent: Feb. 11, 2025

(54) ATSC 3.0 MULTICAST-BROADCAST INTELLIGENT RAN TOPOLOGIES

(71) Applicant: Sinclair Broadcast Group, Inc., Hunt Valley, MD (US)

(72) Inventors: Michael J. Simon, Frederick, MD (US); Mark A. Aitken, Parkton, MD (US); Ebenezer K. Kofi, Hunt Valley, MD (US); Louis Herbert Libin, Woodmere, NY (US)

(73) Assignee: SINCLAIR BROADCAST GROUP, INC., Cockeysville, MD (US)

( * ) Notice: Subject to any disclaimer, the term of this patent is extended or adjusted under 35 U.S.C. 154(b) by 378 days.

(21) Appl. No.: 17/670,233

(22) Filed: Feb. 11, 2022

(65) Prior Publication Data
US 2022/0264525 A1 Aug. 18, 2022

Related U.S. Application Data

(60) Provisional application No. 63/149,025, filed on Feb. 12, 2021.

(51) Int. Cl.
*H04W 72/30* (2023.01)
*H04W 4/06* (2009.01)
*H04W 72/50* (2023.01)

(52) U.S. Cl.
CPC ............ *H04W 72/30* (2023.01); *H04W 4/06* (2013.01); *H04W 72/535* (2023.01)

(58) Field of Classification Search
CPC ...... H04W 72/30; H04W 72/535; H04W 4/06
See application file for complete search history.

(56) References Cited

U.S. PATENT DOCUMENTS

| 9,843,845 B2 | 12/2017 | Aitken et al. |
| 10,560,756 B2 | 2/2020 | Aiken et al. |
| 10,951,334 B2 | 3/2021 | Simon et al. |

(Continued)

OTHER PUBLICATIONS

3rd Generation Partnership Project; Technical Specification Group Radio Access Network; NG-RAN; Architecture description (Release 16), 3GPP TS 38.401 V16.4.0, Jan. 2021, 78 pages.

(Continued)

*Primary Examiner* — Ajay Cattungal
(74) *Attorney, Agent, or Firm* — Sterne, Kessler, Goldstein & Fox P.L.L.C.

(57) ABSTRACT

A method disclosed includes receiving data from a plurality of data sources in a broadcast core network for transmission over a radio access network (RAN). The method includes assigning radio spectrum resources for transmitting the data over the RAN according to a policy guidance set by a plurality of network operators for sharing the radio spectrum resources and generating a baseband packet corresponding to the data at a distributed unit (DU) in the RAN. The method includes collecting transmission data from a plurality of user equipments (UEs) in the RAN for training a machine learning algorithm and scheduling transmission of the generated baseband packet to a remote unit (RU) over a fronthaul in a radio topology of a plurality of radio topologies under control of the machine learning algorithm according to the policy guidance. The generated baseband packet is compatible for transmission in the plurality of radio technologies.

20 Claims, 33 Drawing Sheets

(56) References Cited

U.S. PATENT DOCUMENTS

| | | | |
|---|---|---|---|
| 2011/0214157 A1* | 9/2011 | Korsunsky | H04L 63/1458 |
| | | | 726/1 |
| 2012/0240185 A1* | 9/2012 | Kapoor | H04L 41/0866 |
| | | | 726/1 |
| 2014/0313908 A1* | 10/2014 | da Silva | H04W 4/70 |
| | | | 370/252 |
| 2016/0269873 A1 | 9/2016 | Choi et al. | |
| 2018/0295407 A1* | 10/2018 | Michael | H04H 60/82 |
| 2019/0082491 A1 | 3/2019 | Shelby et al. | |
| 2019/0124397 A1* | 4/2019 | Takahashi | H04N 21/633 |
| 2019/0141146 A1* | 5/2019 | Abdala | H04L 67/535 |
| 2019/0171187 A1* | 6/2019 | Cella | G06N 3/126 |
| 2019/0199460 A1 | 6/2019 | Simon et al. | |
| 2019/0268777 A1 | 8/2019 | Simon et al. | |
| 2019/0356520 A1* | 11/2019 | Silverman | H04W 8/22 |
| 2020/0077425 A1* | 3/2020 | Silverman | H04W 72/1273 |
| 2020/0178121 A1 | 6/2020 | Simon et al. | |
| 2020/0288325 A1 | 9/2020 | Simon et al. | |
| 2020/0344332 A1* | 10/2020 | Hwang | H04L 69/22 |
| 2021/0168429 A1* | 6/2021 | Okada | H04N 21/4382 |
| 2021/0250642 A1* | 8/2021 | Okada | H04L 1/0045 |
| 2022/0038945 A1* | 2/2022 | Dalmiya | H04W 28/0278 |
| 2022/0070042 A1 | 3/2022 | Simon et al. | |
| 2023/0337156 A1 | 10/2023 | Simon et al. | |

OTHER PUBLICATIONS

3rd Generation Partnership Project; Technical Specification Group Services and System Aspects; System architecture for the 5G System (5GS); Stage 2 (Release 16), 3GPP TS 23.501 V16.7.0, Dec. 2020, 450 pages.

Aijaz, A., "Packet Duplication in Dual Connectivity Enabled 5G Wireless Networks: Overview and Challenges," IEEE Communications Standards Magazine, arXiv:1804.01058v2 [cs.NI], May 29, 2019, 9 pages.

Albanese, A. et al., "Enabling 5G Neutral Hosts: 5GCity Architecture and Business Model," 5GCity White Paper, Apr. 15, 2020, 16 pages.

ATSC Standard: A/321, System Discovery and Signaling, Doc. A/321:2016, Mar. 23, 2016, 28 pages.

ATSC Standard: Link-Layer Protocol (A/330), Doc. A/330:2019, May 3, 2019, 60 pages.

ATSC Standard: Physical Layer Protocol, Doc. A/322:2021, Jan. 20, 2021, 263 pages.

ATSC Standard: Scheduler / Studio to Transmitter Link, Doc. A/324:2018, Jan. 5, 2018, 83 pages.

Authorizing Permissive Use of the "Next Generation" Broadcast Standard, Federal Register Notice vol. 85, No. 138, Jul. 17, 2020, pp. 43478-43492.

Common Public Radio Interface: eCPRI Interface Specification, eCPRI Specification V1.1, Jan. 10, 2018, 62 pages.

Federal Communication Commission, Report and Oder No. FCC 20-181, In the Matter of Promoting Broadcast Internet Innovation through ATSC 3.0, Dec. 10, 2020, 33 pages.

Federal Communication Commission, Report and Oder No. FCC 21-21, In the Matter of Rules Governing the Use of Distributed Transmission System Technologies, and Authorizing Permissive Use of the "Next Generation" Broadcast Standard, Jan. 19, 2021, 35 pages.

Garro Crevillén, E. et al., Layered Division Multiplexing With Multi-Radio-Frequency Channel Technologies. IEEE Transactions on Broadcasting. 62(2):365-374. doi:10.1109/TBC.2015.2492474, 2016, 10 pages.

Neutral Host Solutions for 5G Multi-Operator Deployments in Managed Spaces, Alliance for Telecommunications Industry Solutions, ATIS-I-0000073, Copyright 2019, 49 pages.

ONAP Home Page, printed Oct. 30, 2023 from https://www.onap.org, 2 pages.

O-RAN Home Page, printed Oct. 30, 2023 from https://www.o-ran.org, 6 pages.

O-RAN Software Community (SC), printed Oct. 30, 2023 from https://o-ran-sc.org, 4 pages.

The 5G Functional Split Overview Poster, printed Oct. 30, 2023 from https://solutions.cubeoptics.com/5g-functional-split, 2 pages.

International Search Report and Written Opinion, for PCT Appl. No. PCT/US2023/061969, 13 pages, mailed Jul. 4, 2023.

* cited by examiner

Intelligent Multi-Carrier Multicast-
Broadcast-MFN-SFN Shared Topologies
O-RAN Aligned (PLP) Plain Channel Bonding Receiver Side (UE)

ATSC 3.0 MULTICAST-BROADCAST INTELLIGENT RAN TOPOLOGIES

CROSS-REFERENCE TO RELATED APPLICATIONS

This application claims priority to U.S. Provisional Patent Application No. 63/149,025, filed Feb. 12, 2021, which is herein incorporated by reference in its entirety for all purposes.

This application is also related to U.S. Pat. No. 9,843,845, issued Dec. 12, 2017; U.S. Pat. No. 10,560,756, issued Feb. 11, 2020; U.S. Patent Application Publication No. 2019/0199460, published Jun. 27, 2020; U.S. Patent Application Publication No. 2020/0288325, published Sep. 10, 2020; U.S. Patent Application Publication No. 2019/0268777, published Aug. 29, 2019; and U.S. Provisional Patent Application No. 63/072,477, filed Aug. 31, 2020, all of which are herein incorporated by reference in their entirety for all purposes.

BRIEF SUMMARY

In one aspect, a method is disclosed. The method includes receiving data from a plurality of data sources in a broadcast core network for transmission over a radio access network (RAN). The method includes assigning radio spectrum resources for transmitting the data over the RAN according to a policy guidance set by a plurality of network operators for sharing the radio spectrum resources and generating a baseband packet corresponding to the data at a distributed unit (DU) in the RAN. The method includes collecting transmission data from a plurality of user equipments (UEs) in the RAN for training a machine learning algorithm, and scheduling transmission of the generated baseband packet to a remote unit (RU) over a fronthaul in a radio topology of a plurality of radio topologies stored in a database under control of the machine learning algorithm according to the policy guidance, thereby optimizing sharing of the radio spectrum resources of the plurality of radio topologies among the plurality of network operators. The generated baseband packet is compatible for transmission in the plurality of radio technologies.

In another aspect, a system is disclosed. The system includes a plurality of distributed computing devices. Each computing device of the plurality of distributed computing devices is coupled with a memory to store operations and a plurality of transmitters in a radio access network (RAN). The system is configured to perform the operations including receiving, at a first computing device of the plurality of distributed computing devices, data from a plurality of data sources in a broadcast core network for transmission over the RAN, and assigning radio spectrum resources for transmitting the data over the RAN according to a policy guidance set by a plurality of network operators for sharing the radio spectrum resources. The operations further include generating, at a second computing device of the plurality of distributed computing devices, a baseband packet corresponding to the data, and collecting, at a third computing device of the plurality of distributed computing devices, transmission data from a plurality of user equipments (UEs) in the RAN for training a machine learning algorithm. The operations further include scheduling, at a fourth computing device of the plurality of distributed computing devices, transmission of the generated baseband packet to a fifth computing device over a fronthaul in a radio topology of a plurality of radio topologies stored in a database under control of the machine learning algorithm according to the policy guidance, thereby optimizing sharing of the radio spectrum resources of the plurality of radio topologies among the plurality of network operators. The generated baseband packet is compatible for transmission in the plurality of radio technologies.

In another aspect, a method is disclosed. The method includes distributing a plurality of baseband packets (BBPs) according to a predetermined order between a plurality of radio frequency (RF) carriers. The method includes selecting an RF carrier of the plurality of RF carriers based on a signal-to-noise ratio (SNR) average for the RF carrier, and transmitting the a BBP of the plurality of BBPs over the selected RF carrier. The transmitted BBP is a time aligned with another RF carrier of the plurality of RF carriers.

In another aspect, a method is disclosed. The method includes receiving a plurality of baseband packets (BBPs) over a plurality of RF carriers. The method includes selecting a first BBP of the plurality of BBPs received over a first RF carrier of the plurality of RF carriers based on a first value of signal-to-noise ratio (SNR) of the first RF carrier, wherein the first value of SNR for the first RF carrier is better than a first value of SNR of a second RF carrier of the plurality of carriers. The method includes selecting a second BBP of the plurality of BBPs received over the second RF carrier based on a second value of SNR of the second RF carrier, wherein the second value of SNR for the second RF carrier is better than a second value of SNR of the first RF carrier. The method includes generating a data stream based on the selected first BBP and second BBP.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. Elements shown as a single component can be replaced with multiple components, and elements shown as multiple components can be replaced with a single component. The drawings are not to scale, and the proportion of certain elements can be exaggerated for illustration.

DETAILED DESCRIPTION

Figure 1A:
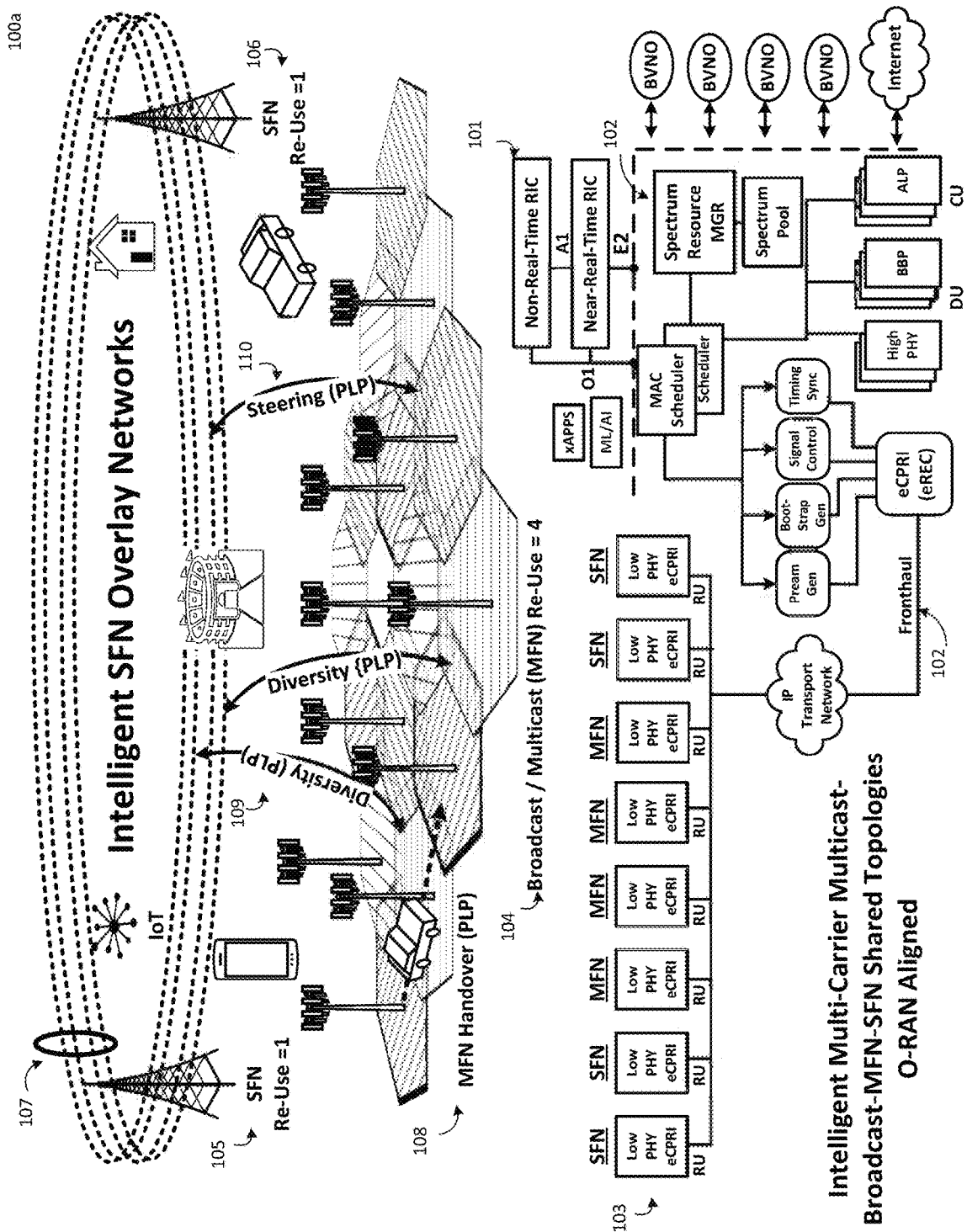
FIG. 1A illustrates exemplary Advanced Television Systems Committee (ATSC) 3.0 neutral host network topologies, in accordance with some aspects.

This disclosure is directed to enable radio frequency (RF) transmission and the harmonization of Multi-Frequency Networks (MFN) and Single Frequency Networks (SFN) topologies according to Advanced Television Systems Committee (ATSC) 3.0 standard. This is to support the delivery of content and/or data transported in ATSC 3.0 Physical Layer Pipes (PLPs) or virtual network Slices. These PLPs or Slices can be independently bonded, steered and/or diverted, and handover can be established between multiple RF carriers of these topologies using the intelligence of Open Radio Access Network (O-RAN) cloud native orchestration that is disclosed for broadcast networks of the future.

A broadcast architecture, as described in the present disclosure, is aligned with a concept of the O-RAN, as described in more detail at O-RAN ALLIANCE (o-ran.org). The O-RAN architecture disclosed herein uses cloud native computing to make future wireless networks open and smarter than any previous or currently deployed networks. The O-RAN concept is being planned for $3^{rd}$ Generation Partnership Project (3GPP) $5^{th}$ Generation (5G) networks.

As described herein, the O-RAN architecture includes an ability to utilize machine learning systems and artificial intelligence back-end modules to empower network intelligence through open and standardized interfaces in a multi-vendor network.

The need for such a flexible shared broadcast intelligent RAN topology is driven by broadcasters' requirements in the United States to share their license broadcast spectrum and use a shared infrastructure to innovate with ATSC 3.0 according to Federal Communications Commission (FCC) rules.

The FCC is also promoting innovation using ATSC 3.0 as in a recent rulemaking they term the "Broadcast Internet," in FCC Media Bureau Docket No. 20-145. This permits licensed broadcasters to work with others, including third parties, to innovate services using their shared broadcast spectrum to provide innovative ancillary and supplementary services known as FCC Broadcast Internet that can complement the nation's 5G wireless networks.

Moreover, an innovative ATSC 3.0 Broadcast Core aligned with 3GPP 5G Core has been studied by ATSC Planning Team 8 and disclosed in U.S. Patent Application Publication No. 2020/0178121 published Jun. 4, 2020, which is herein incorporated by reference and describes a return channel from a user equipment (UE), e.g., 3GPP 4G/5G, Wi-Fi, etc., with dual broadcast connectivity, for example. Accordingly, it can result in increased intelligence of broadcast O-RAN architecture described in the present disclosure.

The present disclosure thus describes a perspective for broadcasters sharing spectrum and infrastructure under automation. The automation of the shared infrastructure for multiple tenants licensed broadcasters also requires charging records for all shared orthogonal frequency division multiplexing (OFDM) broadcast spectrum resources consumed, and this functionality is part of a "Neutral Host" platform.

Though the neutral host platform concept is familiar to the wireless industry, it is an opportunity to the broadcast industry. It enables efficient ways to operate ATSC 3.0 sharing spectrum and infrastructure and can be aligned with 5G and broadcast internet. The initial concept of a broadcast neutral host network and the Broadcast Market Exchange (BMX) for broadcast spectrum sharing was disclosed in U.S. Pat. No. 9,843,845 issued Dec. 12, 2017, and is being expanded and extended with the broadcast O-RAN architecture disclosed herein.

The innovation expected in the future is a 5G Intelligent programmable O-RAN with open API is to enable an app market analogous to Google Play possible for faster innovation using a machine language/artificial intelligence (ML/AI)-based radio access network (RAN), which is open intelligent and uses $3^{rd}$ party software running in RAN, for example, cloud-native software is termed xAPPs by O-RAN Alliance, which defines the network functionality or behavior described in detail in this disclosure.

In some aspects, a broadcast physical layer technology is disclosed that enables multicast-broadcast services contained in PLPs or Slices orchestrated between RF carriers MFN or SFN is an intelligent ML/AI-based RAN. The software running on broadcast RAN that defines network functionality is termed xAPPs and is discussed in connection with use cases and business models.

In the United States, where geography is vast and diverse, multiple harmonized RAN topologies and RF carrier frequencies combination options are needed for the economic deployment of a national neutral host network.

The technology disclosed herein is broadcast network tools that can be applied in various harmonized RAN topologies sizes such as, but not limited to, Hyper-Local, MAN, WAN, etc. A specific network design should not to assumed by the limited examples given herein to introduce the technology, and those skilled in the art appreciate the utility and degrees of freedom and opportunity to converge 5G this can present in the future.

In accordance with some aspects, FIG. 1A illustrates exemplary ATSC 3.0 neutral host network topologies 100a. As shown in FIG. 1A, system 100a includes multi-frequency network (MFN) and corresponding coverage area 111-116. Further, as shown in FIG. 1A, an MFN may include a plurality of single-frequency networks (SFNs). For example, MFN 116 may include SFNs 117-119, as shown in FIG. 1A. Further, one or more SFNs, such as SFNs 120, 121, and/or 122, may also exist. By way of a non-limiting example, the SFN may be shared by a plurality of network and/or TV broadcasters.

Figure 1B:
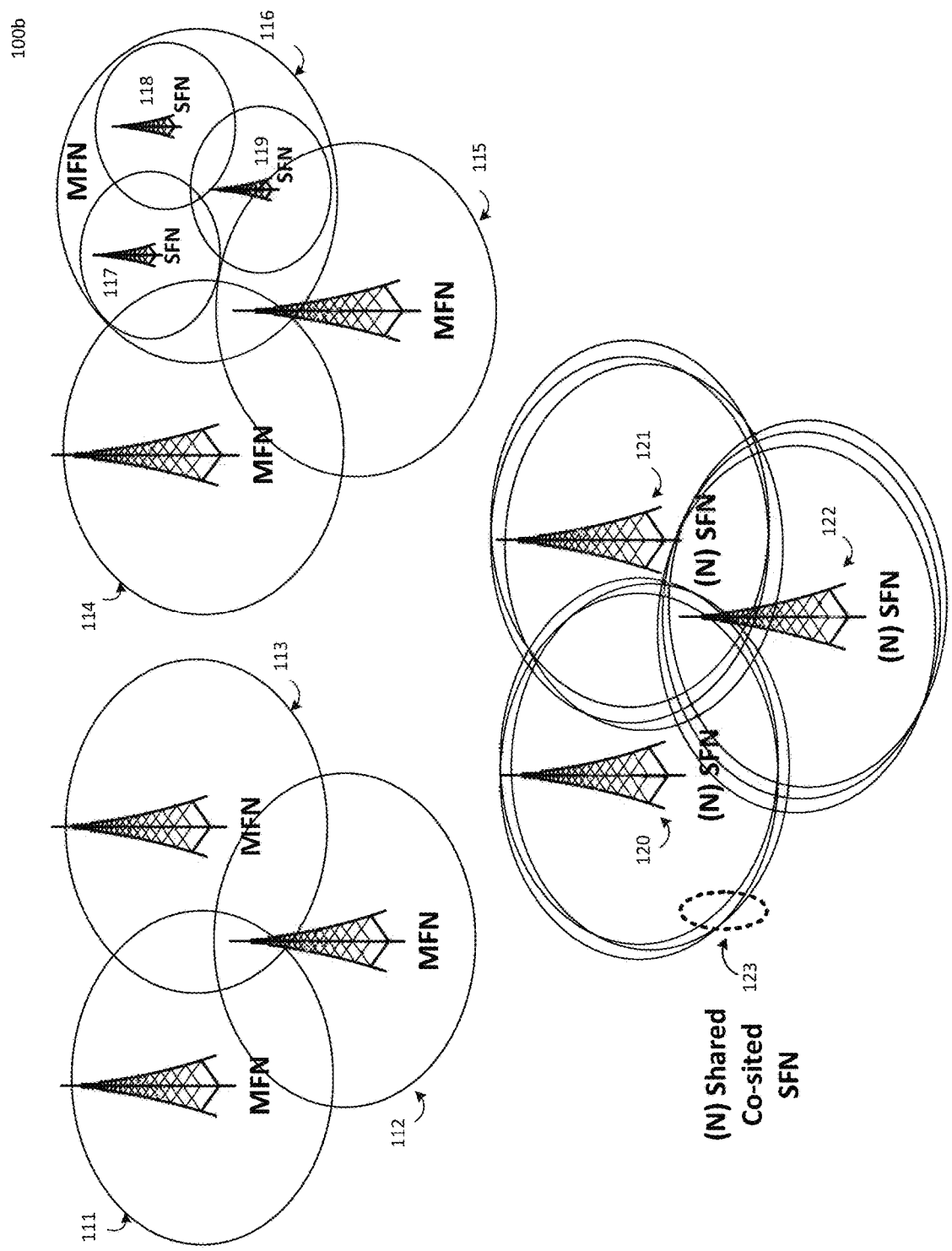
FIG. 1B illustrates an exemplary shared ATSC 3.0 Intelligent RAN topology using multiple broadcast radio frequency (RF) carriers and offering multicast broadcast services using harmonized Multi Frequency Network (MFN) and Single Frequency Network (SFN) topologies under intelligent orchestration aligned with Open Radio Access Network (O-RAN) concepts, in accordance with some aspects.

In accordance with some aspects, FIG. 1B illustrates an exemplary shared ATSC 3.0 Intelligent RAN topology 100b using multiple broadcast RF carriers and offering multicast broadcast services using harmonized MFN and SFN topologies under intelligent orchestration aligned with O-RAN concepts.

As shown in FIG. 1A, layer 2 ATSC 3.0 medium access control (MAC) schedulers 101 are located in a cloud that assigns all the real-time OFDM resources of ATSC 3.0 disaggregated physical layers aligned O-RAN architecture, according to some aspects, which is discussed in more detail below with reference to FIG. 4 and FIG. 5. In FIG. 1A, O-RAN aligned fronthaul 102 carry traffic between cloud over IP transport network between various cell sites and or towers in the MFN and SFN topologies, according to some aspects.

Multi-channel broadcast multicast MFN 104 with a frequency re-use pattern of 4 is shown in FIG. 1A, which uses four shared independent frequency channels in a re-use pattern of 4 for benefits to be described below, according to some aspects. Such a multicast broadcast MFN 104 topology with shared channels discussed herein is used with the broadcast. The previous FCC regulations and broadcast technology did not permit or contemplate such a multicast broadcast MFN topology.

In accordance with some aspects, larger SFN broadcast towers 105 and 106 may re-use a frequency that forms an intelligent SFN geographic overlay network 107 of the MFN all under common cloud orchestration along with an intelligent MFN handover PLP functionality of seamless roaming of receivers in multi-channel MFN topology 108 as shown in FIG. 1A.

Also shown in FIG. 1A is harmonized intelligent steering of PLP from MFN to SFN as 109 and harmonized intelligent steering of PLP from SFN to MFN as 110, according to some aspects, which is discussed using cloud orchestration.

Because of the diverse geography of the United States, multiple tools and topologies may be required for the economic deployment of a national network under a neutral host. The frequency re-use of 4 may therefore allow each cell to offer localized independent services, and these services with intelligence, as discussed in the present disclosure, can enable roaming and handover PLP services as mobile user equipment (UE) moves in an environment. However, the aspects of this disclosure are not limited to this example, and other frequency re-uses can also be used. When intelligence indicates the number of users consuming common content is large, the PLP can be steered to SFN overlay network 107 and also steered back to MFN 104, according to some aspects.

Figure 2:
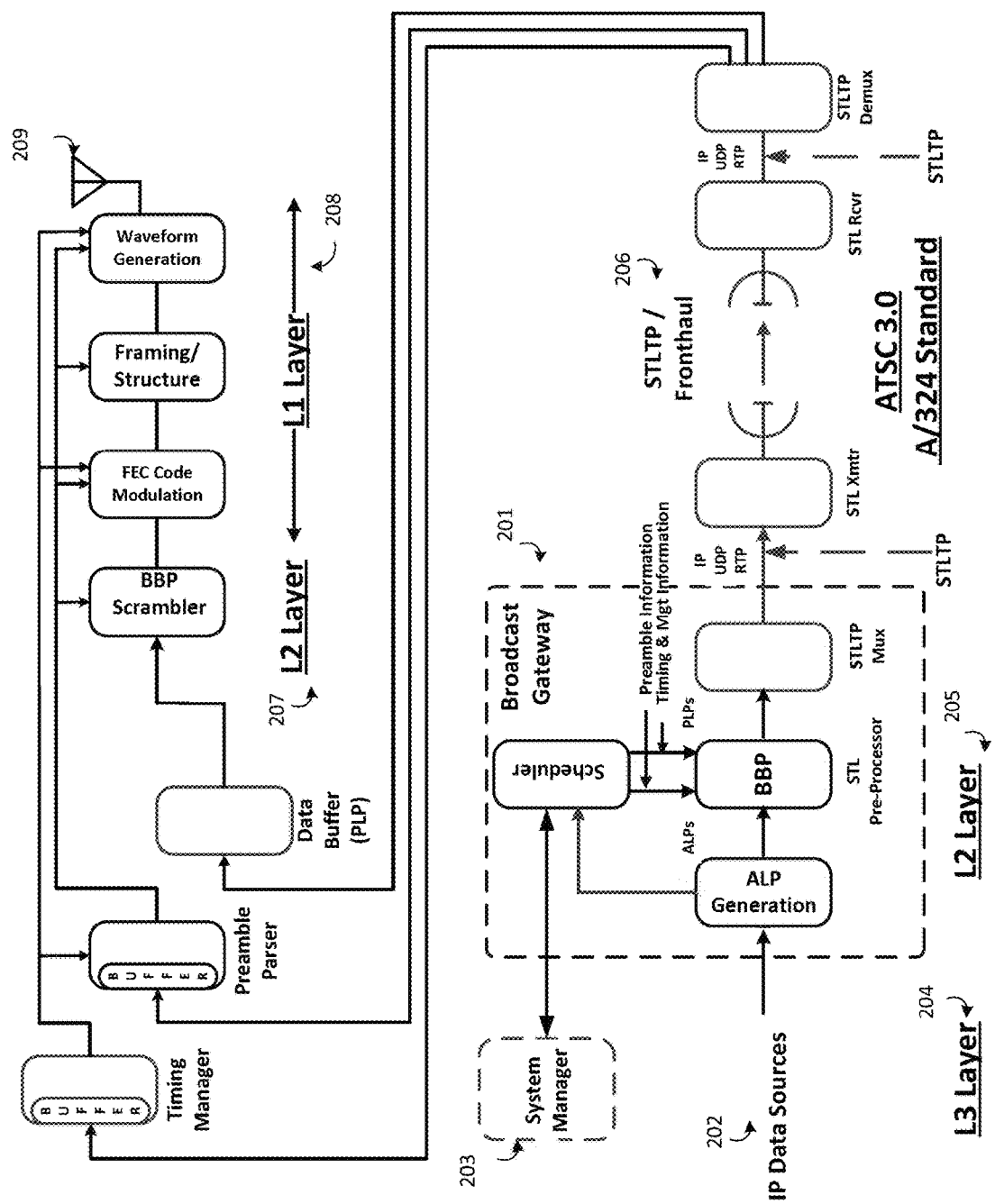
FIG. 2 illustrates ATSC 3.0 physical layer implementation currently using ATSC 3.0 A/324 with no alignment O-RAN or spectrum sharing by licensed broadcast operators, in accordance with some aspects.

FIG. 2 illustrates an exemplary ATSC 3.0 physical layer implementation currently using ATSC 3.0 A/324 with no alignment O-RAN or spectrum sharing by licensed broadcast operators, according to some aspects. Layer 3 204 and IP data sources 202 into layer 2 205 are contained in an ATSC 3.0 Broadcast Gateway 201. The ATSC Broadcast Gateway 201 may include a real-time scheduler that assigns all OFDM resources in an ATSC 3.0 frame to be described. A system manager 203, which is a conceptual entity that coordinates and controls all broadcaster facilities necessary to produce a specific desired station output configuration and emission, according to some aspects.

The output of the ATSC Broadcast Gateway 201 is sent via Studio to Transmitter Link Tunneling Protocol (STLTP) fronthaul 206 to a transmitter site. It should be noted that the L2 layer 207 may be split in the ATSC Broadcast Gateway 201 and the remaining portion of L2 layer 207 and the L1 layer physical layer blocks 208 shown are processed at the transmitter site, which may produce an ATSC 3.0 frame that is emitted by an antenna 209 using A/324 standard as the fronthaul, which also controls the timing of the SFN.

In accordance with some aspects, another fronthaul such as Enhanced Common Public Radio Interface (eCPRI) aligned with O-RAN can be optimized for broadcast and used for producing identical ATSC 3.0 waveforms and SFN, etc., as described herein.

Figure 3:
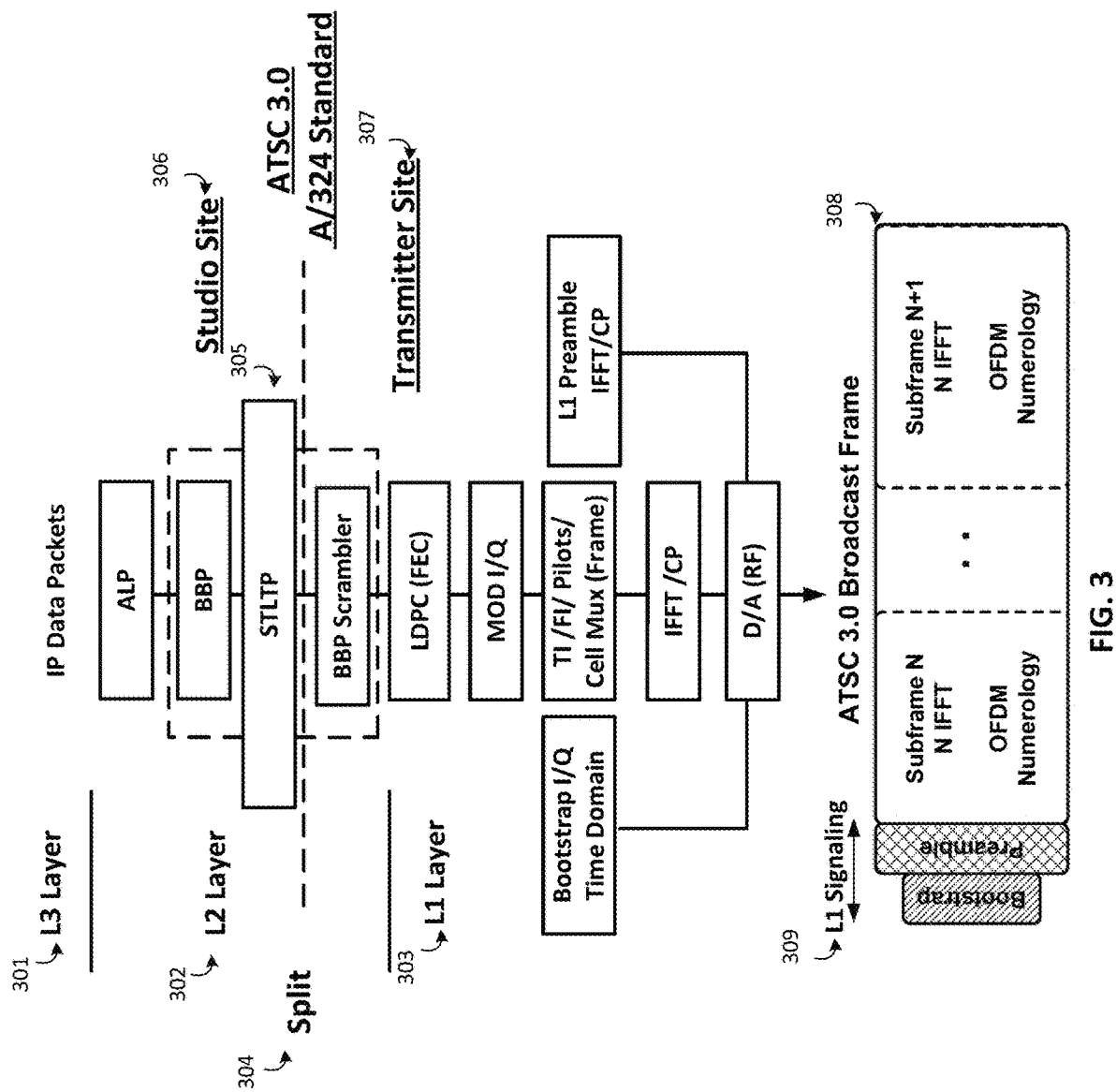
FIG. 3 illustrates ATSC 3.0 physical layer stack L2 and L1 layers, in accordance with some aspects.

FIG. 3 illustrates ATSC 3.0 physical layer stack L2 and L1 layers from FIG. 2, according to some aspects. FIG. 3 illustrates an ATSC 3.0 physical layer stack L2 and L1 layers from the ATSC 3.0 physical layer implementation 200 using A/324 standard, according to some aspects.

As shown in FIG. 3, a layer 3 301 carrying IP data packets that feed an L2 layer 302 may be composed of an ATSC Link Layer Protocol (ALP) Link Layer and a Base Band Packets (BBP) MAC layer, which encapsulates ALP packets, according to some aspects. The ALP packets may be processed in the ATSC Broadcast Gateway 201 at studio side 306. The other portion of L2 layer 302 is split, as shown by 304, from a BBP scrambler by ATSC A/324 standard and processed at transmitter site 307, which is at the other side of the STLTP fronthaul 305, according to some aspects.

In accordance with some aspects, as shown in FIG. 3, the remaining L1 layer 303 blocks may produce an ATSC 3.0 frame 209 for transmission. The ATSC 3.0 frame 309 may be composed of three discrete sections, including the L1 signaling 309 that includes Bootstrap OFDM symbols and Preamble OFDM symbols. A payload area frame 308 includes one or more sub-frames with individual OFDM numerology assigned specifically to a service type such a fixed service, mobile service, etc. The content or data of these services are located in PLPs or network Slices that are mapped to sub-frames as described herein. As described in the present disclosure, ATSC 3.0 broadcasting is a series of ATSC frames in the time domain made of these three sections.

However, the ATSC 3.0 physical layer implementation shown in FIG. 2 and FIG. 3 is hardware-centric and isn't easily extensible. Further, support for spectrum or channel sharing among broadcasters for ATSC 3.0 is not anticipated in the ATSC 3.0 physical later implementation shown in FIG. 2 and FIG. 3.

Figure 4:
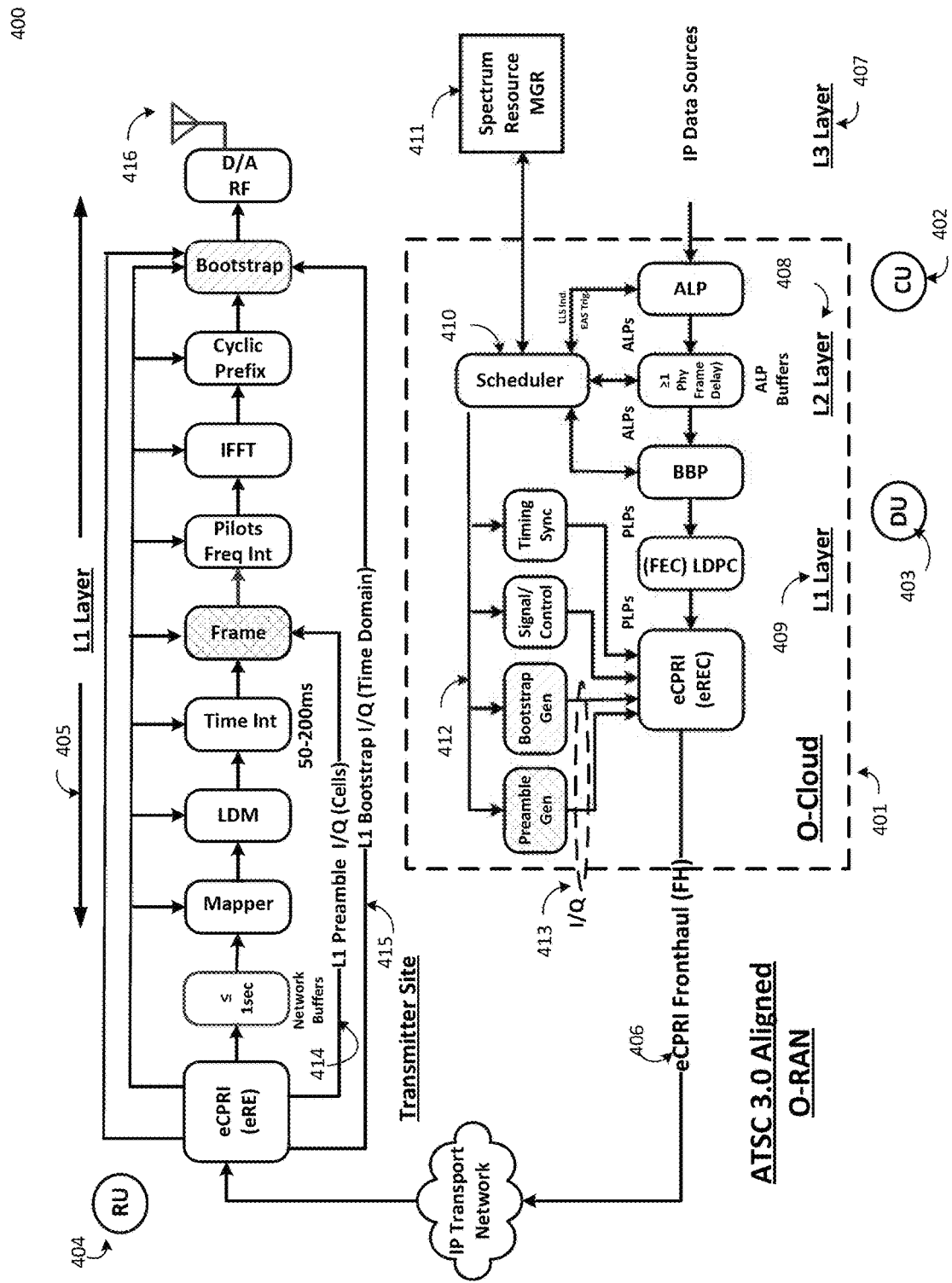
FIG. 4 illustrates ATSC 3.0 physical layer implementation aligned O-RAN with cloud-native spectrum sharing by licensed broadcast operators, in accordance with some aspects.

FIG. 4 illustrates ATSC 3.0 physical layer implementation aligned O-RAN with cloud-native spectrum sharing by licensed broadcast operators, in accordance with some aspects. As shown in FIG. 4, an ATSC 3.0 physical layer implementation 400 is aligned with O-RAN, and spectrum sharing is enabled by Spectrum Resource Manager (SRM) 411 that controls real-time scheduler 410 to enable dynamic spectrum sharing as described herein.

In accordance with some aspects, the ATSC 3.0 physical layer implementation 400 may produce identical ATSC 3.0 frames receivable at the current ATSC 3.0 physical layer implementation 200 is flexible and extensible for the evolution of programmable RAN as described herein.

As shown in FIG. 4, the broadcast RAN 400 is disaggregated into a Centralized Unit (CU) 402, a Distributed Unit (DU) 403, and a Radio Unit (RU) 404 aligned with concepts of O-RAN but optimized for broadcast as described herein, according to some aspects.

In some aspects, by way of a non-limiting example, an L2 layer 408 and a portion of L1 layer 409 may be processed in cloud 401 using Software Defined Networking (SDN)/Network Function Virtualization (NFV) orchestration and automation aligned with the O-RAN. The fronthaul 406 may use eCPRI to replace A/324 to transport the output of cloud 401 over the IP transport network to a transmitter site and the RU 404, which contains an L1 layer processing 405 to produce an ATSC 3.0 frame that is emitted by the broadcast antenna 416.

The IP data packets at layer 3 407 are input to L2 layer 408. According to some aspects, a real-time scheduler 410 under control of a spectrum resource manager 411 allocates all OFDM resources to build each ATSC 3.0 frame, which consists of 3 sections, L1 Signaling 309 including Bootstrap and Preamble, and sub-frames 308 with content or data services in PLPs or network slices mapped to sub-frames as previously discussed with respect to FIG. 3.

In accordance with some aspects, the RU 404 may process both Preamble and Bootstrap in the cloud, as shown by 412, and send as I/Q 413 over eCPRI fronthaul 406, which is then inserted in the RU 404, as shown by L1 preamble In-phase/Quadrature-phase (I/Q) (cells) as 414 and L1 Bootstrap I/Q (Time Domain) as 415 in an ATSC 3.0 frame under control signaling and timing 412 to construct a frame.

In accordance with some aspects, the cloud 401 portions an L1 layer 409 including PLPs from BBP block under control scheduler with Forward Error Correction (FEC) added. The FEC, by way of a non-limiting example, may be Low Density Parity Check (LDPC) in case of ATSC 3.0. The FEC encoded PLP is sent over the eCPRI fronthaul 406 as bitstreams keeping the eCPRI fronthaul 406 data rate low. The FEC PLP is then mapped into constellations by mapper in the RU 404.

Accordingly, the RAN split, as shown in FIG. 4, gives flexibility and extensibility to evolve the ATSC 3.0 RAN for waveforms and use cases and services with software DU 403 in cloud 401.

The L1 signaling Bootstrap and Preamble sections, which precedes every frame, are treated in a general way by the RU 404 as I/Q, according to some aspects. The RU 404 does not require detailed knowledge in some aspects. The PLPs are mapped into payload section sub-frames generic OFDM frame structure under control signaling and timing 412.

In some aspects, the RU 404 can be built in hardware (HW), for example, using a field-programmable gate array (FPGA) and/or a digital signal processor (DSP), and can be designed to insert I/Q symbols for L1 signaling Bootstrap symbols and Preamble symbols in an agnostic way and payload PLPs in sub-frames of generic OFDM frame using the control signaling and timing 412.

This enables the evolution of waveform baseband processing by DU 403 in cloud 401 without having to replace HW at each transmitter site at the RU 404 to build three sections of an OFDM broadcast frame, according to some aspects. Accordingly, different waveforms on a frame by frame basis can be enabled, for example, for an efficient OFDM waveform for IoT services signaled by L1 signaling. This enables Bootstrap signals to be built in the cloud for sending to a transmitter site, including a transmitter site in an SFN, according to some aspects. Further, this aligns with the flexibility of Software Define Radio (SDR) functionality in the UE.

Figure 5:
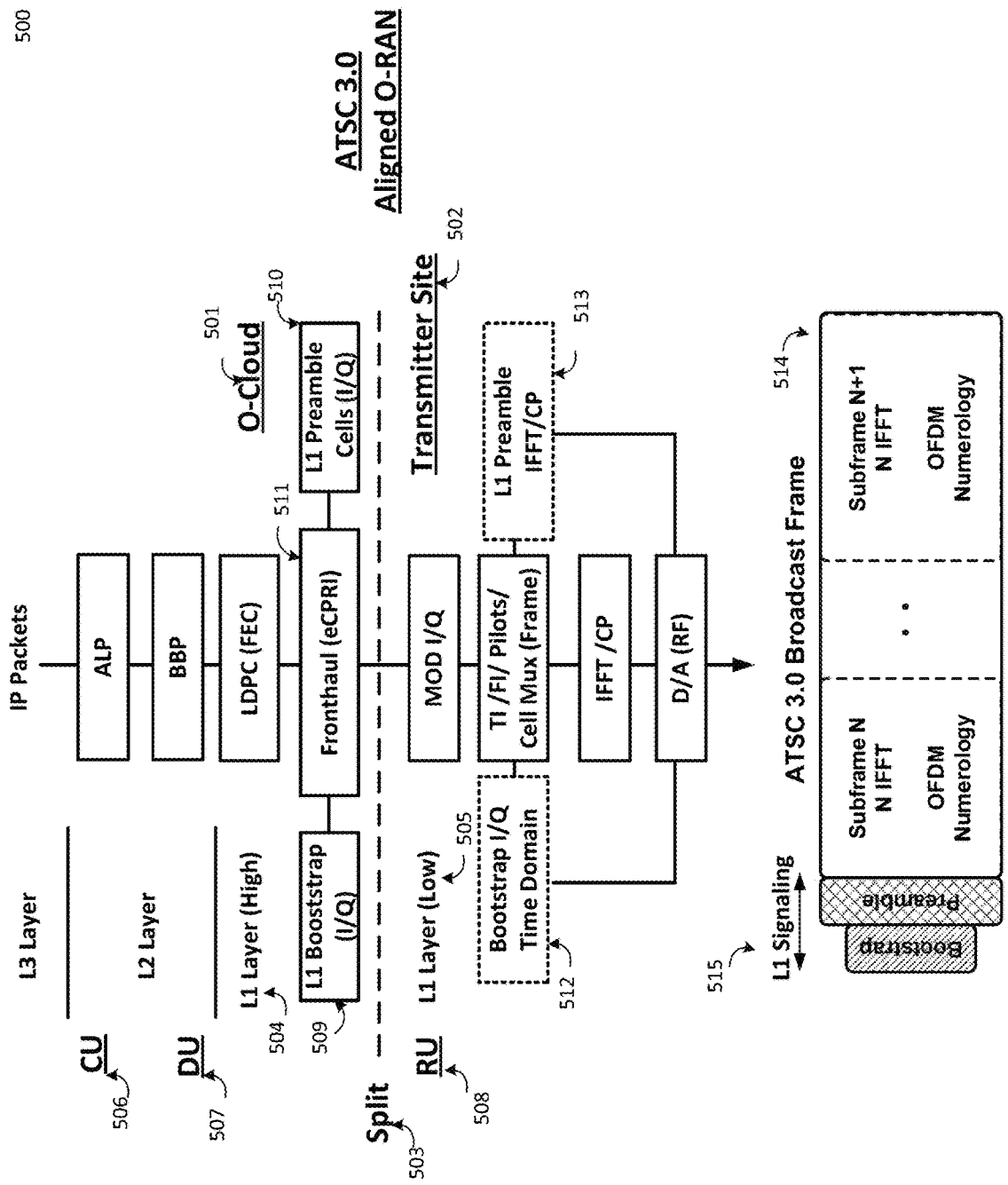
FIG. 5 illustrates ATSC 3.0 physical layer stack L2 and L1 layers aligned O-RAN, in accordance with some aspects.

FIG. 5 illustrates exemplary ATSC 3.0 physical layer stack L2 and L1 layers aligned O-RAN, in accordance with some aspects. As shown in FIG. 5, ATSC 3.0 physical layer stack L2 and L1 layers are aligned with O-RAN shown in FIG. 4 as 400. The RAN disaggregation is shown with CU Layer 2 506 and DU Layer 1 507 implemented in Open Cloud (O-Cloud) 501 above the L1 layer Split shown as 503.

In accordance with some aspects, the eCPRI fronthaul 511 transports the L1 Layer (High) 504, which contains DU 507, and processed LDPC (a FEC) carried as bitstream codewords over eCPRI fronthaul 511 to keep the data rate low. It should be appreciated the flexibility of changing LDPC (a FEC) on a PLP or Slice basis, which is agnostic to RU 508 and remaining L1 layer (low) 505 at a transmitter site 502. This flexibility can be used by intelligent RAN for PLP or network Slicing use cases.

In accordance with some aspects, the eCPRI fronthaul 511 also transports Bootstrap 509 and Preamble as I/Q 510 on eCPRI fronthaul 511 to RU 508, which is agnostic and inserts Bootstrap I/Q in time domain 512, and L1 preamble Fast Fourier Transform (FFT)/Cyclic Prefix (CP) 513 using control signaling and timing 412. This flexibility can also enable the replacement of L1 Preamble 510 using LDPC to Polar Codes (a FEC) as used in 5G for broadcast mobile services PLP Slices in the future.

Figure 21:
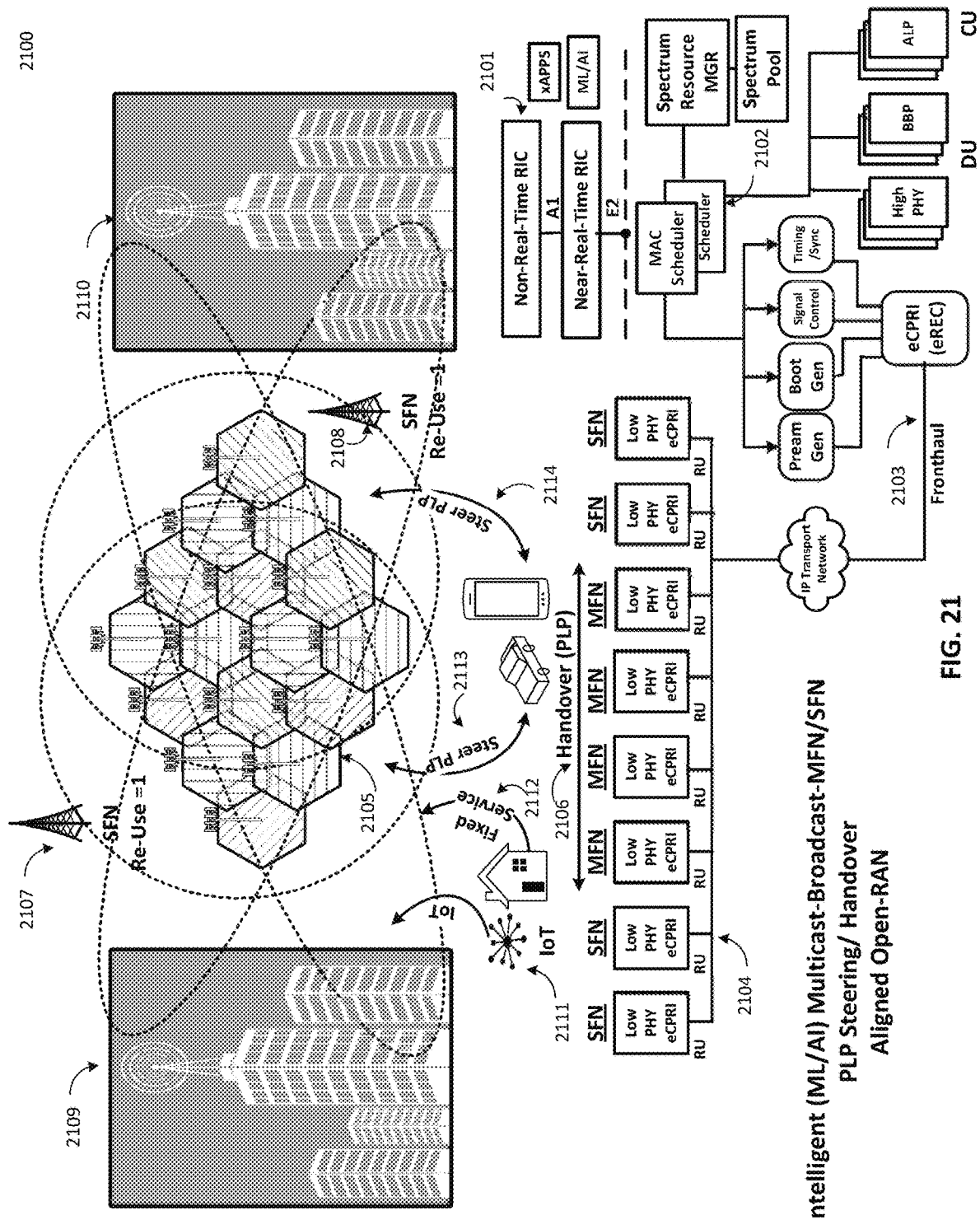
FIG. 21 illustrates another example of intelligent broadcast RAN with both MFN and several SFN geographic overlay network topologies and showing functions of handover and steering PLPs or network Slices align O-RAN architecture, in accordance with some aspects.

By way of a non-limiting example, the Bootstrap 509 built in cloud enables OFDM waveforms via L1 signaling and also functionalities such as, but not limited to, Positioning Navigation Time (PNT), as described in Provisional Patent Application No. 63/072,477 filed Aug. 31, 2020, and Bootstrap and Intelligent Single Frequency Network (SFN) overlay networks as shown in FIG. 21 to be discussed later.

In accordance with some aspects, the OFDM broadcast frame is composed of three sections: L1 signaling Bootstrap, Preamble 515, and payload 514 with PLPs or network Slices in sub-frames with OFDM numerology designed for the use case. The flexibility of the broadcast RAN 400 and the ASTC 3.0 physical layer stack L1 and L1 500 aligned in a RAN aligned with O-RAN and 3GPP 5G, including spectrum sharing in a neutral host network platform, is described below.

As described herein, various aspects enable a change for the legacy broadcasters operating as isolated islands to sharing the spectrum and infrastructure of Neutral Host Platform ATSC 3.0, which can spin many business models.

Figure 6:
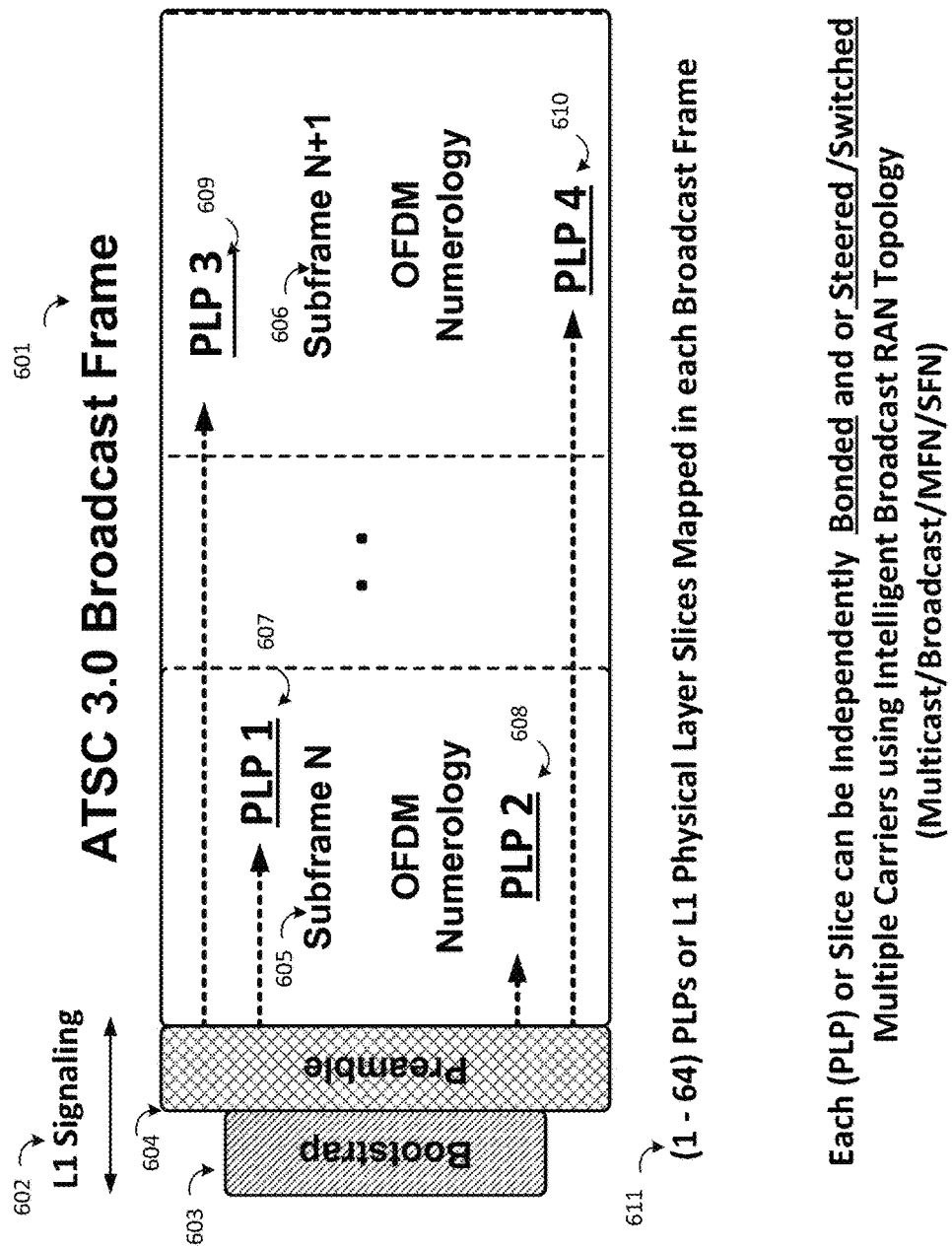
FIG. 6 illustrates exemplary ATSC 3.0 Frame consisting of L1 signaling and sub-frames with Physical Layer Pipes (PLPs) or network Slices (Content/Data) aligned O-RAN and bonded or steered by intelligence between multiple RF carriers in MFN and or SFN topology, in accordance with some aspects.

FIG. 6 illustrates exemplary ATSC based frame including L1 signaling and sub-frames with PLPs or Network Slices (Content/Data) aligned O-RAN and bonded or steered by intelligence between multiple RF carriers in MFN and or SFN topology, in accordance with some aspects. An ATSC based Broadcast Frame 601 emitted via the broadcast antenna 416 includes L1 signaling 602 that includes Bootstrap 603 and Preamble 604 built in cloud with flexibility as discussed using FIG. 4 and FIG. 5.

In accordance with some aspects, the remaining portion of broadcast frame 601 includes one or more sub-frames of a plurality of sub-frames, for example, shown as 605 and 606, with an independent OFDM numerology. By way of a non-limiting example, four PLPs are shown as 607, 608, 609, 610 with independent content data for broadcast services.

In accordance with some aspects, by way of a non-limiting example, there can be 1 to 64 independent services PLPs or network Slices in each broadcast frame as shown in FIG. 6 as 611 that can be individually received by UE for use cases described with respect to 2125 shown in FIG. 21.

Figure 7:
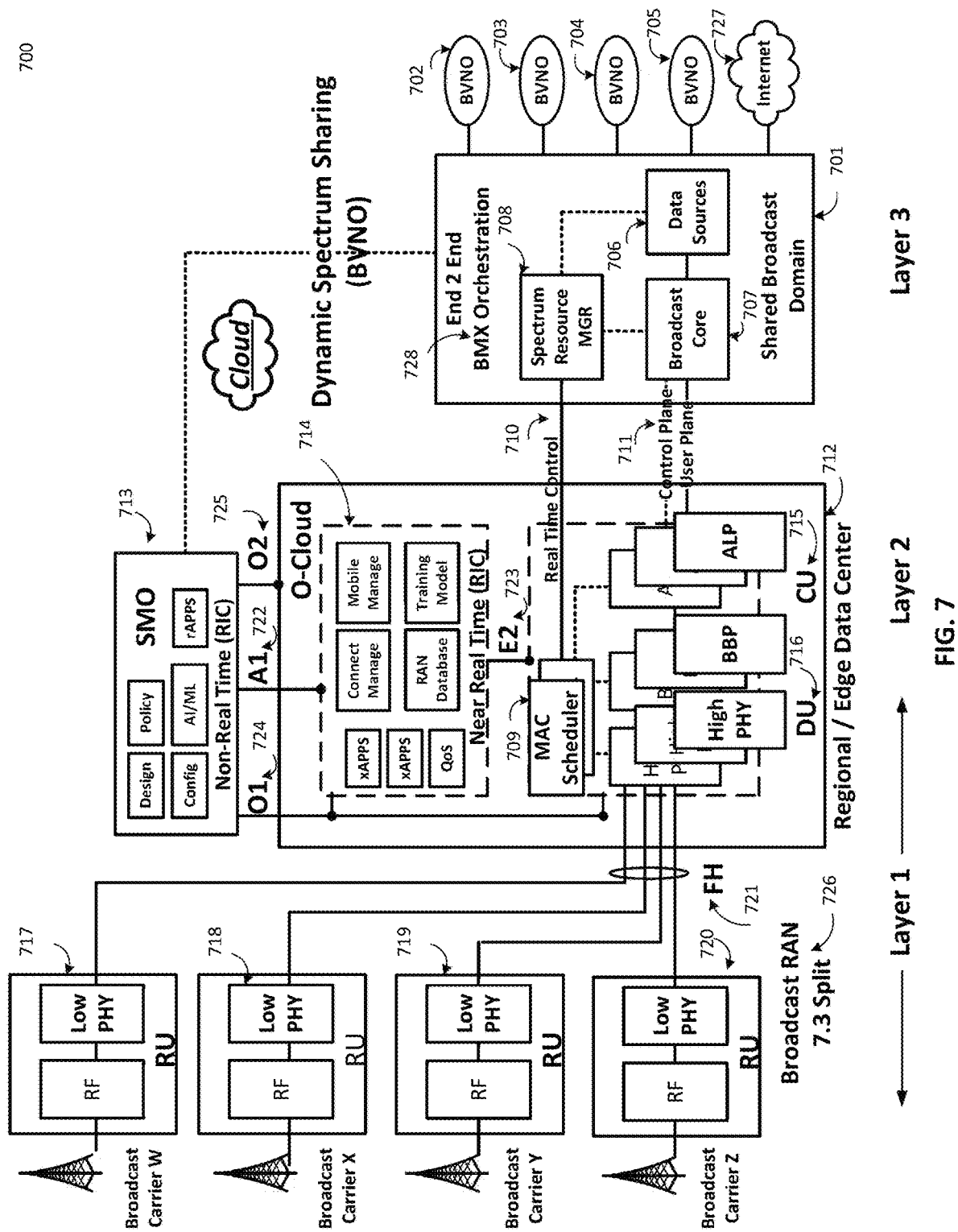
FIG. 7 illustrates a high-level view of ATSC 3.0 RAN disaggregated and aligned O-RAN principles and using dynamic spectrum sharing for broadcast virtual network operators BVNO sharing infrastructure of a neutral host network, in accordance with some aspects.

FIG. 7 illustrates an exemplary high-level view of ATSC 3.0 RAN disaggregated and aligned O-RAN principles and using dynamic spectrum sharing for broadcast virtual network operators (BVNO) sharing infrastructure of the neutral host network, in accordance with some aspects.

As shown in FIG. 7, ATSC 3.0 RAN 700 includes layers 3, layer 2, and layer 1 of the ATSC 3.0 RAN. Data sources 706 in shared broadcast domain 701 under automation can originate from one or more Broadcast Virtual Network Operators (BVNO) 702, 703, 704, 705 that are licensed broadcasters sharing the ATSC 3.0 RAN 700, according to some aspects. Data can also originate from Internet 727 and can be coordinated by the one or more BVNOs 702, 703, 704, 705 under shared broadcast domain 701 automation and broadcasted.

In some aspects, Regional or Edge Data Center 712 can be shared in Layer 2, and Layer 1 RAN split over a geographic area, as shown by 726, can be served by a licensed BVNO. The horizontal disaggregation is into CU 715 and DU 716 in the Regional and Edge Data Center 712. The Layer 1 is split between a physical layer (High) 716 and the physical layer (Low) in RU distributed at broadcast transmitter sites Carrier W 717, Carrier X 718, Carrier Y 719, and broadcast licensed Carrier frequency Z 720 that are all transported by fronthaul 721 from the Regional and Edge Data Center 712.

In accordance with some aspects, Spectrum Resource Manager (SRM) 708 and has MAC Real-Time Scheduler 709 are communicatively connected for real-time control shown as 710. The SRM 708 in the shared broadcast domain 701 along with End-to-End BMX orchestration 728 is responsible for dynamic spectrum sharing among BVNOs as disclosed in U.S. Patent Application Publication No. 2020/0288325, published Sep. 10, 2020, is described hereinbelow in more detail.

In some aspects, by way of a non-limiting example, Near Real-Time of RAN Intelligent Control (RIC) 714 and Non-Real-Time RIC 713 aligned with O-RAN principles and adapted for broadcast can be vertically disaggregated. The Non-Real-Time RIC 713 has Policy and ML/AI over a period of seconds, which is provided to the Near Real-Time of RAN Intelligent Control (RIC) 714 over A1 interface 722 defined by O-RAN Alliance. The Near Real-Time of RAN Intelligent Control (RIC) 714 has ML/AI over a period of 10 ms to 1 second.

According to some aspects, the Near Real-Time of RAN Intelligent Control (RIC) 714 has machine learning (ML)/artificial intelligence (AI) and collects data from CU 715, and DU 716 over an E2 interface 723. The Near Real-Time of RAN Intelligent Control (RIC) 714 includes xAPPs software that receives policy guidance from Non-Real-Time RIC 713 via the A1 interface 722 and uses ML/AI from data central unit (CU) 715, distributed unit (DU) 716 via the E2 interface 723, and can help define radio access network (RAN) functionality or use cases such as packet loss priority (PLP) traffic steering and PLP Handover in shared broadcast domain 701 and over Real-Time control 710 of MAC scheduler 709.

In accordance with some aspects, Service Management Orchestration (SMO) 713 has communication via an O1 interface 724 and O-Cloud via an O2 interface 725 of the Regional/Edge Data Center 712 as defined by O-RAN Alliance.

In accordance with some aspects, Broadcast Core 707 includes a control plane and a user plane interface, shown as 711, into the Regional/Edge Data Center 712, which broadcasts content and data from the one or more BVNOs 702, 703, 704, 705, and/or Internet 727 in the ATSC 3.0 RAN 700. This programmable RAN functionality using xAPPS will be discussed in more detail using FIG. 22 and FIG. 23.

Figure 8:
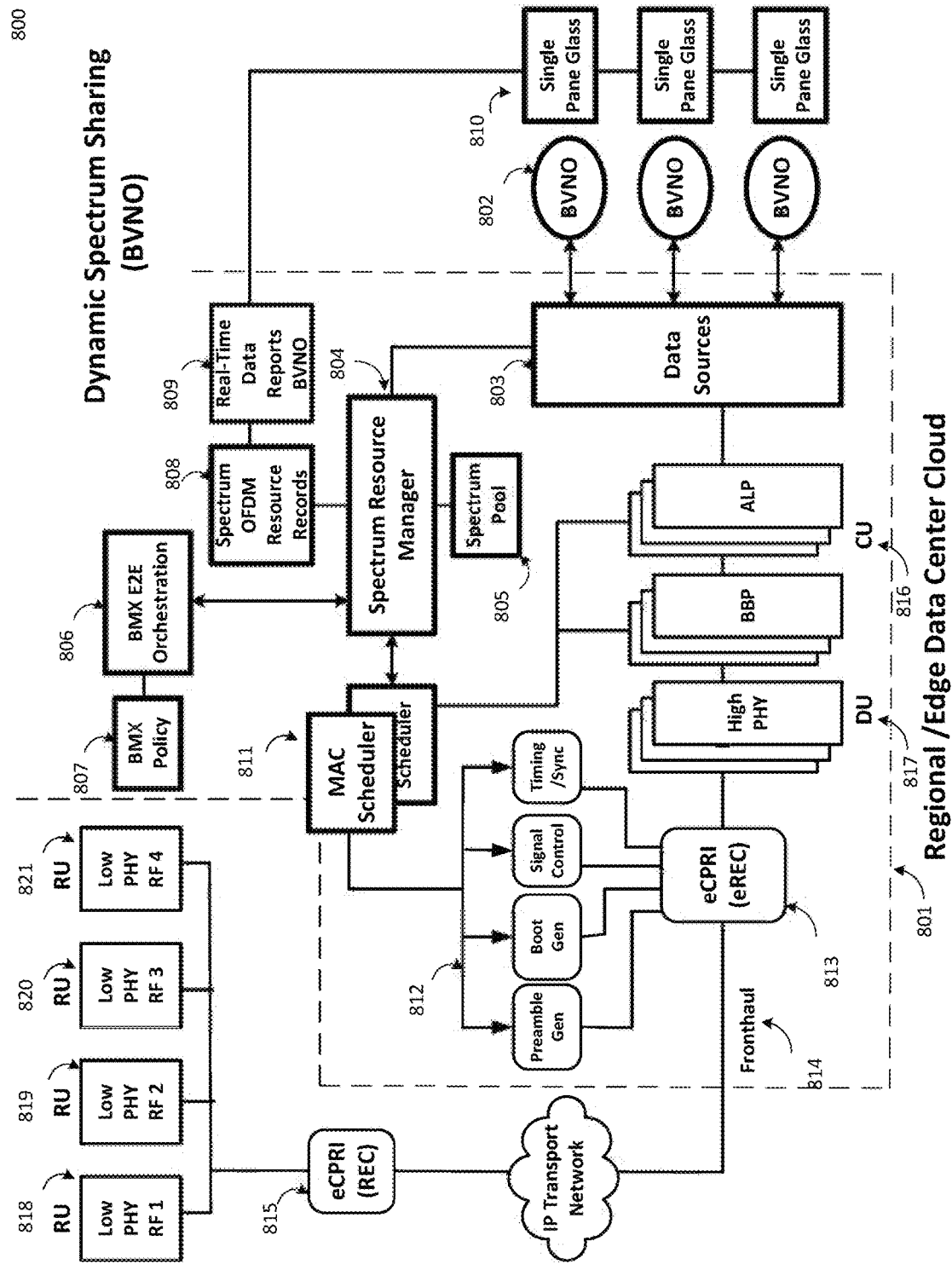
FIG. 8 illustrates more details of ATSC 3.0 RAN disaggregated and aligned O-RAN principles and dynamic spectrum sharing for broadcast virtual network operators (BVNO), in accordance with some aspects.

FIG. 8 illustrates more details of ATSC 3.0 RAN disaggregated and aligned O-RAN principles and dynamic spectrum sharing for broadcast virtual network operators (BVNO), in accordance with some aspects. As shown in more details in FIG. 8, a disaggregated ATSC 3.0 RAN 800 is described for dynamic spectrum sharing for BVNOs as described in U.S. Patent Application Publication No. 2020/0288325 published Sep. 10, 2020.

In accordance with some aspects, Regional/Edge Data Center 801 for one or more BVNOs 802 sends content/data into shared infrastructure data resources 803 under control of spectrum resource manager (SRM) 804. The SRM 804 establishes a spectrum pool 805 of all OFDM spectrum resources to be shared by BVNOs 802.

In accordance with some aspects, a Broadcast Market Exchange (BMX) orchestration entity 806 enforces broadcast market exchange (BMX) policy 807 according to business spectrum sharing agreements agreed by the BVNOs 802. To enforce fair usage of the spectrum pool 805, all orthogonal frequency-division multiplexing (OFDM) resources in the spectrum pool 805 are converted into spectrum OFDM resource usage records 808 for use by the BVNOs 802. By way of a non-limiting example, real-time data and reports 809 provide virtually isolated single pane of glass 810 of each BVNO of the BVNOs 802 dynamic spectrum sharing services 800 using a neutral host platform.

The real-time broadcast MAC schedulers 811 for multiple broadcast carriers have physical layer OFDM resources controlled by BMX E2E orchestration 806, according to some aspects. The broadcast core 707 authenticates and authorizes access to Regional/Edge Data Center cloud 801 by BVNOs 802 and establishes Service Level Agreement (SLA) for neutral host platform under BMX E2E orchestration 806 according to BMX policy 807 for broadcast shared spectrum on programmable RAN platform 700.

Broadcast MAC schedulers 811 in the aligned O-RAN are multiplexed for various functions shown in FIG. 8 by 812 onto enhanced common public radio interface (eCPRI) 813 along with user plane CU 816 and DU 817 (High PHY), according to some aspects. Fronthaul 814 over the IP network to complimentary eCPRI (REC) 815 and RU (Low PHY) shown as 818, 819, 820, 821 of the multiple RF broadcast carriers can be scheduled by MAC schedulers 811 with dynamically shared spectrum in the ATSC 3.0 RAN 800.

Figure 9:
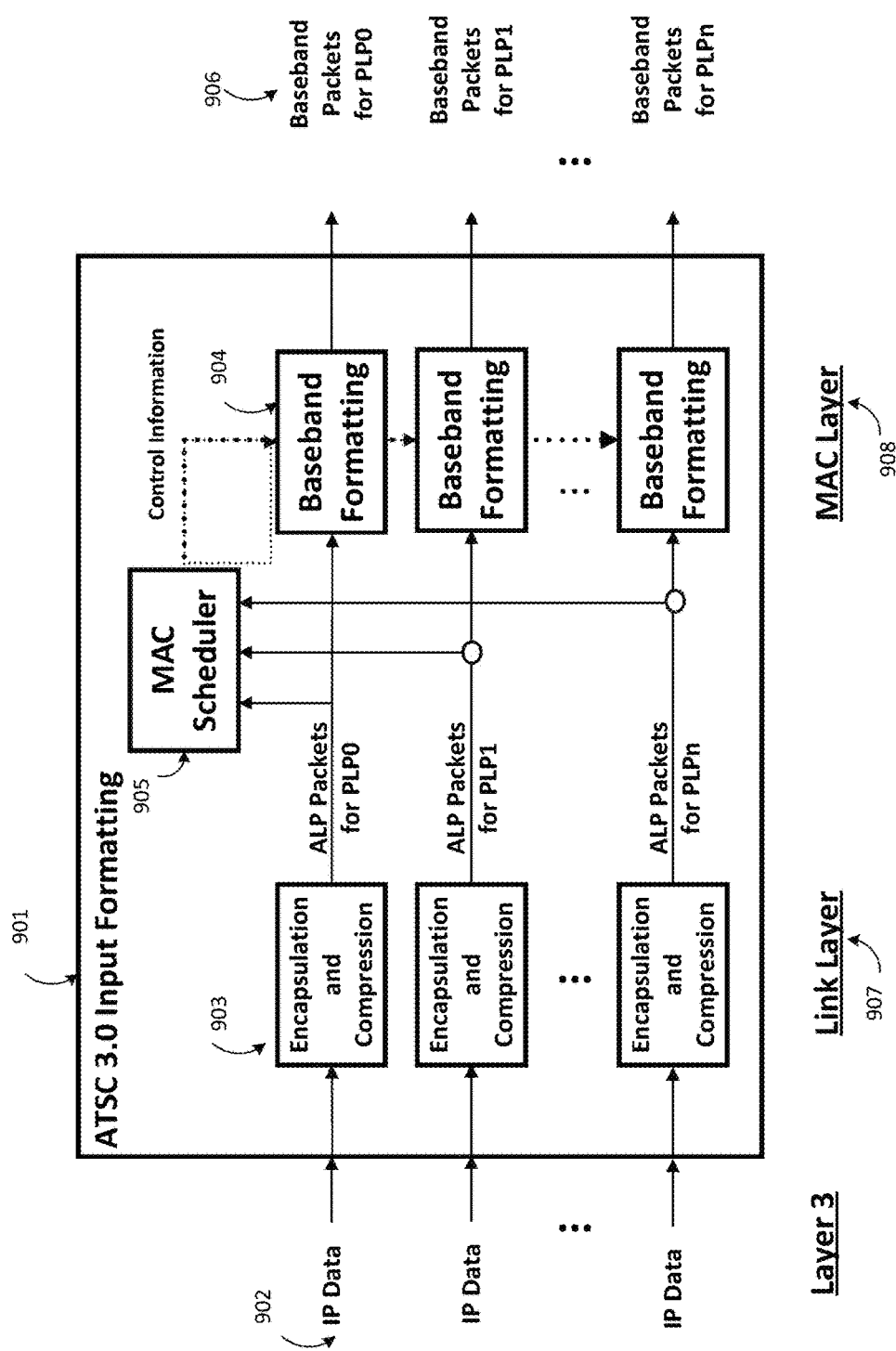
FIG. 9 illustrates ATSC 3.0 physical layer input formatting block layer 2 (Link/MAC) that will be used in part to bond and or steer PLP traffic between multiple RF carriers for multicast broadcast services using harmonized MFN and SFN topologies and intelligent orchestration aligned O-RAN concepts, in accordance with some aspects.

FIG. 9 illustrates an exemplary ATSC 3.0 physical layer input formatting block layer 2 (Link/MAC) that will be used in part to bond and or steer PLP traffic between multiple RF carriers for multicast broadcast services using harmonized MFN and SFN topologies and intelligent orchestration aligned O-RAN concepts, in accordance with some aspects. As shown in FIG. 9, ATSC A/322 standard input formatting block 901 at layer 2 900. IP data 902 is encapsulated into packets for a Link layer 907 by encapsulation and compression entity 903. MAC Scheduler 905 determines the size or length number of ALP packets to encapsulate into a baseband packet (BBP) for a PLP, as shown in FIG. 9 as 906. One BBP results in one LDPC Frame at Layer 1 that maybe either 16K or 64K bits in length.

In accordance with some aspects, the ALP packets are encapsulated by Baseband Formatting 904 into BBP 906 with a length as a function of various code rate LDPC (FEC) options for a PLP as determined by a MAC scheduler 905. The BBP 906 is used as an input to either a 16K or 64K LDPC (FEC) for the DU 716 (High Phy) for a PLP. By way of a non-limiting example, the Baseband Formatting 904 generates a BBP header with an optional extension field and 2-Byte BBP counter.

Figure 10:
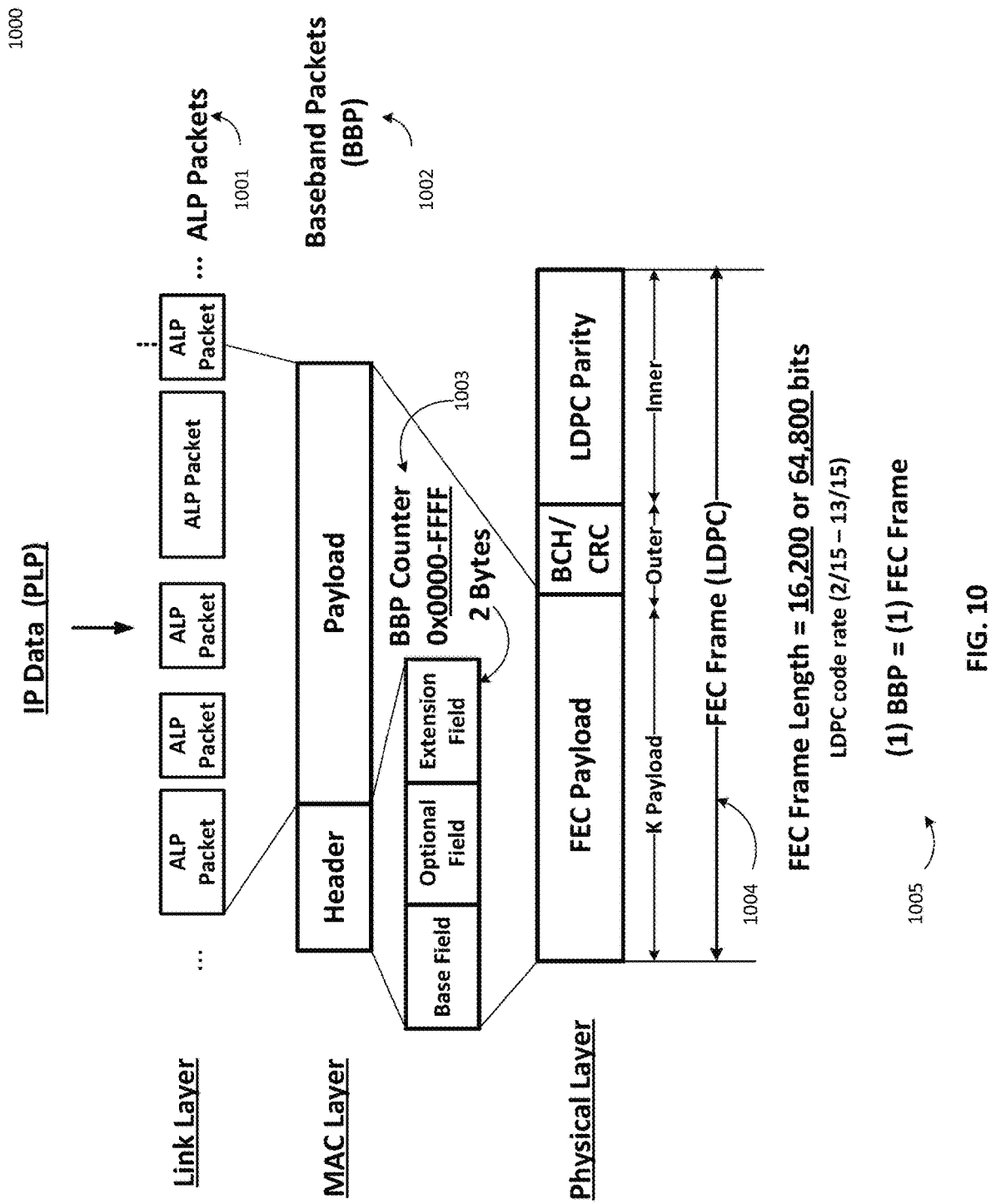
FIG. 10 illustrates ATSC 3.0 (Link/MAC) layer 2 with Baseband Packet (BBP) Counter in BBP Header, in accordance with some aspects.

FIG. 10 illustrates an exemplary ATSC 3.0 (Link/MAC) layer 2 with BBP Counter in BBP Header, in accordance with some aspects. As shown in FIG. 10, ALP packets 1001 for a Link Layer 1000 are being encapsulated into payload for the BBP packets 1002 at a MAC Layer. As shown in FIG. 10, a 2-bytes BBP counter 1003 can be used at a UE using intelligence RAN for various use cases such as Bonding and or Steering PLPs or network Slices as discussed herein.

Figure 22:
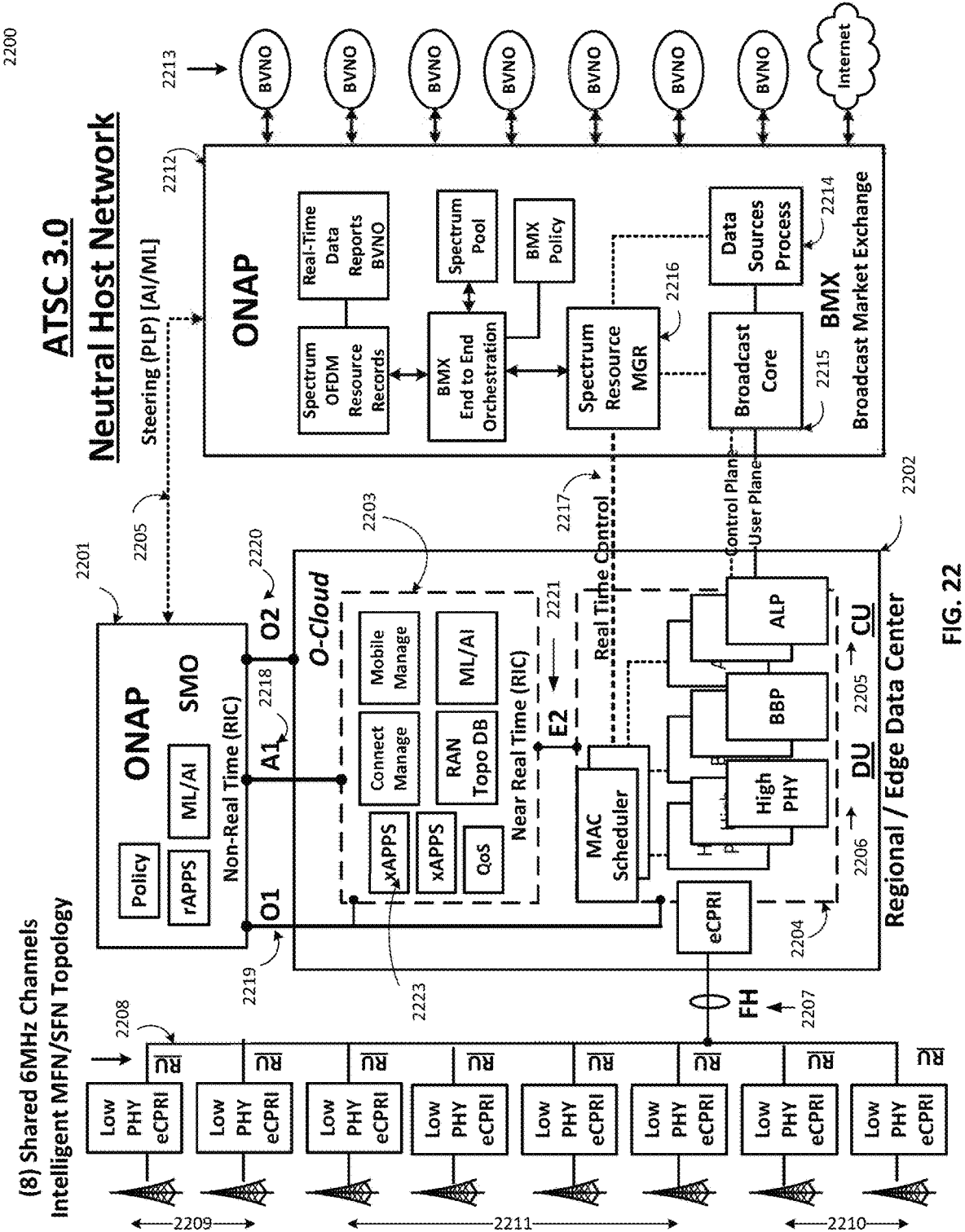
FIG. 22 illustrates broadcast programmable RIC with Machine Learning (ML)/Artificial Intelligence (AI) and open interfaces and xAPPs, including broadcast spectrum sharing with BVNO and Orchestration of Broadcast Market Exchange (BMX) for business models using Neutral Host network, in accordance with some aspects.

By way of a non-limiting example, the BBP counter 1003 can be used at a UE when synchronizing functionality such as Bonding and or Steering of a PLP or Slice between RF carriers for multicast-broadcast services using intelligent RAN orchestration as described herein using FIG. 21 and FIG. 22.

Figure 11:
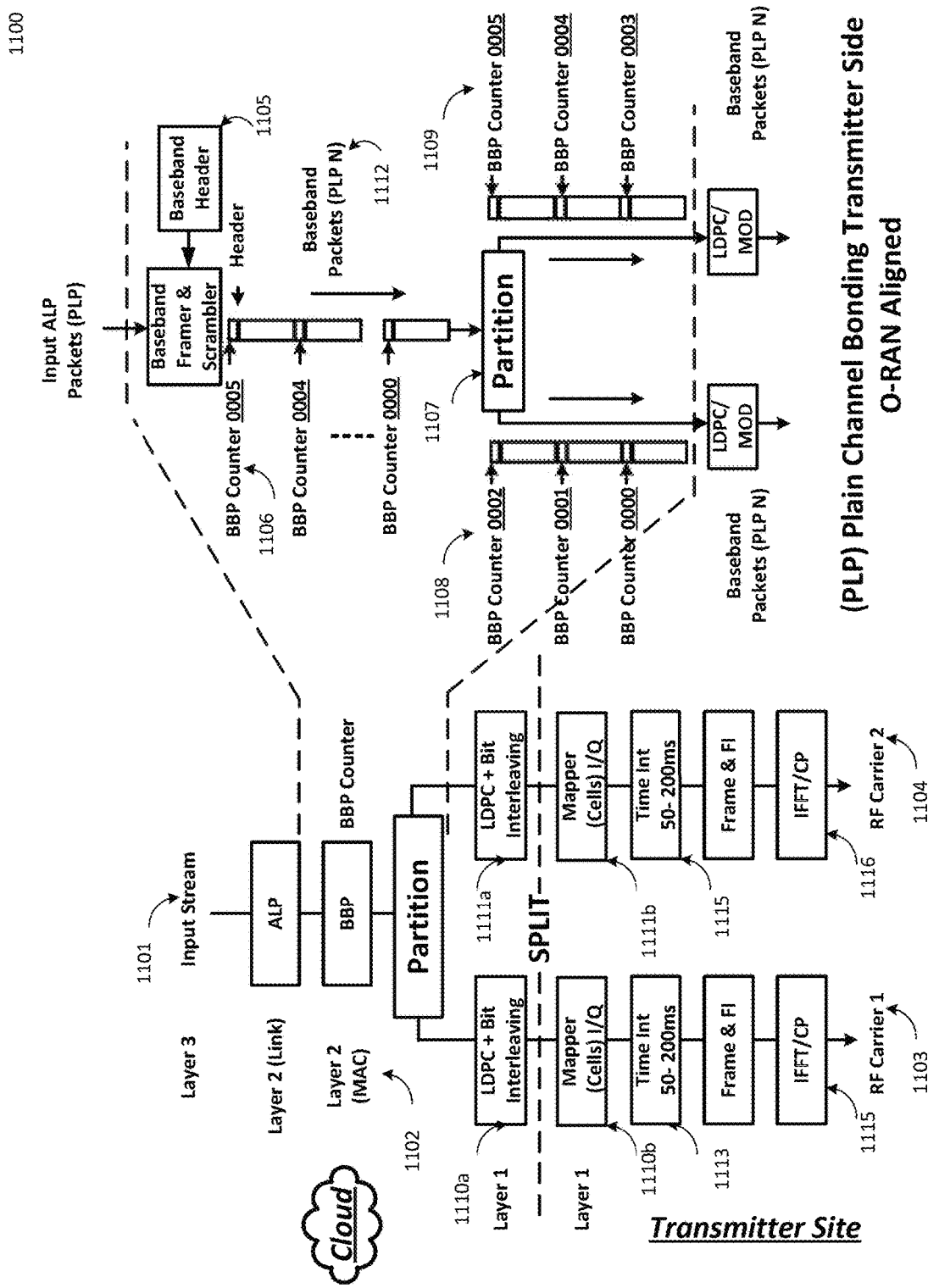
FIG. 11 illustrates ATSC 3.0 PLP channel bonding on a transmitter side, in accordance with some aspects.

FIG. 11 illustrates an exemplary ATSC 3.0 PLP channel bonding transmitter side, in accordance with some aspects. FIG. 11 1100 shows a concept of PLP Bonding from a transmitter side perspective, which will be orchestrated under broadcast ATSC 3.0 RAN 700.

In accordance with some aspects, an input stream, for example, an IP data stream 1101 may be provided into a layer 2 link layer, such as an ALP. A MAC layer 1102 may be updated to add a block that is shown in FIG. 11 as BBP Partitioning 1102. A Baseband Packet (BBP) Header 1105 includes a field identified in FIG. 11 as a BBP Counter 1106. The BBP counter 1106 is a two-byte field with its initial value assigned to 0x0000 that is incremented upon broadcasting of each BBP to count 0xFFFF and then resets to 0x0000, and the count continues.

The BBP stream 1112 can be Partitioned as shown by 1107, and a BBP stream is sent over one or more independent RF carriers shown in FIG. 11 as 1103, 1104, according to some aspects. A BBP, which is also discussed further in FIG. 12, in the received stream can be uniquely identified using the BBP counter 1106 at a MAC layer in UE. When the UE is simultaneously receiving partitioned PLP's from more than one RF carrier 1103, 1104, each BBP is identified using the BBP counter 1106, detects any missing BBP, and reorder and merges back into the IP data stream 1101, etc. One use case of PLP bonding is to increase the total data rate that a PLP can support by splitting high data rate input IP stream 1101 and send across a plurality of RF Carriers over Layer 1 and merge together at the UE back into the IP data stream.

The BBP Partitioning 1107 partitions the BBP packet stream between a plurality of layer 1 streams, for example, shown in FIG. 11 as 1108, 1109 for broadcast over a plurality of RF carriers, for example, 1103, 1104. The LDPC (a FEC) and Modulation 1110, 1111, Time Interleaving 1113, 1114, and Inverse Fast Foureier Transform (IFFT) 1115, 1116 can be identical or independently adjusted per PLP and use case.

Figure 12:
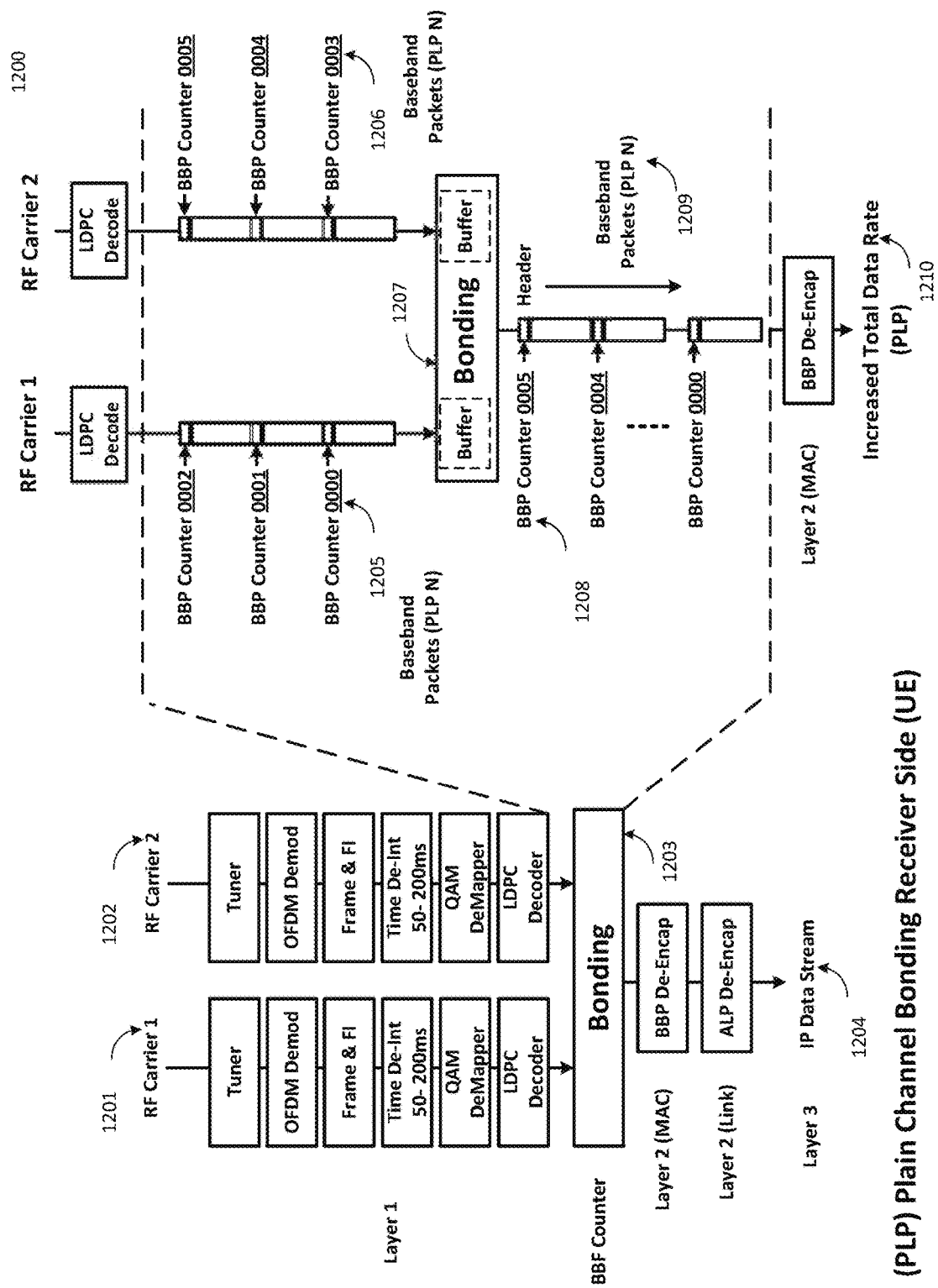
FIG. 12 illustrates ATSC 3.0 PLP channel bonding on a receiver side, in accordance with some aspects.

FIG. 12 illustrates an exemplary ATSC 3.0 PLP channel bonding on a receiver side, in accordance with some aspects. FIG. 12 1200 shows a concept of PLP Bonding from a receiver side UE perspective for the UE with dual receiving chains or streams 1201, 1202, for example, from two RF carriers. Using the BBP counter, discussed earlier with reference to FIG. 11, in the BBP header, the BBP streams 1201, 1202 can be merged, as shown in FIG. 12 by 1203, into a single BBP stream 1204, according to some aspects. The recovered IP data stream 1204 is identical to the IP data stream 1101 that was partitioned for broadcast over the plurality of RF carriers.

In FIG. 12, partitioned BBP streams with BBP counters are shown as 1205 and 1206. The BBP streams 1205 and 1206 are buffered at 1207 for bonding or merging together. At 1207, the BBP streams are reordered and bonded into a BBP stream 1209 with BBP sequence count or BBP counter 1208 that is identical to the BBP counter 1106, and, thereby producing the combined total data rate shown in FIG. 12 as 1210 as identical to the total data rate of the input data stream 1101, according to some aspects. Thus, FIG. 12 shows an example of bonding to increase the total data rate capacity of a PLP. By way of a non-limiting example, a single PLP bonded can carry the data capacity of two RF channels 1201, 1202. This could increase service quality or speed a data file transfer broadcast to many UE in half the time for many use cases.

By way of a non-limiting example, another use case for bonding is to partition a PLP service using spatial scalable video coding with base layer video sent over one of the plurality of RF carriers 1103 and an enhancement layer video sent another RF carrier of the plurality of RF carriers 1104. The base layer uses a more robust FEC and modulation 1110 for lower C/N reception when mobile. The enhancement layer uses less robust FEC and modulation 1111 and can be received at higher C/N. Both the transmissions from the plurality of RF carriers, such as 1103, 1104, can be received by the UE for fixed service using bonding. Also, mobile service UE can receive base layer and then, when in a higher C/N environment, receive both the transmissions from the plurality of RF carriers, such as 1103, 1104, and then bond them for better video resolution quality of service (QoS). This use case is also more efficient than simulcasting the same content separately for both mobile and fixed services.

By way of a non-limiting example, in bonding use cases, the selection of FEC and modulation values and Time Interleaving settings and FFT sizes for the RF carriers 1201, 1202 can help determine differential latency and memory requirements at the UE.

Moreover, the start of emission of each broadcast frame 601, the first symbol bootstrap 603 is time aligned using GPS at transmitting antenna air interfaces of the RF carriers 1103, 1104. NTP is used for access of content data by BVNO onto neutral host platform automation 800, according to some aspects. This precise network timing based on GPS for physical layer and NTP makes it possible for the spectrum resource manager 804 an efficient synchronous spectrum sharing between a plurality of BVNOs and reduce PLP differential latency between RF channels.

It should be appreciated again that the spirit of disclosure is from a perspective of broadcasters sharing spectrum and infrastructure under automation.

Figure 13:
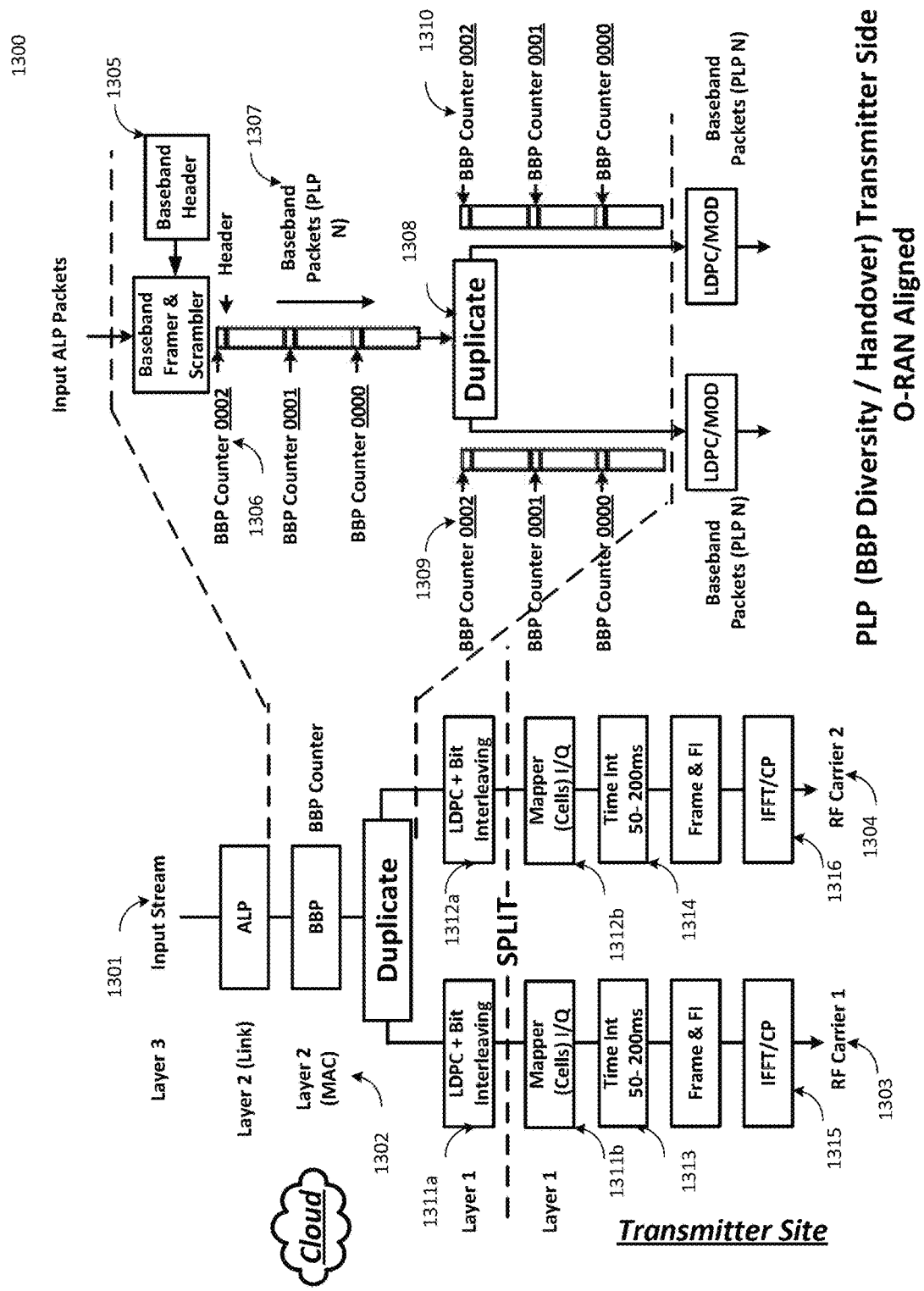
FIG. 13 illustrates ATSC 3.0 PLP diversity/handover transmitter side, in accordance with some aspects.
Figure 14:
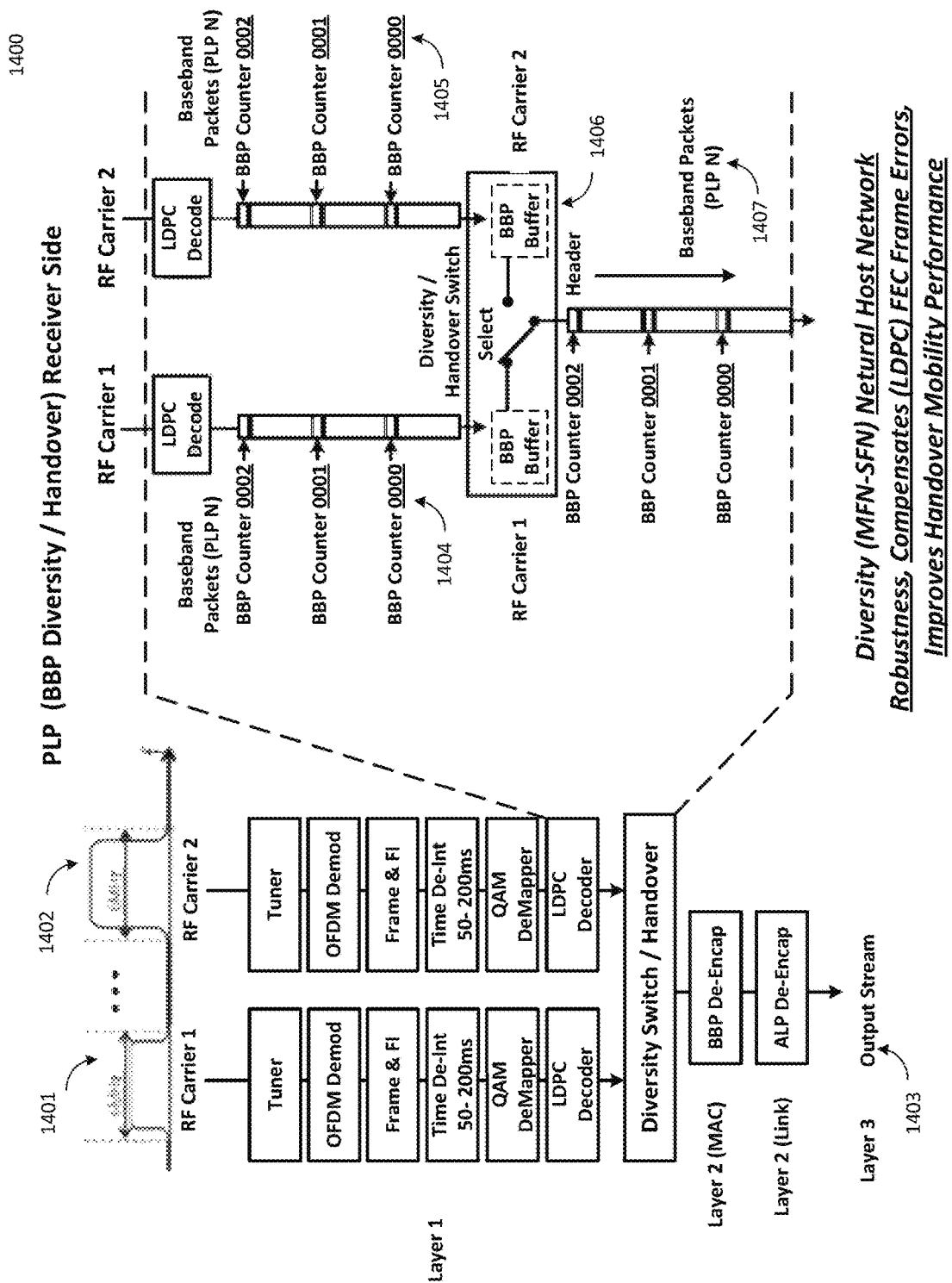
FIG. 14 illustrates ATSC 3.0 PLP diversity/handover receiver side, in accordance with some aspects.

In accordance with some aspects, the precise network timing is also important for seamless handover that is discussed in FIG. 13, and FIG. 14 that use broadcast RAN intelligent automation. By way of a non-limiting example, the FEC and modulation, Time interleaving, FFT size selections are identical for both RF carriers for this use case of handover under orchestration to be disclosed.

FIG. 13 1300 illustrates an exemplary system 1300 that includes blocks for a PLP or network Slice diversity/handover use case from a transmitter side perspective, according to some aspects. In FIG. 13 and FIG. 14, some modifications to layer 2 are introduced to enable use cases of diversity/handover for mobile UE using broadcast intelligent RAN topologies.

In accordance with some aspects, a layer 3 input stream 1301 for a PLP is shown in FIG. 13. A Mac Layer 1302 has a block named in FIG. 13 as Duplicate 1308 is added. The functionality Duplicate 1308 is applied to BBP streams of RF Carrier 1 1303 and RF Carrier 2 1304 for use cases.

In accordance with some aspects, a Baseband Packet Header 1305 and a BBP Counter 1306 are previously discussed and used for use cases. BBP Stream 1307 for PLP for the use case of diversity/handover for mobile is discussed below.

In accordance with some aspects, Duplicate block 1308 duplicates the input BBP stream 1307 into exact copies and in the same temporal order as shown by BBP counters 1309, 1310 for RF Carrier 1 1303 and RF carrier 2 1304. By way of a non-limiting example, for LDPC (FEC) and modulation 1311, 1312, Time Interleave 1313, 1314, and IFFT size 1315, 1316 are all selected to have the same parameter values that ensure diversity and seamless handover in intelligent RAN as will be discussed using FIG. 14.

FIG. 14 illustrates an exemplary ATSC 3.0 PLP diversity/handover receiver side, in accordance with some aspects. FIG. 14 1400 illustrates a system 1400 for a PLP or network Slice diversity/handover use case from a receiver side (UE) perspective. Transmission over RF carrier 1 1401 and s RF Carrier 2 1402 are processed at transmitter side as discussed using FIG. 13 are now received at UE after RF propagating from transmitters associated with the RF carrier 1 1401 and RF carrier 2 1402.

For mobile UE, the RF propagation physics can cause the RF signal field strengths RF Carrier 1 1401 and RF Carrier 2 1402 available at UE to fade and become weak as UE moves further away from the transmitter.

In accordance with some aspects, the use case for diversity is achieved by having exact BBP copies (counter values) available for a PLP at the UE MAC Layer in one or more buffers to mitigate fading of the RF signal field strength. Accordingly, seamless handover from the RF carrier 1 1401 to the RF carrier 2 1402 or vice-versa can be performed when signal strength severely fades or disappears completely. This behavior is desirable for mobile UE and is made possible using the functionality of a block, Diversity Switch/Handover 1406.

In accordance with some aspects, duplicate BBP streams 1404 and 1405 are generated by the Duplicate block 1308 with the identical FEC and modulation, Time Interleaving of a value, for example, 50-200 ms, and IFFT size selections for the RF carrier 1 1401, and the RF carrier 2 1402 to minimize buffer size at the Diversity Switch/Handover block 1406 and differential latency of arrival of the BBP streams 1404, 1405 in buffers at the Diversity Switch/Handover block 1406. Also, the network timing was discussed using FIG. 12 of neutral host platform ensures the differential latency of arrival of the BBP streams 1404, 1405) between the RF Carrier 1 1401 and the RF Carrier 21402 is very small.

In accordance with some aspects, Diversity Switch/Handover 1406 has input buffers shown that receive the BBP streams 1404, 1405. As it will be shown later with exemplary broadcast topologies, when both the duplicate BBP streams 1404 and 1405 are in buffers, diversity is established with UE logic MAC Layer and switching at the Diversity Switch/Handover block 1406. This logic selects the next BBP by examining the incremental count of the BBP counters in buffers. If signal strength corresponding to the RF carrier 1 1401 fades and the signal strength corresponding to the RF carrier 2 1402 is better, a switch to opposite buffer, for example, from 1404 to 1405, is made at the UE causing continuous reception of the BBP stream for the given PLP.

In some aspects, by way of a non-limiting example, a BBP for the ATSC 3.0 can include 16,200 bit LDPC frame at 6 MHz bandwidth and assuming QPSK constellation is used. A single LDPC frame arrives at decoder UE approximately every 1.1 ms. Accordingly, switching at the Diversity/Handover switch block 1406 can occur at every 1.1 ms, depending on fading. It should also be appreciated the ATSC 3.0 physical layer has time interleaving 1313, 1314 of a value, for example, between 50-200 ms in the upstream direction at the Diversity/Handover switch block 1406, and this adds additional time diversity before the Diversity/Handover switch block 1406. So, the probability of instantaneous LDPC frame block decoding errors occur at the same exact instant on either of the RF carrier 1 1401 or RF carrier 2 1402 is low, then the Diversity/Handover switch block 1406 diversity can be applied on a PLP by PLP on a need basis effectively.

In accordance with some aspects, as further described herein using FIG. 18 and FIG. 19, a signal from RF carrier 1 1401 fades completely as the UE moves further away from a transmitter corresponding to the RF carrier 1 1401, the UE logic makes a seamless handover to RF carrier 2 1402 and continuous reception from buffers associated with the RF carrier 2 1402 using the BBP stream 1405 occurs, which can improve the QOS for the PLP as discussed with reference to FIG. 18 and FIG. 19.

Therefore, when the UE is mobile, an examination of the duplicate BBP streams in buffers at the Diversity/Handover switch block 1406 provides desirable diversity and/or seamless handover for improved QOS.

Figure 15:
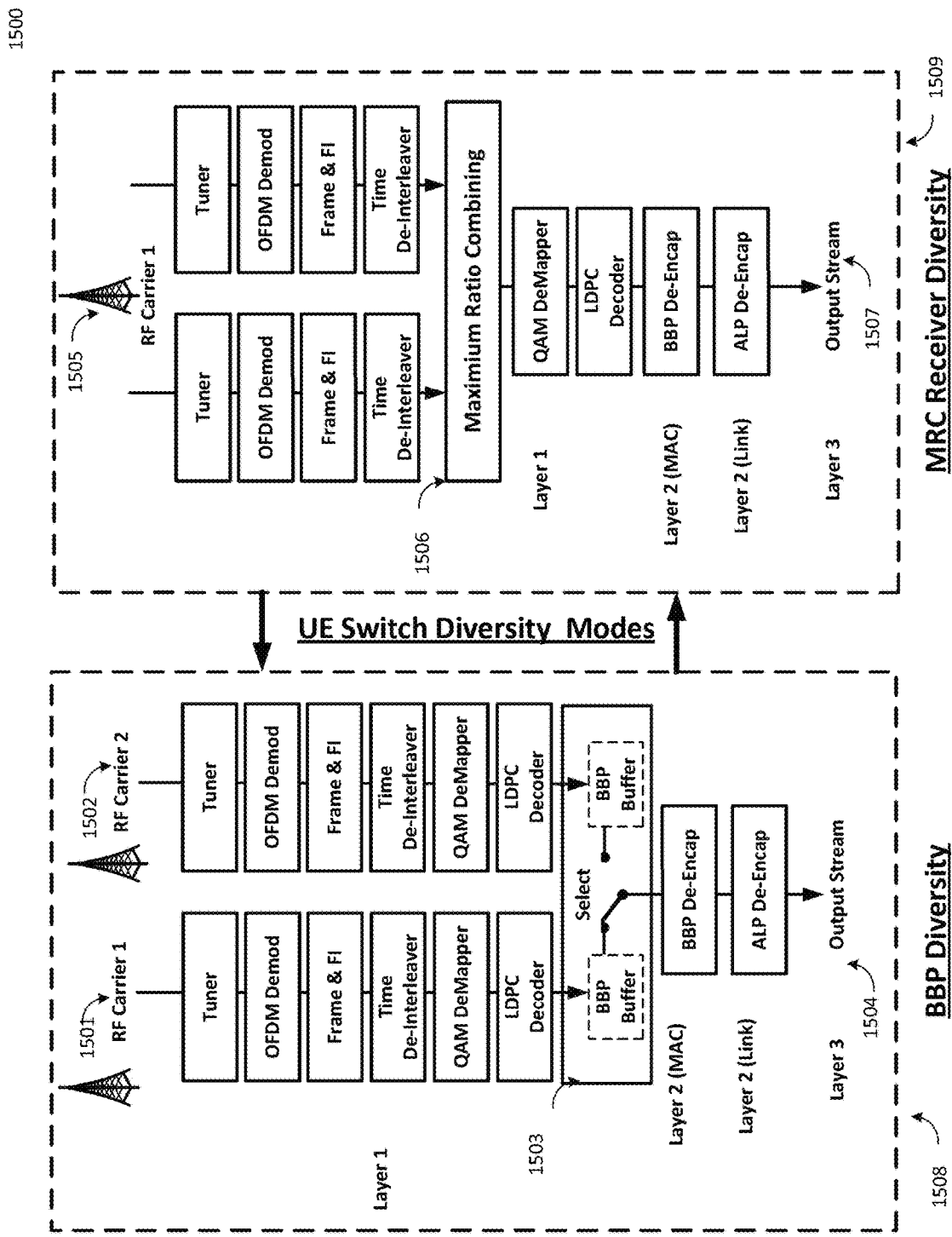
FIG. 15 illustrates similarity blocks handover and Maximum Ratio Combining (MRC) diversity on a receiver side, in accordance with some aspects.

FIG. 15 illustrates the similarity between blocks of handover and Maximum Ratio Combining (MRC) diversity on a receiver side, in accordance with some aspects. As shown in FIG. 15, handover between RF carrier 1 1501 and RF carrier 2 1502 is achieved using Diversity Switch/Handover block 1503 to generate an output stream 1504, as shown in FIG. 15 by 1508 and as described earlier with reference to FIG. 14. Similarly, upon reception of duplicate packets from an RF carrier 1 1505, a packet with a better signal quality may be selected by MRC block 1506 to generate an output stream 1507, as shown in FIG. 15 by 1509. Again, the received duplicate packets from RF carrier 1 are compared in a similar way the duplicate packets received from RF carrier 1 and RF carrier 2 are compared to generate the output stream with a good QoS.

As shown in FIG. 15, the Diversity Switch/Handover block 1503 is located in between a layer 2 and a layer 1 LDPC decoder. The MRC block 1506 is located at layer 1 before a Quadrature Amplitude Modulation (QAM) demapper. The MRC block 1506 combines QAM cells, for example, the soft values of the two receiver chains from the RF carrier 1 1505, using a weighted sum operation depending on the channel coefficients that offer a very good diversity gain in fading channels for a single RF carrier. By way of a non-limiting example, in some cases, using the MRC as described herein, gain of 6 dB may be achieved.

In accordance with some aspects, other than the difference between the shown MRC block 1506 and the Diversity Switch/Handover block 1503, the other receiver blocks are the same, including the generated output streams 1504, 1507. Therefore, UE blocks in 1508, 1509 can be repositioned for new functionality.

In accordance with some aspects, several broadcast network topologies are introduced briefly. No specific network design should be assumed by these limited examples given only to introduce technology and network tools in the context of future intelligent broadcast RAN topologies.

Figure 16:
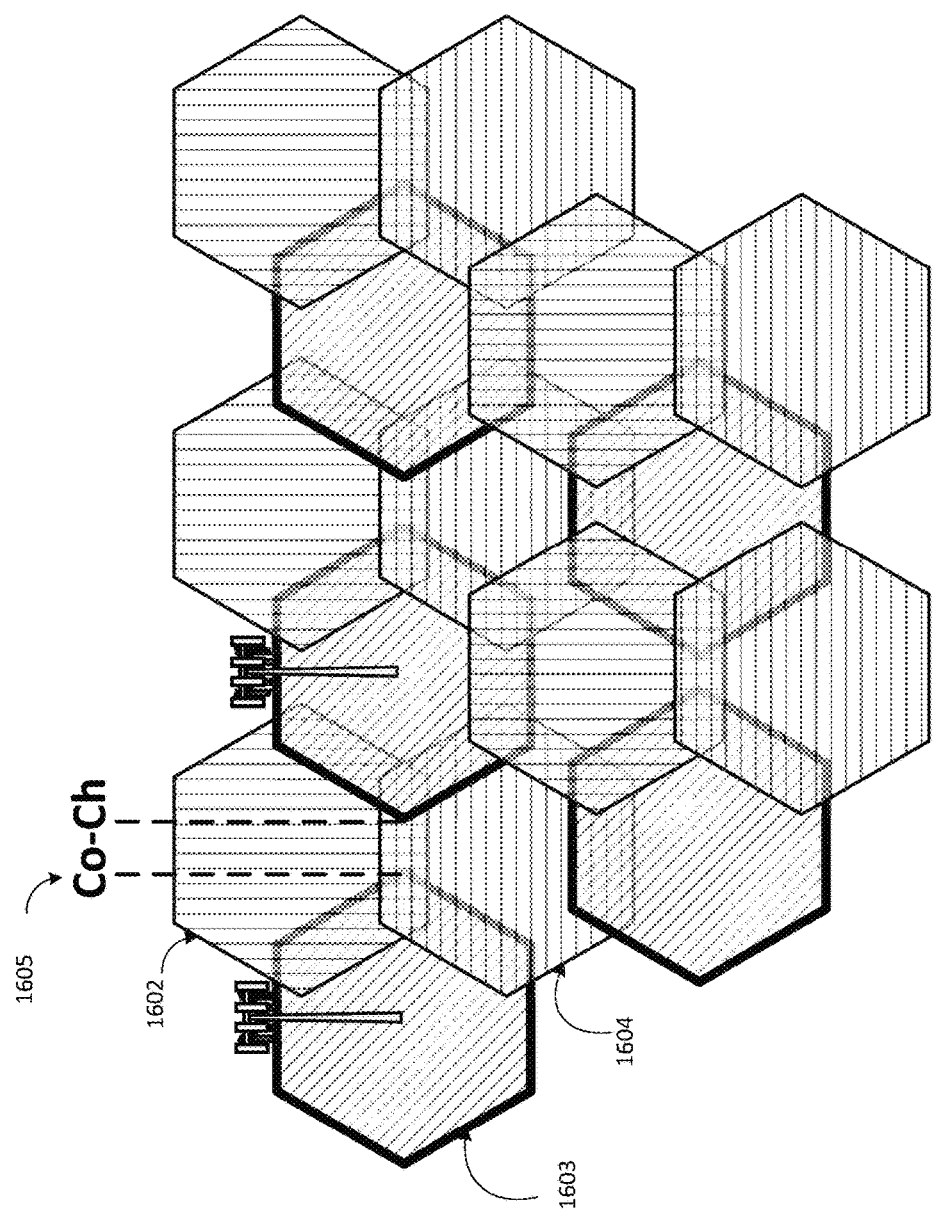
FIG. 16 illustrates example multicast topology MFN cells frequency re-use=3, in accordance with some aspects.
Figure 24:
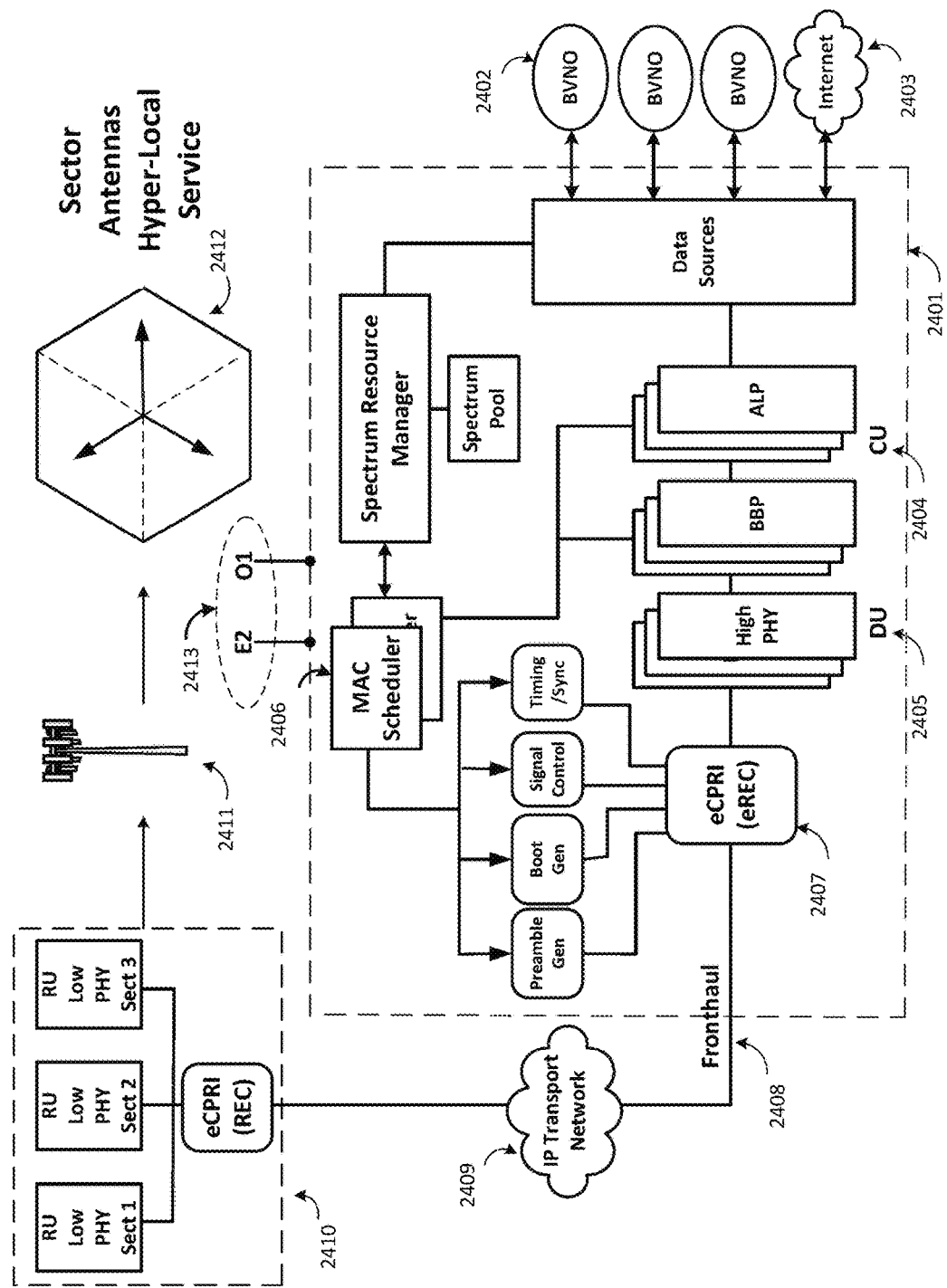
FIG. 24 illustrates intelligent broadcast topology for Hyper-Local Multicast service using three remote units (RUs) and three sectorized antennas in targeted MFN Cell Clusters, in accordance with some aspects.

FIG. 16 illustrates example multicast topology with MFN cells having frequency re-use=3, in accordance with some aspects. As shown in FIG. 16, a broadcast topology 1600 depicts a Multiple Frequency Network (MFN) 1601 arranged in groups of three cells. Accordingly, the broadcast topology as shown in FIG. 16 may be referenced as using a frequency Re-use=3. Three different carrier frequencies, 1602, 1603, 1604, are shown, which repeat in groups. By way of a non-limiting example, an omnidirectional transmit antenna pattern is used in each cell. However, other types of antennas can also be used. For example, as shown in FIG. 24, 3-sector broadcast antennas can be used in a cell for hyperlocal multicast cell clusters.

In accordance with some aspects, by way of a non-limiting example, the cells shown in FIG. 16 can be configured as having adjacent overlapping signal strength areas, which enables diversity and handover opportunity. As shown in FIG. 16, co-channel distance 1605 between the similar carrier frequencies of adjacent cells may be required to avoid interference.

With the co-channel distance separation, each cell in MFN 1601 can have independent multicast content served on a separate PLP to one/an unlimited number of UE within the coverage of a cell without experiencing co-channel interference. By way of a non-limiting example, there can be 1 to 64 PLPs or services in each broadcast frame shown in FIG. 6. This gives great flexibility to serve multicast either with the same or targeted different content data, IoT, etc., in a cell area.

Figure 17:
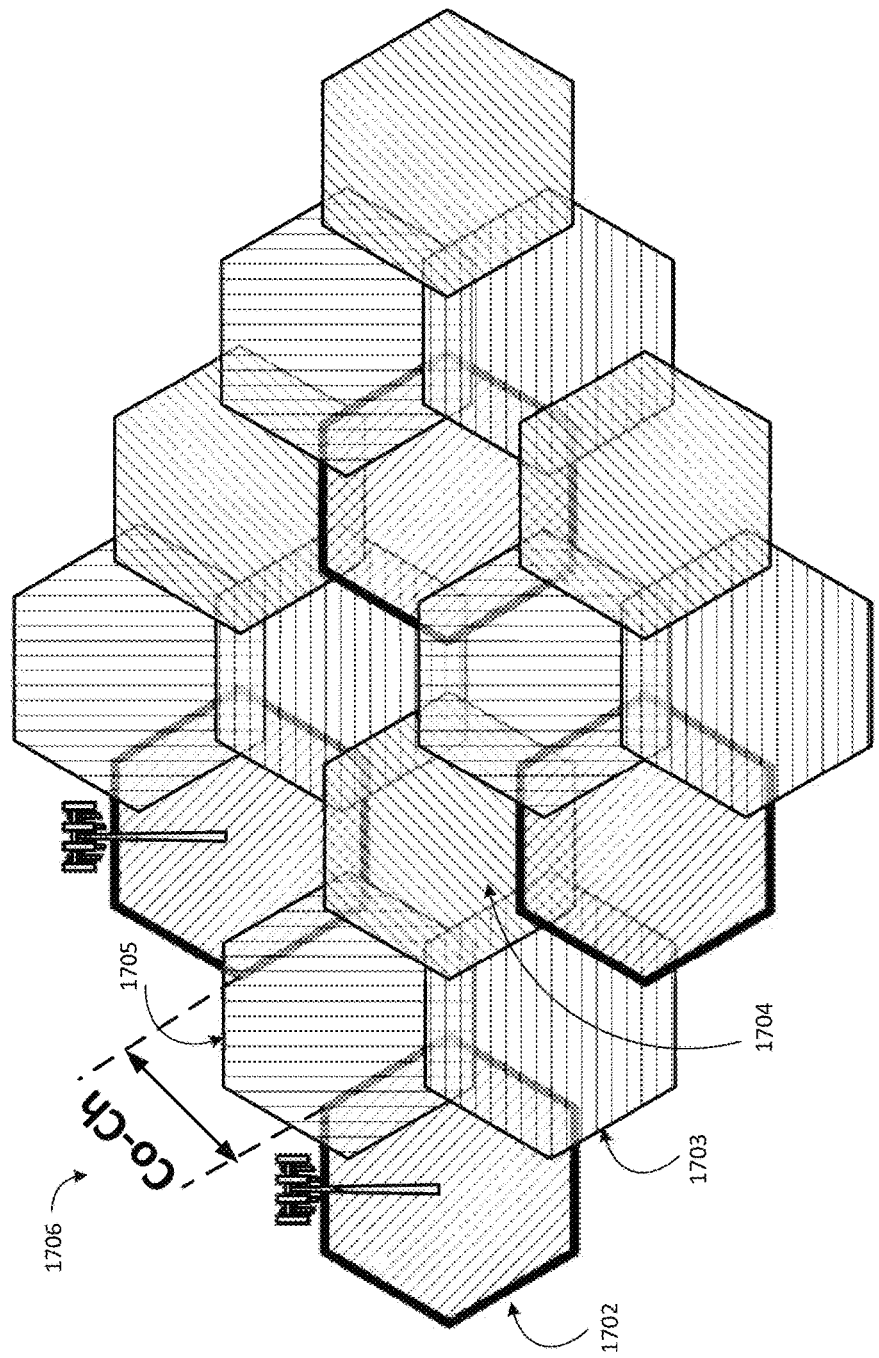
FIG. 17 illustrates example multicast topology MFN cells frequency re-use=4, in accordance with some aspects.

FIG. 17 illustrates example multicast topology with MFN cells having frequency re-use=4, in accordance with some aspects. As shown in FIG. 17, a broadcast topology 1700 depicts a Multiple Frequency Network (MFN) 1701 in groups of four cells. Accordingly, the broadcast topology as shown in FIG. 17 may be referenced as using a frequency Re-use=4. Four different carrier frequencies, 1702, 1703, 1704, 1705, are shown, which repeat in groups.

In accordance with some aspects, cells in the topology shown in FIG. 17 are designed with adjacent overlapping signal areas as shown that enable diversity and handover opportunity. Further, the topology shown in FIG. 17 has the benefit of a larger co-channel distance 1706 between the similar carrier frequencies of adjacent cells. The larger co-channel distance 1706 gives freedom to design larger overlapping adjacent cell coverage areas to improve QOS over larger service areas, which is a major difference between the topology shown in FIG. 16 and FIG. 17.

Figure 18:
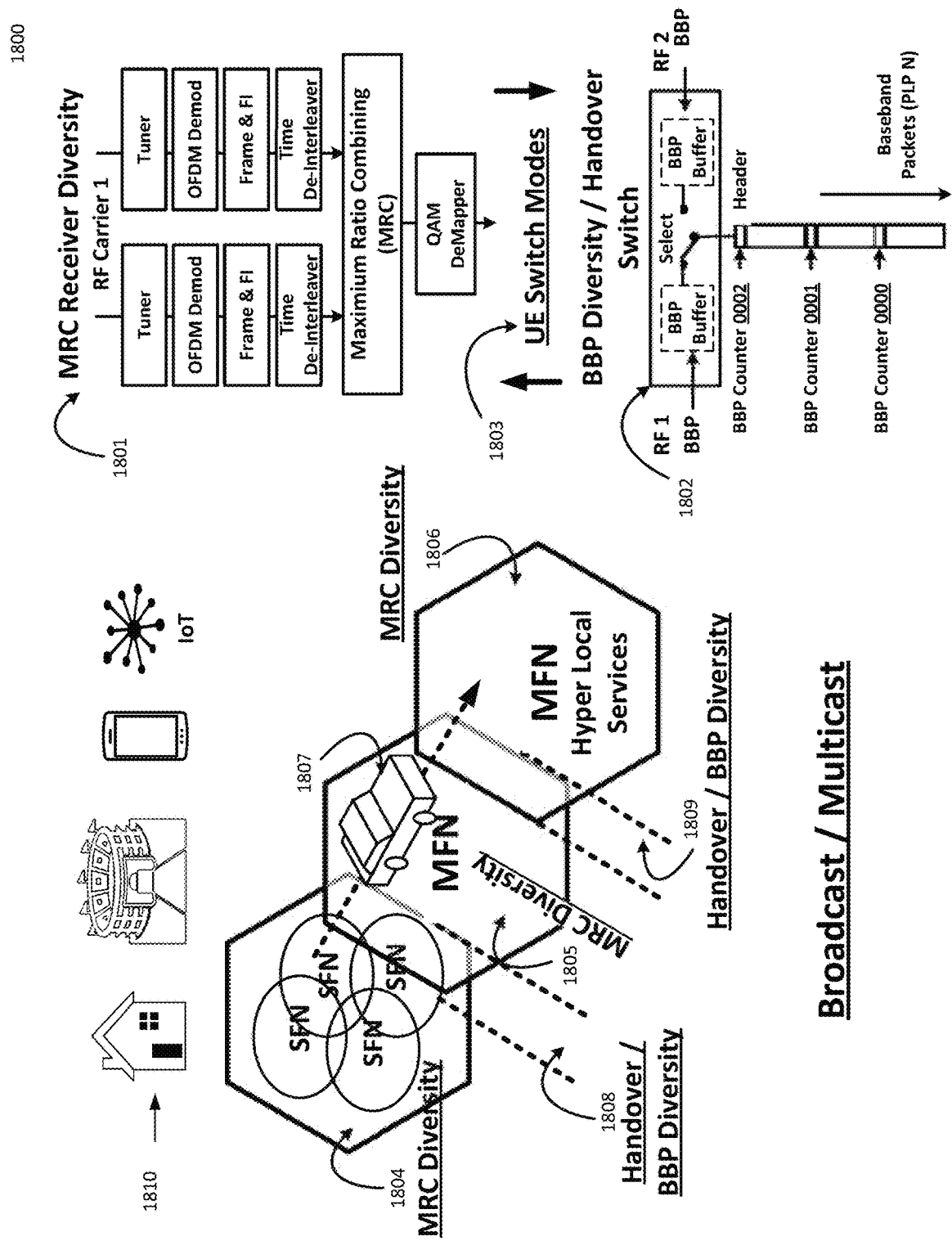
FIG. 18 illustrates example handover multicast MFN cells frequency re-use=3, in accordance with some aspects.

FIG. 18 illustrates example handover multicast MFN cells with frequency re-use of 3, in accordance with some aspects. As shown in FIG. 18, a broadcast topology 1800 depicts a Multiple Frequency Network (MFN) 1801 arranged in groups of three cells, as shown in FIG. 16. Accordingly, the topology shown in FIG. 18 can be referenced as a frequency Re-use=3. In FIG. 18, RF fading is shown as 1802 that can occur while a mobile UE automobile is moving on a trajectory that passes into an overlapping coverage area, shown as 1803. The overlapping coverage area 1803 is an opportunity for diversity and or handover, as previously explained with reference to FIG. 14 as an RF signal fades. Similarly, the MAC Layer diversity/handover switch logic, shown in FIG. 18 as 1805, can operate as discussed and can cause seamless handover as UE trajectory enters deeper into an adjacent cell.

In some aspects, as the UE enters the central area of a cell, just a single but stronger RF carrier can be available. Then later, as the UE trajectory enters another overlapping coverage area 1804, handover can occur.

Figure 19:
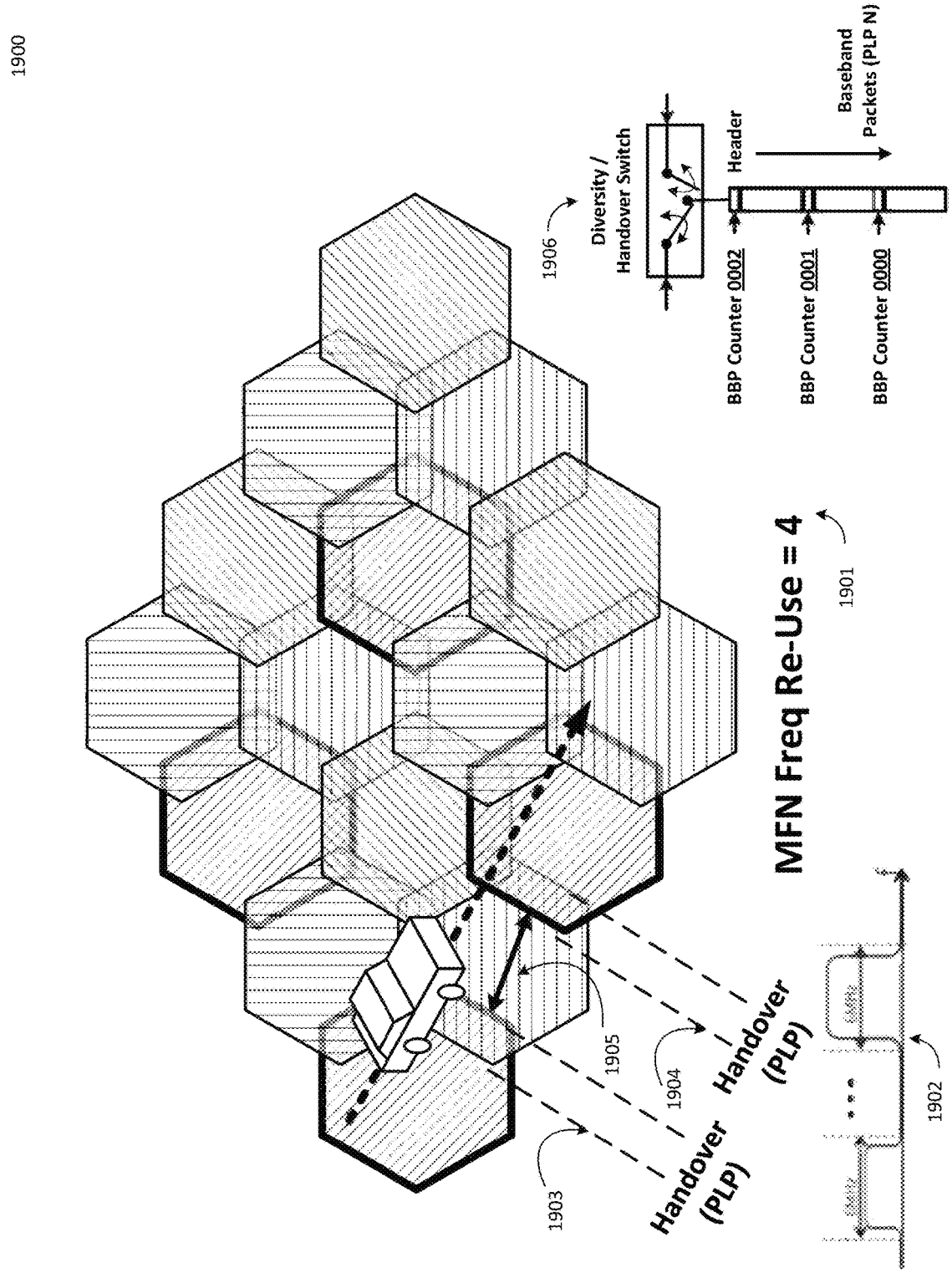
FIG. 19 illustrates example multicast topology MFN cells frequency re-use=4, in accordance with some aspects.

FIG. 19 illustrates example multicast topology MFN cells with frequency re-use of 4, in accordance with some aspects. As shown in FIG. 19, a broadcast topology 1900 depicts a Multiple Frequency Network (MFN) 1901 arranged in groups of four cells. Accordingly, the topology shown in FIG. 19 can be referenced as a frequency Re-use=4. In FIG. 19, RF fading is shown as 1902 that can occur while a mobile UE automobile is moving on a trajectory that passes into an overlapping coverage area, as shown by 1903. The overlapping coverage area 1903 is an opportunity for diversity and/or handover, as previously explained using FIG. 14 and FIG. 18. Similarly, the MAC Layer diversity/handover switch logic, shown in FIG. 19 as 1905, can operate as discussed and can cause seamless handover as UE trajectory enters deeper into an adjacent cell.

In some aspects, as the UE enters the central area of a cell, just a single but stronger RF carrier can be available. Then later, as the UE trajectory enters another overlapping coverage area 1904, handover can occur. In some cases, (UE) receiver antenna diversity using Maximum Ratio Combining (MRC) can be used as discussed using FIG. 15. The MRC can be applicable for the use cases discussed herein using FIG. 18 and FIG. 19.

Further, referring back to FIG. 15, the UE antenna diversity using MRC as shown in 1509 can be used independently on a single PLP. Accordingly, whenever a mobile UE moves into the center of the cell and when only one RF carrier is detected, the UE dynamically switches from a configuration shown as 1508 to the MRC configuration shown as 1509. The UE dynamically transitions back to the configuration shown as 1508 when another RF carrier frequency is detected along the MFN trajectory. Dynamic switching between the configurations of 1508 and 1509 is available for each UE depending on the RF propagation environment. By re-using similar UE receiver blocks of the configurations shown in 1508, 1509, re-configuration of the UE to have optimized multicast/broadcast reception can be achieved at low cost.

Broadcast diversity in several forms is used for broadcast multicast mobile reception QoS. Because of the diverse physics nature of one-way broadcast and absence of a return channel, and availability of several automatic repeat request (ARQ) mechanisms at several protocol layers, the broadcast diversity as described herein can be used to correct errors in transmission similar to unicast 4G/5G systems.

Next, broadcast transmitter diversity is discussed, according to some aspects. Broadcast transmitter diversity uses several synchronized broadcast transmitters with coherent symbols that add constructively (gain) at a UE when received in overlapping signal areas of several coherent transmitters. This coherent broadcast diversity transmission is termed a Single Frequency Network (SFN). The combination of diversity will also improve spectral efficiency, economics in intelligent broadcast networks.

According to some aspects, all SFN broadcast transmitters operate on the same frequency in either a metropolitan area network (MAN) or wide area network (WAN) geographic topology and have frequency re-use=1. These SFN overlay networks are harmonized with MFN functionality as part of an O-RAN-aligned Intelligent Broadcast RANs as described herein.

Figure 20:
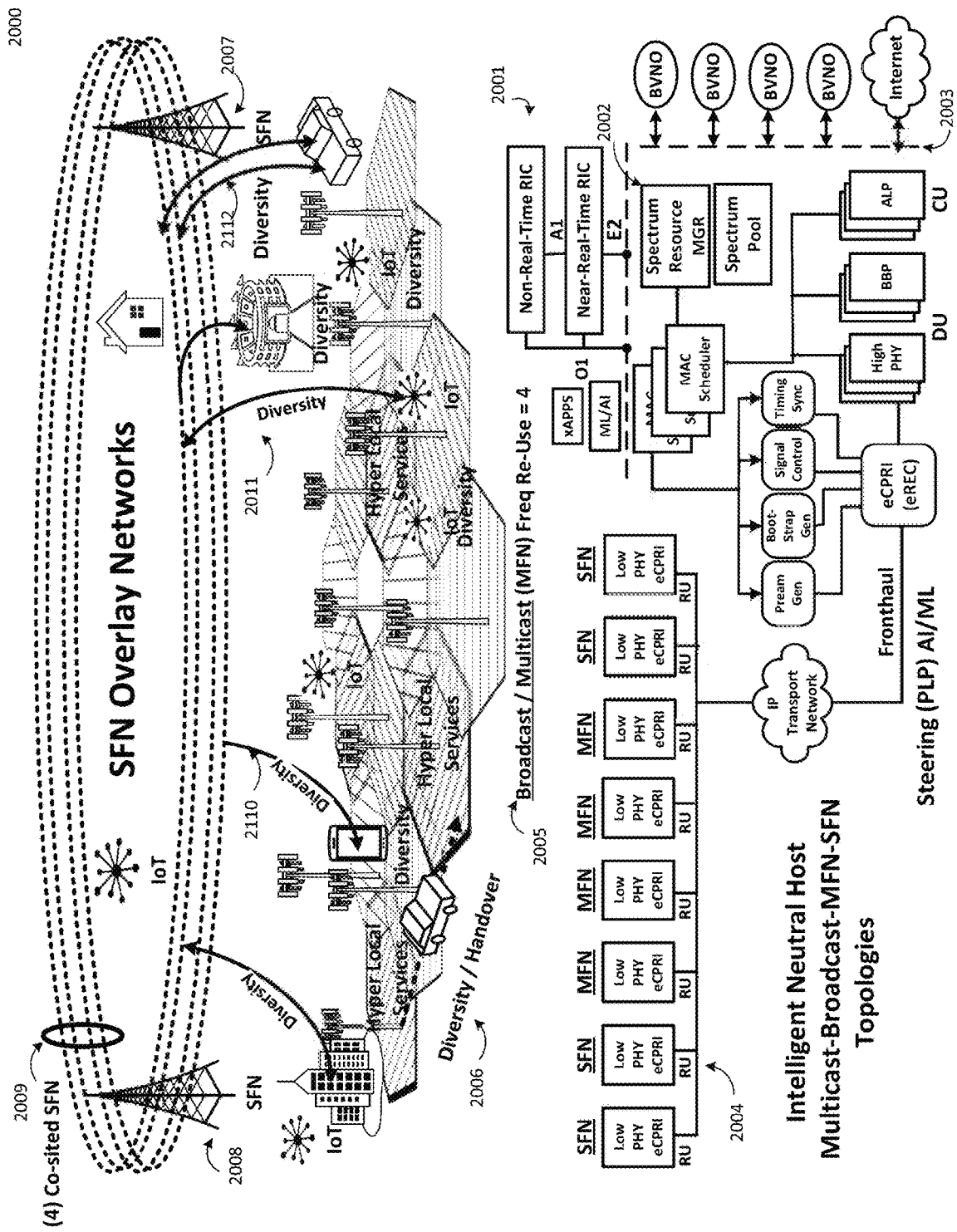
FIG. 20 illustrates example harmonized intelligent Broadcast RAN MFN-SFN topologies and handover and or steering PLPs or network Slices align O-RAN architecture, in accordance with some aspects.

FIG. 20 illustrates example harmonized intelligent Broadcast RAN MFN-SFN topologies and handover and or steering PLPs or network Slices align O-RAN architecture, in accordance with some aspects. In FIG. 20 through FIG. 22, steering of PLPs or network Slicing between topologies of an aligned O-RAN is described.

In accordance with some aspects, as shown in FIG. 20, a Non-Real-Time RAN Intelligent Controller (RIC) 2001 can be interfaced via A1 to Near Real-Time RAN Intelligent Controller (RIC), which can be and interfaced via E2 to the real-time broadcast MAC Schedulers and Spectrum Resource Manager (SRM) 2002. By way of a non-limiting example, the real-time broadcast MAC schedulers and the SRM can be disaggregated in the RAN 7.3 split as discussed herein using FIG. 7.

In accordance with some aspects, interface 2003 connects BVNOs and Internet to the real-time broadcast MAC Schedulers and Spectrum Resource Manager (SRM) 2002. The Non-Real-Time RAN Intelligent Controller (RIC), the Near-Real-Time RIC 2001, and the real-time broadcast MAC Schedulers and Spectrum Resource Manager (SRM) 2002 are located in the Regional/Edge data center. The real-time broadcast MAC Schedulers and Spectrum Resource Manager (SRM) 2002 interfaces several RUs 2004 located in various RAN topologies via IP transport network and (eC-PRI) Fronthaul shown.

By way of a non-limiting example, a topology described in FIG. 20 includes MFN frequency re-use=4, as previously discussed, and map to four RUs labeled MFN, and four RUs labeled SFN of the RUs shown in FIG. 20 as 2004. An example of the MFN handover PLP, as previously discussed using FIG. 18 and FIG. 19, is shown as 2006.

By way of a non-limiting example, SFN transmitter sites 2007, 2008 both have co-located four SFN carriers. Accordingly, the topology shown in FIG. 20 forms four independent coherent, intelligent SFN overlay networks 2009, which can be of various geographic size areas as discussed below using FIG. 21.

In accordance with some aspects, as shown in FIG. 20, intelligent Steering PLP from an MFN topology 2010 to SFN topology and the SFN topology to the MFN topology 2011 can be achieved using the intelligence of Broadcast RAN.

In some aspects, RAN intelligence can detect a PLP service or Slice simultaneously. Therefore, PLP traffic, which does not require handover, etc., can be steered or moved from the MFN to the SFN overlay network. Another use case is when a large file transfer, i.e., firmware update, etc., is to be distributed to many UEs over a large geographic area, the PLP traffic can be steered or moved to use one or more SFN overlay networks, which is more economical and spectrum efficient. Also, popular video content and or real-time events, such as sports events, etc., can be distributed using the harmonized SFN broadcast overlay networks.

Each individual PLP or network slice steering function is performed by the one or more real-time MAC Schedulers under control of an SRM and BMX Orchestration as discussed in FIG. 22 as 2203.

FIG. 21 illustrates another example of intelligent broadcast RAN with both MFN and several SFN geographic overlay network topologies and functions of handover and steering PLPs or network Slices align O-RAN architecture, in accordance with some aspects. As shown in FIG. 21, 2100 depicts an example of intelligent broadcast RAN with MFN and several SFN geographic overlay topologies and handover and steering PLPs or network slices, including MRC receiver diversity and dynamic UE re-configuration for diversity gain of the mobile UE as discussed using FIG. 15.

In accordance with some aspects, Non-real-time RIC and Near-real-time RIC broadcast 2101 can be controlled via MAC Schedulers and Spectrum Resource Manager (SRM) 2102. Further, as described earlier, the MAC schedulers and SRM can be disaggregated in RAN 7.3 split. As discussed earlier, the RAN has CU, and DU aligned O-RAN concepts as previously discussed.

In accordance with some aspects, MAC schedulers and SRM 2102 represents part of a neutral host network with multi-carrier broadcast processing using MAC Schedulers, CU, and/or DU. An eCPRI fronthaul interface 2103 connects 2102 to the multiple RF carriers RU 2104. By way of a non-limiting example, as shown in FIG. 21, four RUs in 2104 can be of MFN topology re-use=4 and can perform handover 2106. By way of a non-limiting example, the four RUs can be used among two separate SFN overlay topologies shown as 2105*a*, 2105*b* using transmitters 2107, 2108.

In accordance with some aspects, by way of a non-limiting example, all SFN sites and can have multi-carrier SFN capability RU and transmit antennas co-located.

Some PLPs or network slices such as 2111 IoT and fixed services 2112 can be steered on larger SFN overlay networks, while some PLPs 2113, 2114 can be Steered on the smaller size SFN network overlay for mobile UE. The MRC receiver diversity and dynamic UE re-configuration for diversity gain of mobile UE can also be achieved using the topology shown in FIG. 21.

In accordance with some aspects, topology 2100 offers the flexibility of the broadcast frame 600 on each RF carrier to have up to 64 PLP services. Each service in a PLP can be assigned a unique multicast IP address and port numbers. Moreover, a PLP can support a single high-quality audio-video program service, and another PLP can support numerous live IP radio stream services and/or podcasts broadcast, with uniquely assigned multicast IP address and port numbers.

Figure 25:
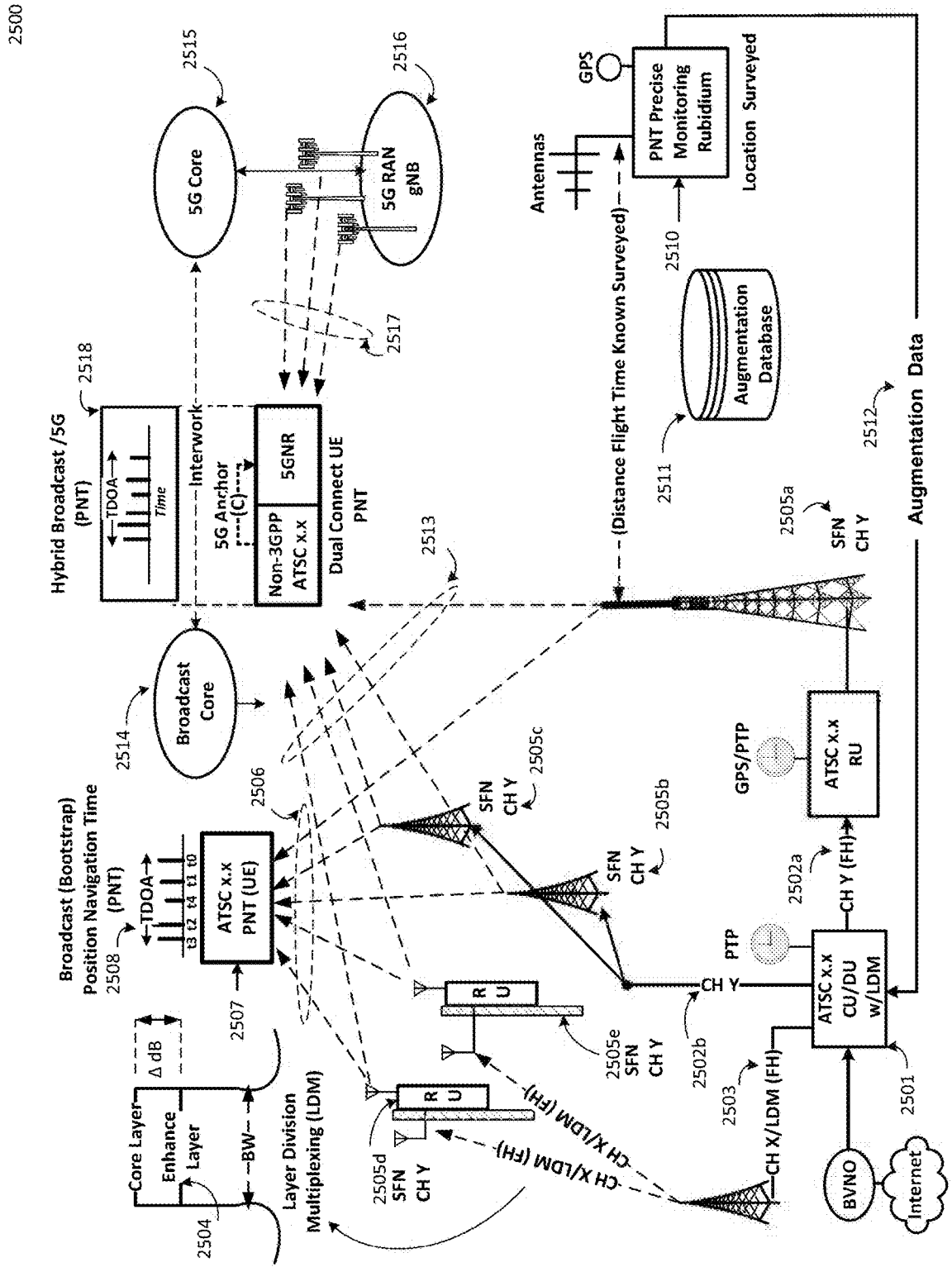
FIG. 25 illustrates a neutral host network with LDM for wireless Fronthaul and using broadcast for Positioning Navigation Time (PNT) aligned O-RAN, in accordance with some aspects.

Data available from UE representing signal conditions and UE location, as discussed in FIG. 25, can be used to analyze the broadcast RAN intelligence using AI/ML. Further, data gathered from both network and UE available with ML/AI and xAPPS to program the desired RAN behavior and functionality for spectrum efficiency, and economics is discussed in FIG. 22.

A specific broadcast network topology design is not to be assumed by limited examples presented herein to introduce the technology. Those skilled in the art will appreciate the utility and opportunity given a broadcast intelligent RAN in the future, including converged with 5G. An example of cooperative broadcast 5G convergence is discussed below using FIG. 23.

FIG. 22 illustrates broadcast programmable RIC with (ML/AI) and open interfaces and xAPPs, including broadcast spectrum sharing with BVNO and Orchestration of Broadcast Market Exchange (BMX) for business models using Neutral Host network, in accordance with some aspects. FIG. 22 illustrates the broadcast RAN cloud having regional/edge data center 2202 with interfaces A1, E2, and O1 to disaggregate the broadcast RAN. The RAN Intelligent Controllers (RICs) 2201 and 2203 enable a programmable broadcast platform through an open API. In accordance with some aspects, broadcast spectrum and RAN sharing for BVNOs 2213 using Broadcast Market Exchange (BMX) orchestration 2212 for PLP's or broadcast Slices and corresponding use cases are described below.

In accordance with some aspects, Service Management and Orchestration (SMO) 2201 includes the Non-Real-Time RIC function, which has a goal of RAN optimization in non-real-time (i.e., greater than one second) and provides policy-based guidance coordinated with the BMX Orchestration 2212 via an interface 2205 to Near Real-time RIC 2203 via A1 interface 2218.

In accordance with some aspects, system data is collected from disaggregated broadcast physical layer 2204 via O1 interface 2219 for AI/ML training in the SMO 2201. The SMO 2201 also manages O-Cloud 2202 for cloud computing, networking, storage hardware supporting the Network Function Virtualization Infrastructure (NFVI) via an O2 interface 2220. The regional/edge data center 2202 has the cloud-native virtual network functions in blocks identified in FIG. 22 as 2203 and 2204.

As shown in FIG. 22, the block 2203, data is collected via an E2 interface 2221 for AI/ML training and xAPPs, which operate in near real-time (e.g., 10 ms-1000 ms) to control the behavior of block 2204. This intelligent behavior can also include steering of PLP traffic for various use cases discussed using FIG. 21.

In accordance with some aspects, Real-time control 2217 of MAC Schedulers in the block 2204 can be disaggregated in a broadcast RAN as CU 2205, DU 2206, and RU 2208 under control of Spectrum Resource Manager 2216. The BMX Orchestration 2212 can provide authentication and authorization to manage the shared access of content data among BVNOs and Internet data sources 2213 in the broadcast core. The data source 2214 processes send IP data content for a PLP or Slice into the ALP in the block 2204 and CU 2205 as previously discussed using FIG. 7.

Block 2203 includes a RAN Topology Database DB, which includes and/or maps all topologies and configuration of all RUs in all topologies, for example, 2209, 2210, 2211, as previously discussed. An eCPRI fronthaul interface 2207 connects a DU 2206 to a RU of broadcast multicast/SFN topologies 2209, 2210, 2211, as shown in FIG. 22.

In accordance with some aspects, SMO 2201 and the BMX orchestration use automation with closed-loop feedback AI/ML to bring intelligence to the RAN. By way of a non-limiting example, the Open Network Automation Platform (ONAP) from Linux Foundation can be selected for the SMO 2201 by 5G O-RAN Software Community project.

The topology shown in FIG. 22 as 2200 is aligned with 5G, and O-RAN and its non-RT, near RT RICs and with its open interfaces such as O1, A1, E2, and AI/ML (xAPPS) can be used to optimize the 5G RAN performance.

Moreover, 5G Open-RAN and AI/ML with automation have become core-requirements for 5G telco operators given the promise of additional revenues from 5G tied to Network Slicing and SLA driven services in the future, including vertical industries.

Figure 23:
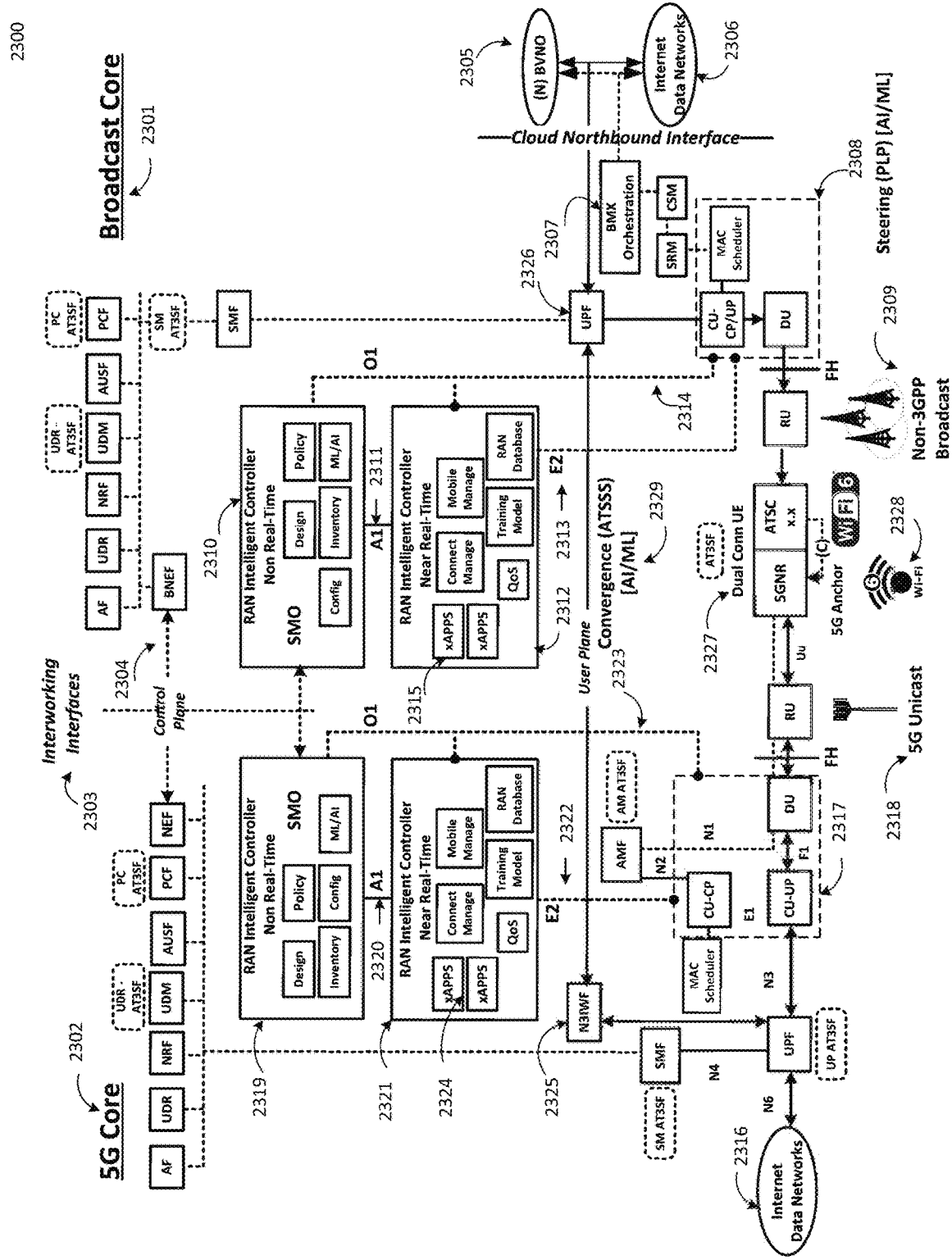
FIG. 23 illustrates Broadcast 5G convergence with ATSC 3.0 aligned as Non-3GPP access network with BVNO and shared Neutral Host platform and Intelligent RANs, in accordance with some aspects.

Convergence 5G and ATSC based broadcast aligned as Non-3GPP access network is discussed using FIG. 2300. The synergy of cooperative convergence shown in FIG. 23 is that SLA drives to enable mutually beneficial business models discussed herein. The ATSC 3.0 technology disclosed herein and FCC broadcast Internet opportunity support such 5G convergence.

FIG. 23 illustrates Broadcast 5G convergence with ATSC 3.0 aligned as Non-3GPP access network with BVNO and shared Neutral Host platform and Intelligent RANs, in accordance with some aspects. As shown in FIG. 23, 2300 illustrates an example of the convergence of 5G and ATSC based broadcast network aligned as Non-3GPP access network as defined in 3GPP.

In FIG. 23, an interworking interface 2303 between a broadcast core network 2301 and a 5G core network 2302, including a control plane 2304 and an SMO 2310 in a broadcast RAN, and an SMO 2319 for 5G and RAN interworking are shown.

A BMX orchestration 2307 and shared broadcast spectrum of Neutral Host platform with BVNOs 2305 and Internet data sources 2306, according to some aspects, are also shown in FIG. 23. The BMX orchestration 2307 performs authorization and authentication function in the broadcast core 2301 using broadcast cloud northbound interface, as shown in FIG. 23.

In accordance with some aspects, a broadcast near real-time RIC 2312, which is given AI/ML support and Policy guidance by the SMO 2310 over an A1 interface 2311. A RAN intelligent controller 2312 accesses disaggregated physical layer and MAC scheduler shown as 2308 in the broadcast core 2301 via an E2 interfaces 2313 under real-time control of a spectrum resource manager 2216.

An O1 interface 2314 is used to gather data from the disaggregated physical layer and MAC scheduler 2308 for AI/ML of the RAN intelligent controllers 2310 and 2312, and xAPPS 2315, which via the disaggregated physical layer and MAC scheduler 2308 then interfaces via fronthaul to RU of broadcast RAN topology 2309, according to some aspects.

As shown in FIG. 23, a 5G near real-time RIC 2321, which is given AI/ML support and Policy guidance by an SMO 2319 over an A1 interface 2320 to RAN intelligent controller 2321. A RAN intelligent network controller 2321 accesses 5G disaggregated physical layer 2317 via an E2 interface 2322 v. The 5G disaggregated physical layer 2317 access RU in 5G Unicast RAN topology 2318 via fronthaul as shown in FIG. 23.

In accordance with some aspects, RAN Intelligent network controllers 2319 and 2321 receive data via an O1 interface 2323 for AI/ML support and xAPPS 2324 via the O1 interface 2323 of the disaggregated 5G physical layer 2317. The E2 interface 2322 also makes data for AI/ML training to the RAN Intelligent network controller 2321 from the disaggregated 5G physical layer 2317.

In accordance with some aspects, N3IWF entity 2325 provides 5G user plane traffic to and from Internet data networks 2316 and interworking with UPF entity broadcast user plane 2326 and convergence IP layer 2329. A Dual Connected UE, which serves as a 5G anchor, has both SGNR UE and ATSC based UE extended for mobile. Such dual connected UE provides convergence 2328 of time aligned physical layers. The SGNR and ATSC are described in detail in patents and patent applications incorporated herein by reference in their entirety.

As shown in FIG. 23, the diverse nature of the radiophysics between separately optimized 5G unicast and broadcast when cooperatively converged, benefits such as real synergy, spectral efficiency, economic savings, and business models of future can be realized.

FIG. 24 illustrates intelligent broadcast topology for Hyper-Local Multicast service using three RU and three sectorized antennas in targeted MFN Cell Clusters, in accordance with some aspects. As shown in FIG. 24, 2400 illustrates intelligent broadcast topology 1 using three RU 2411 for Hyper-Local Multicast service 2411, which is shown as three sectorized antennas 2412 in targeted MFN cell clusters shown in FIG. 21.

In accordance with some aspects, a broadcast near real-time RIC interfaces 2413 includes an E2 interface and an O1 interface discussed earlier. Further, a disaggregated broadcast RAN 2401 that includes real-time control using a MAC scheduler 2406 via an SRM, CU 2404, and DU 2405 are shown. Multiplexing the data content from IP transport network 2409 to three RUs 2410 corresponding to three sectors of the sectorized antennas 2412 occurs at eCPRI 2407 over fronthaul 2408.

In accordance with some aspects, with data available from UE for AL/ML, such as in the UPF entity broadcast user plane 2326 and including UE location as shown in FIG. 25 opens the possibility of multicast broadcast traffic in geo-targeted areas within known sectors of the sectorized antennas 2412 of the broadcast intelligent RAN 2401 with content data from BVNOs 2402 and Internet 2403 discussed using FIG. 25.

FIG. 25 illustrates a neutral host network with LDM for wireless Fronthaul and using broadcast for Positioning Navigation Time (PNT) aligned O-RAN, in accordance with some aspects. As shown in FIG. 25, 2500 illustrates a neutral host network using Layer Division Multiplex (LDM) for wireless Fronthaul. The neutral host network uses aligned O-RAN concepts for broadcast using Positioning Navigation Time (PNT) as defined in the patents and patent applications incorporated herein by reference in their entirety.

In accordance with some aspects, a broadcast disaggregated physical layer 2501 uses LDM, as shown using FIG. 4. Wireless fronthaul on channel X for channel Y by using enhancement layer (LDM) 2504 in power domain as shown. Note that the core layer LDM 2504 also has the content data for channel X not shown in FIG. 25.

The block 2501 has fronthaul to a RU 2502 for carrier Y transmitter site 2505*a* in SFN topology. The block 2501 has fronthaul to RU at SFN transmitter sites 2505*b*, 2505*c* on Channel Y. The wireless fronthaul is used for RU at SFN transmitter sites 2505*d*, 2505*e* on Channel Y as shown.

In accordance with some aspects, an ATSC based UE 2507 is capable of using Positioning Navigation Timing (PNT) prepended bootstrap symbols inserted before normal bootstrap symbols, as shown in FIG. 6. The ATSC based UE 2507 can measure Time Difference of Arrival (TDOA) 2508 of individual CH Y ATSC based SFN transmitter signals 2506.

All details of broadcast PNT, including PNT precise monitoring 2510, augmentation database 2511, and augmentation data 2512 are disclosed in patents and patent applications incorporated herein by reference. It should be appreciated that the ATSC based UE 2507 accurately determines the location (geographic position) and sends the determined UE location data to Intelligent Broadcast RAN shown in FIG. 24. Thereby, it can enable geo-targeted services discussed using FIG. 24.

Moreover, a Dual Connected UE 2518 like shown in 23 can support broadcast 5G convergence with broadcast core 2514 and 5G core 2515. The UE 2518 is performing hybrid PNT using signals 2513 and 2517 to measure TDOA, according to some aspects.

Those skilled in the art should appreciate new degrees of freedom and benefits of using LDM 2504 for wireless fronthaul.

Figure 26:
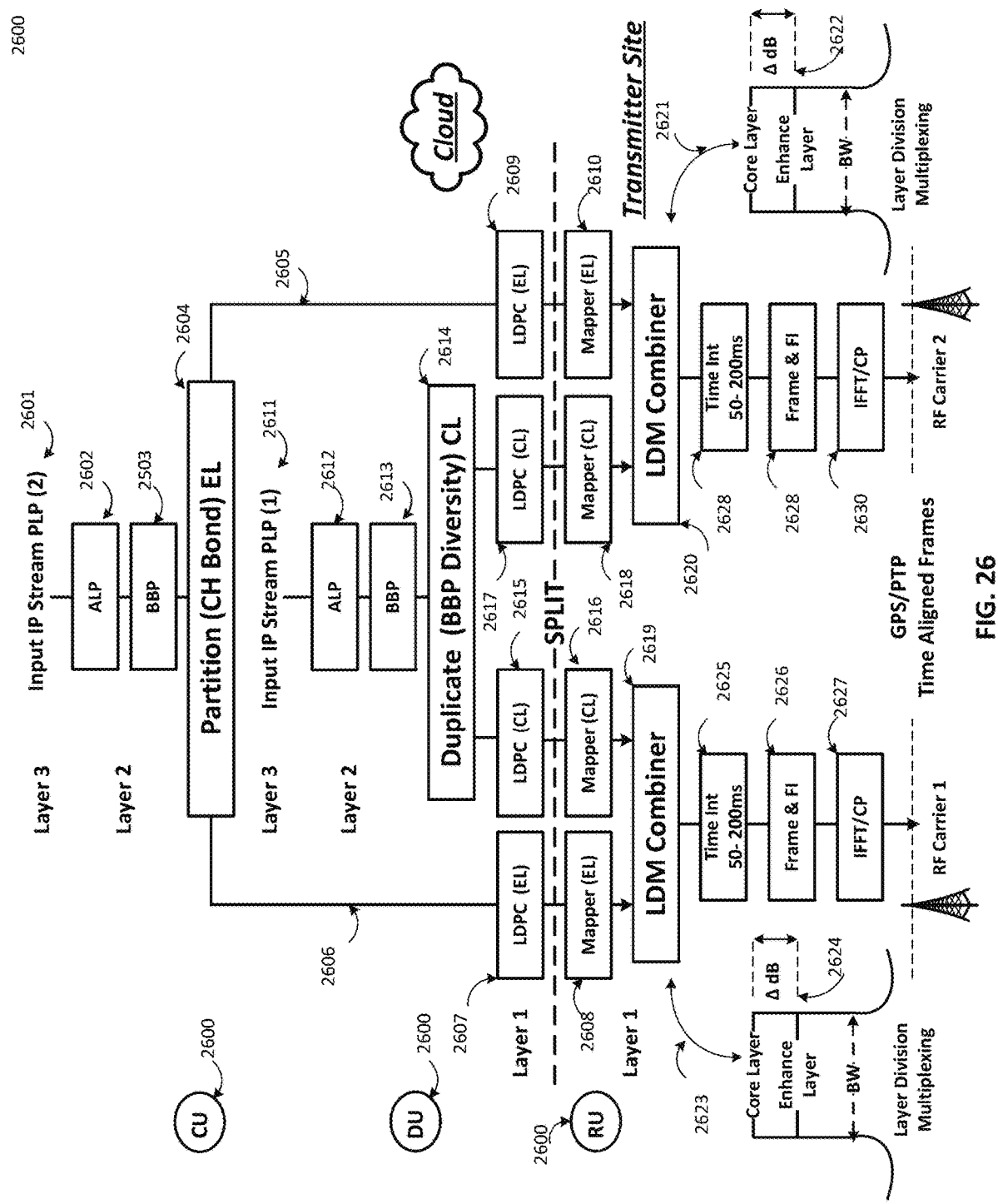
FIG. 26 illustrates combining plain channel bonding, BBP diversity and layer division multiple (LDM) transmitter side, in accordance with some aspects.

FIG. 26 illustrates combining plain channel bonding, BBP diversity, and layer division multiplexing (LDM) on a transmitter side for increased diversity, performance, and use cases using programmable ATSC 3.0 neutral host network as shown in FIG. 22, which are described herein in accordance with some aspects. As shown in FIG. 26, 2600 represents a control unit (CU), a distributed unit (DU), and a remote unit (RU), each of which is discussed in the present disclosure.

In some aspects, an input IP stream PLP (1) 2611 is encapsulated in ALP packets 2612 and BBP packets and then duplicated 2614 as discussed herein with regards to FIG. 13. An input IP stream PLP (2) 2601 is encapsulated in ALP packets 2602 and BBP packets and then partitioned 2604 as discussed herein with regards to FIG. 11.

The two outputs of Duplicate 2614 is for the core layer (CL), which is generated using LDM multiplexing for a RF carrier 1 and a RF carrier 2 into by a LDM combiner 2619 and a LDM combiner 2620, respectively. The (CL) corresponding to the RF carrier 1 is LDPC encoded 2615 and uses a Mapper 2616. The (CL) corresponding to the RF carrier 2 is LDPC encoded 2617 and uses a Mapper 2618.

In accordance with some aspects, partition 2604 generates duplicate streams 2605 and 2606 for an enhancement layer (EL) into the LDM combiner 2620 for RF carrier 2 and 2606 for an enhancement layer (EL) into the LDM combiner 2619 RF carrier 2. The EL is LDPC encoded 2607 and uses the Mapper 2618 for RF carrier 1. The EL is LDPC encoded 2609 and uses the Mapper 2610 for RF carrier 2.

The EL 2624 at the LDM combiner 2619 is multiplexed in power domain at a lower power level than a core level (CL) 2623. The EL 2622 at the LDM combiner 2620 is multiplexed in power domain at a lower power level than a CL 2621.

The output of the LDM combiner 2619 is time interleaved 2625, Framed & PLP Frequency Interleaved 2626 and IFFT & Cyclic Prefix 2627 are added to generate an ATSC 3.0 frame for the RF carrier 1. The output of the LDM combiner 2620 is time interleaved 2628, Framed & PLP Frequency Interleaved 2628 and IFFT & Cyclic Prefix 2630 are added to generate an ATSC 3.0 frame for the RF carrier 2. The time aligned ATSC 3.0 frames for the shown antenna air interfaces reduce differential arrival time at the receiver and reduce receiver buffer requirements, etc.

Figure 27:
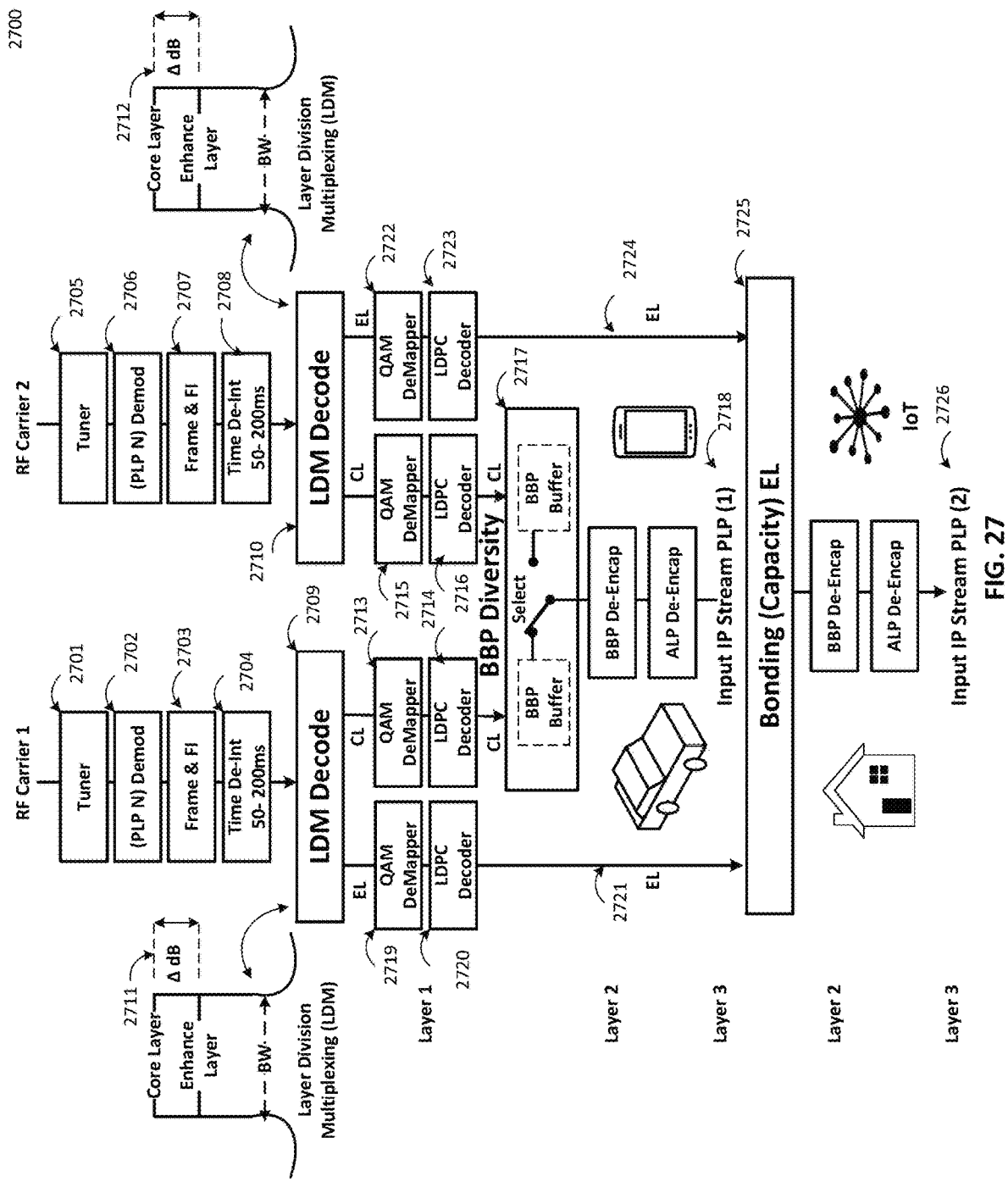
FIG. 27 illustrates combining plain channel bonding, BBP diversity and layer division multiple (LDM) receiver side, in accordance with some aspects.

FIG. 27 illustrates combining plain channel bonding, BBP diversity and layer division multiplexing (LDM) from a receiver side as 2700, in accordance with some aspects. The block diagram 2700 can result in increased diversity, performance and various use cases using programmable ATSC 3.0 neutral host network described herein using FIG. 22.

In some aspects, an output of a receiver tuner 2701 for RF carrier 1 is PLP demodulated 2702 from a received ATSC 3.0 frame and frequency de-interleaved 2703 and PLP time de-interleaved 2704. The signal with EL below CL 2711 is fed as an input to aLDM decoder 2709.

Similarly, an output of a receiver tuner 2705 for RF carrier 2 is PLP demodulated 2706 from a received ATSC 3.0 frame and frequency de-interleaved 2707 and PLP time de-interleaved 2708. The signal with EL below CL 2711 is fed as an input to a LDM decoder 2710.

In accordance with some aspects, in the LDM decoder 2709 both CL and EL are recovered. In the LDM decoder 2710 both CL and EL are recovered. Both CL are QAM De-mapped 2713, 2715 and LDPC frames decoded 2714, 2716 and the BBP CL corresponding to the RF carrier 1 and the RF carrier 2 enter buffers in BBP diversity switch 2717. As discussed earlier with reference to FIG. 14, a receiver logic based on channel conditions removes a BBP based on an incremented counter value from either of the BBP buffers corresponding to the RF carrier 1 and the RF carrier 2 in the BBP diversity switch 2717. This enables mitigating LDPC frame errors and improves mobile fading performance for use cases discussed earlier with reference to FIG. 14 for the recovered IP stream PLP 1 2718 corresponding to the original IP input stream PLP 1 2611.

Both ELs are QAM De-mapped 2719, 2722 and LDPC frames decoded 2720, 2723 and BBP EL 2721 corresponding to the RF carrier 1 and BBP EL 2724 corresponding to the RF carrier 2 are bonded at bonding for EL 2725, which can increase capacity as discussed earlier with reference to FIG. 12 based on incremented counter values in the bonding for the EL 2725. By way of a non-limiting example, the architecture shown in FIG. 27 can be used for use cases, which requires unique IP address port numbers assigned in PLP (2) 2726 based on the input IP stream PLP (2) 2601. By combining multiple ATSC 3.0 diversity modes as shown in FIG. 27 under programmable BMX automation discussed with reference to FIG. 22, spectrum resources, e.g., N channels in the BMX spectrum pool of an ATSC 3.0 neutral host network, can be shared for various use cases that are dynamically determined. Accordingly, a broadcast market exchange for various business models using shared broadcast can be enabled that increases the value of finite broadcast shared spectrum.

Figure 28:
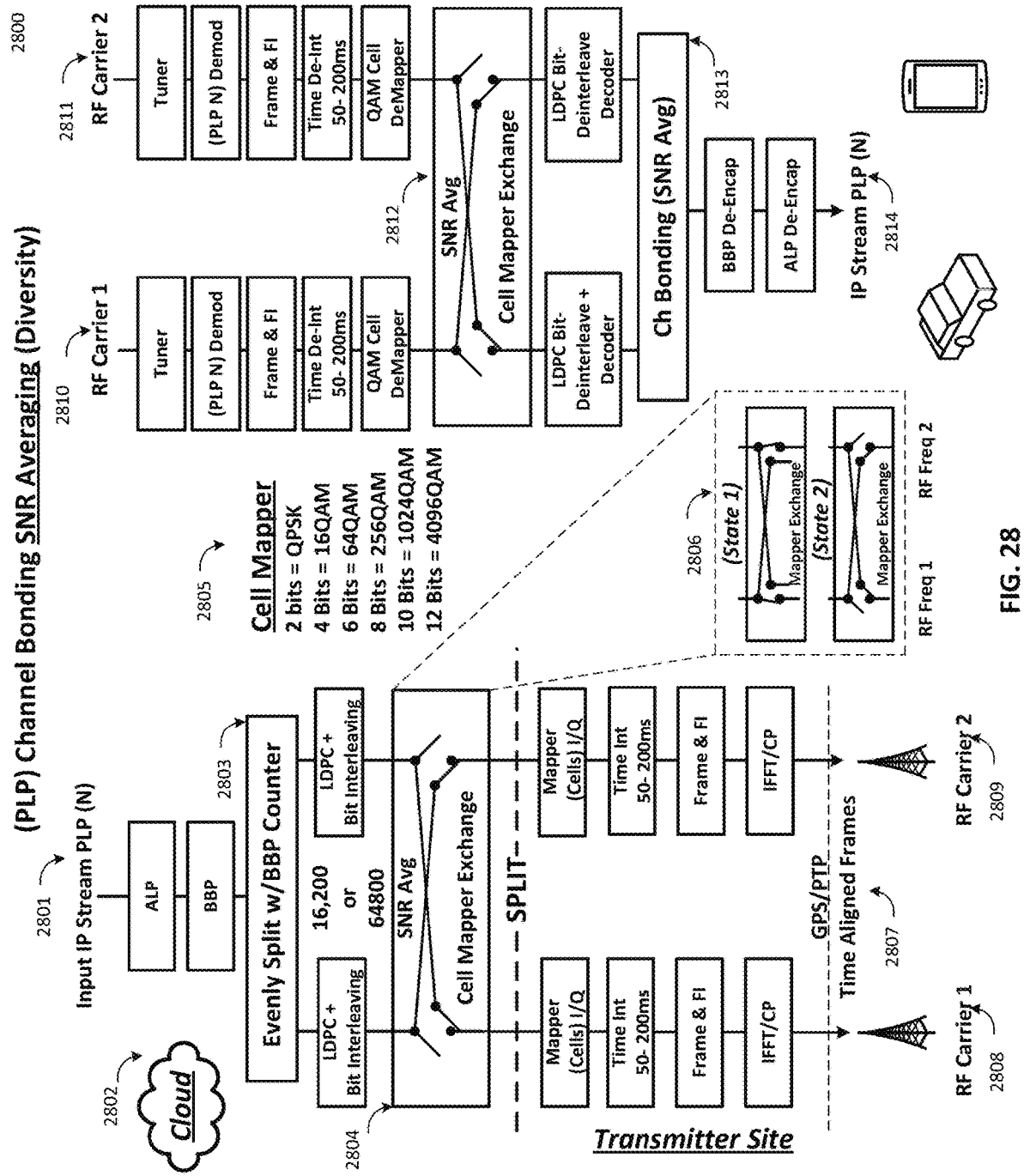
FIG. 28 illustrates an implementation of channel bonding using SNR averaging for diversity from a transmitter and a receiver side, in accordance with some aspects.

FIG. 28 illustrates an implementation of ATSC 3.0 channel bonding using signal to noise ratio (SNR) averaging for aligned RF carriers on both the transmitter and receiver sides, in accordance with some aspects. The basic idea of SNR averaging mode is described in the ATSC A/322 standard. A more flexible implementation of the SNR averaging mode is discussed using FIG. 28.

In accordance with some aspects, the idea SNR averaging diversity mode is to increase mobile robustness of a PLP 2801 by first splitting a BBP based on a counter in a header of the BBP as evenly 2803 between two RF channels 2808, 2809 on a transmitter side. Both RF channels having been configured with identical OFDM numerology, and both time aligned frames 2807 are transmitted over air interfaces using antennas 2808, 2809. A cell mapper exchange 2804 in cloud 2802, between two RF carriers, enables frequency diversity. When an inverse process happens on a receiver side, the frequency diversity introduced at the cell mapper exchange 2804 is used for mitigating mobile fading at the receiver, as discussed below.

In some aspects, BBP diversity 1800 is designed for use in smaller overlapping signal areas of an MFN 1800. The SNR averaging diversity mode as discussed using FIG. 28 can be used over wider areas with signal overlap for N channels as discussed using FIG. 20 and FIG. 21.

Comparing ATSC 3.0 implementation methods shown with reference to FIG. 2 and FIG. 4 in which the layers being split as shown in FIG. 4 is one exemplary preferred method with the cell mapper exchange 2804. The ATSC 3.0 implementation method showing using FIG. 2 uses a cell exchange block after the cell mapper in an exciter at the transmitter site as described in the ATSC 3.0 A/322 standard. This makes the exchange of cells between exciters shown in FIG. 2 comparatively difficult when the transmitter sites (exciters) are in different locations or in an SFN with multiple transmitter sites. The ATSC 3.0 implementation method shown here with reference to FIG. 28 does not have these constraints and is backward compatible on the ATSC 3.0 receiver side as it is independent of location for cell exchange block on the transmitter side. As a result, the ATSC 3.0 implementation method as described herein using FIG. 28 is a preferred method for channel bonding SNR averaging.

In some aspects, input IP packets PLP (N) 2801 are encapsulated ALP. Each BBP BBP has a counter. The BBP is evenly split as shown in FIG. 28 as 2803 and input to LDPC. By way of a non-limiting example, the LDPC 1000 may support 16,200 or 64,800 bits length of two RF channels for the RF carrier 1 2808 and RF carrier 2 2809. The cell mapper 2804 exchange outputs in cloud 2802 are sent to a mapper 2804 as input. The mapper 2804 is located at transmitter sites for the RF carrier 1 2808 and the RF carrier 2 2809 over eCPRI fronthaul after a split.

In some aspects, the cell mapper exchange has two possible states, as shown by 2806. These states alternate between each pair of cells output 2804. This forms the frequency diversity by distributing each LDPC frame evenly, for example, cell by cell, across two RF channels of the RF carrier 1 2808 and the RF carrier 2 2809. The frequency diversity created using the method described herein using FIG. 28 is useful to mitigate mobile fading channels at the receiver.

In some aspects, by way of a non-limiting example, a cell mapper 2805 for 16QAM has 4 bits per cell. For an LDPC frame 1000 having a frame length of 16,200 bits and 16QAM with 4 bits/cell, when selected by a scheduler shown using FIG. 22 can include 4050 cells per each LDPC of 16,200 bit block. With cell mapper exchange 2804, then transmits cells 2025 to a mapper for RF carrier 1 2808 and a mapper for the RF carrier 2 2809. This frequency diversity produced by even distribution of cells of an LDPC frame helps mitigate mobile fading channels at the receiver when the inverse operation is performed.

The two tuners 2810, 2811 on receiver demodulate PLP (N), de-interleave PLP time domain, de-map QAM constellation, and input to the cell mapper exchange 2812. This averages the SNR of the fading channels at each LDPC decoder and improves robustness in the mobile fading channel for the mobile use cases discussed herein. The BBPs are bonded using a BBP counter and sent to a BBP and ALP de-encapsulation, and an IP stream for PLP (N) 2814 is recovered. By using time aligned frames 2807, differential arrival time can be minimized, and required buffer memory at the receiver may be reduced.

Figure 29:
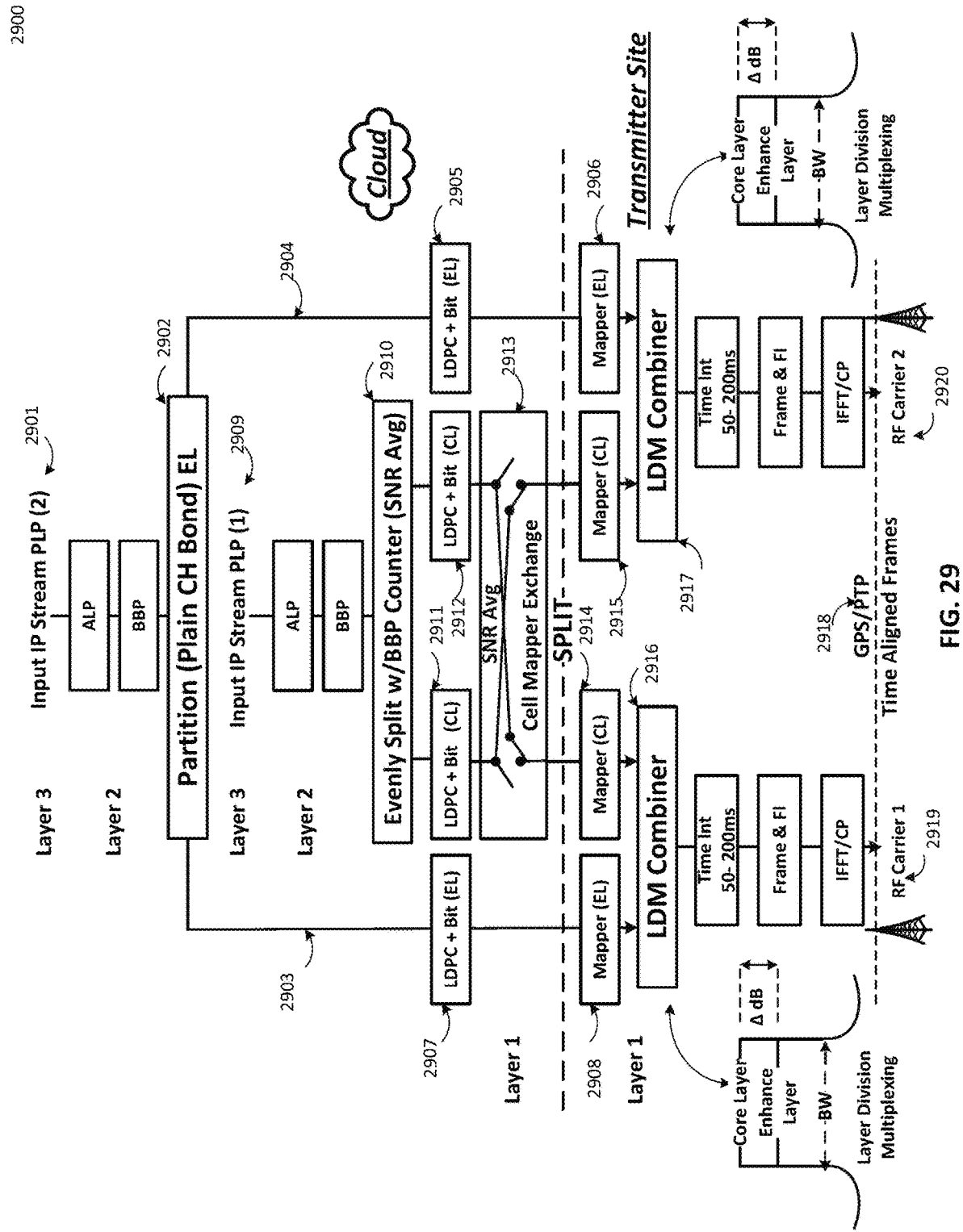
FIG. 29 illustrates combining plain channel bonding and channel bonding (SNR average) and layer division multiplex (LDM) transmitter side, in accordance with some aspects.
Figure 30:
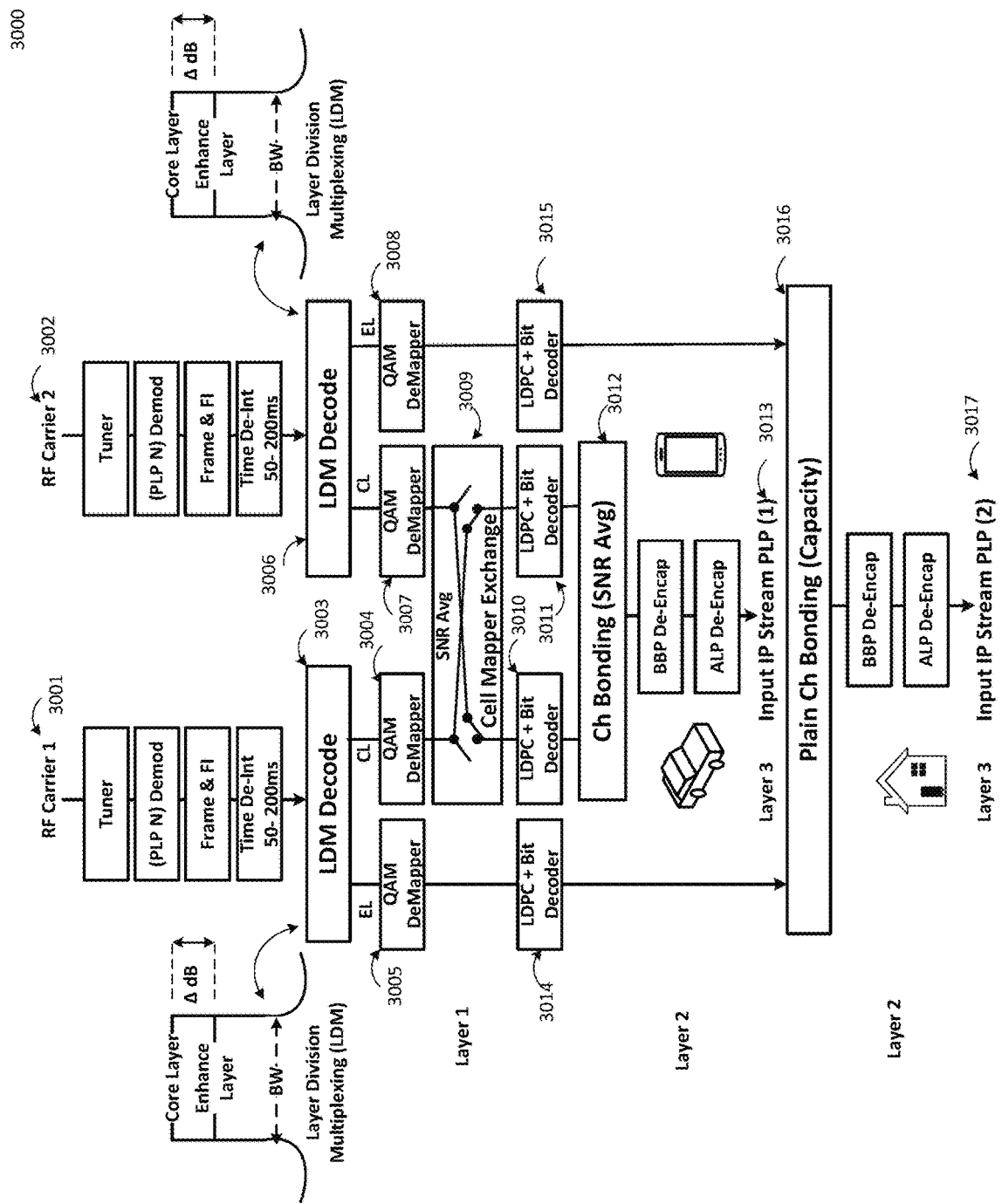
FIG. 30 illustrates combining plain channel bonding and channel bonding (SNR average) and layer division multiplex (LDM) receiver side, in accordance with some aspects.

FIG. 29 illustrates combining plain channel bonding and channel bonding using SNR averaging and layer division multiplexing (LDM) on a transmitter side for use cases discussed using FIG. 30 using a programmable ATSC 3.0 neutral host network described using FIG. 22, in accordance with some aspects.

In some aspects, an input IP stream PLP (1) 2909 is encapsulated in ALP packets and BBP packets and then evenly split at 2910 as discussed with reference to FIG. 28. an input IP stream PLP (2) 2901 is encapsulated in ALP packets and BBP packets and then partitioned at 2902 as discussed with reference to FIG. 26.

The two outputs of the evenly split 2910 are fed as an input to core layers (CLs) into a cell mapper exchange 2913 as discussed with reference to FIG. 28. The LDPC 2911, 2912, and mapper 2914, 2915 parameters are set by a scheduler shown in FIG. 22 identically and input to an LDM combiner 2916 and 2917. The two outputs of a Partition 2902 are the two enhancement layers (EL) 2903, 2904 for the LDPC 2907, 2905 and mapper 2908, 2906 shown with parameters for increased capacity, which are input to LDM combiners 2916, 2917. The stages after the outputs of the LDM combiners 2916, 2917 have identical OFDM numerology for RF carrier 1 2919 and RF carrier 2 2920, and frames are time aligned 2918 for the antenna air interfaces shown in FIG. 29. Accordingly, the differential arrival time of signals for the RF carrier 1 2919 and the RF carrier 2 2920 at a receiver shown in FIG. 30 can be reduced, and receiver buffer memory requirements, etc., can be reduced.

FIG. 30 illustrates combining plain channel bonding and channel bonding using SNR averaging and layer division multiplexing (LDM) on a receiver side using programmable ATSC 3.0 neutral host network shown in FIG. 22, in accordance with some aspects.

In some aspects, the receiver 3000 has a tuner and receiver chain for RF carrier 1 3001 and RF carrier 2 3002. These demodulate PLPs, time de-interleave, and then demultiplexed signals in LDM decoders 3003, 3006, and with the recovery of CL and EL as shown.

The CL outputs of 3003, 3006 are QAM demapped 3004, 3007 and fed as an input to cell mapper exchange 3009, causing frequency diversity and then LDPC decoder 3010, 3011 recover BBPs, which are then channel bonded based on SNR Average at 3012 as discussed with reference to FIG. 28 and an IP stream PLP 1 3013 is recovered for the mobile use cases shown with frequency diversity based on SNR averaging to mitigate fading as discussed with reference to FIG. 28.

In some aspects, the EL outputs of 3003, 3006 are QAM demapped 3005, 3008, and then LDPC decoder 3014, 3015 recovers BBP, which are then plain channel bonded (capacity) 3016 as discussed with reference to FIG. 27. In FIG. 30, a use case to recover the input Ip stream 2901 for increased capacity on bonded IP stream PLP 2 3017 is shown. In some aspects, by way of a non-limiting example, the PLP 1 3013 and PLP 2 3017 content data can be independent.

In some aspects, by way of a non-limiting example, the PLP 1 3013 content can also be related to PLP 2 3017, such as using scalable video coding with a low resolution of content for mobile and higher resolution of the same content recovered on fixed receivers using both PLP 1 and PLP2. The PLP on RF carriers 3001, 3002 can also be steered to use different portions of a broadcast band. For example, the UHF band can be used for mobile, and the VHF band can be used for fixed use cases, using the programmable ATSC 3.0 neutral host network shown in FIG. 22.

Figure 31:
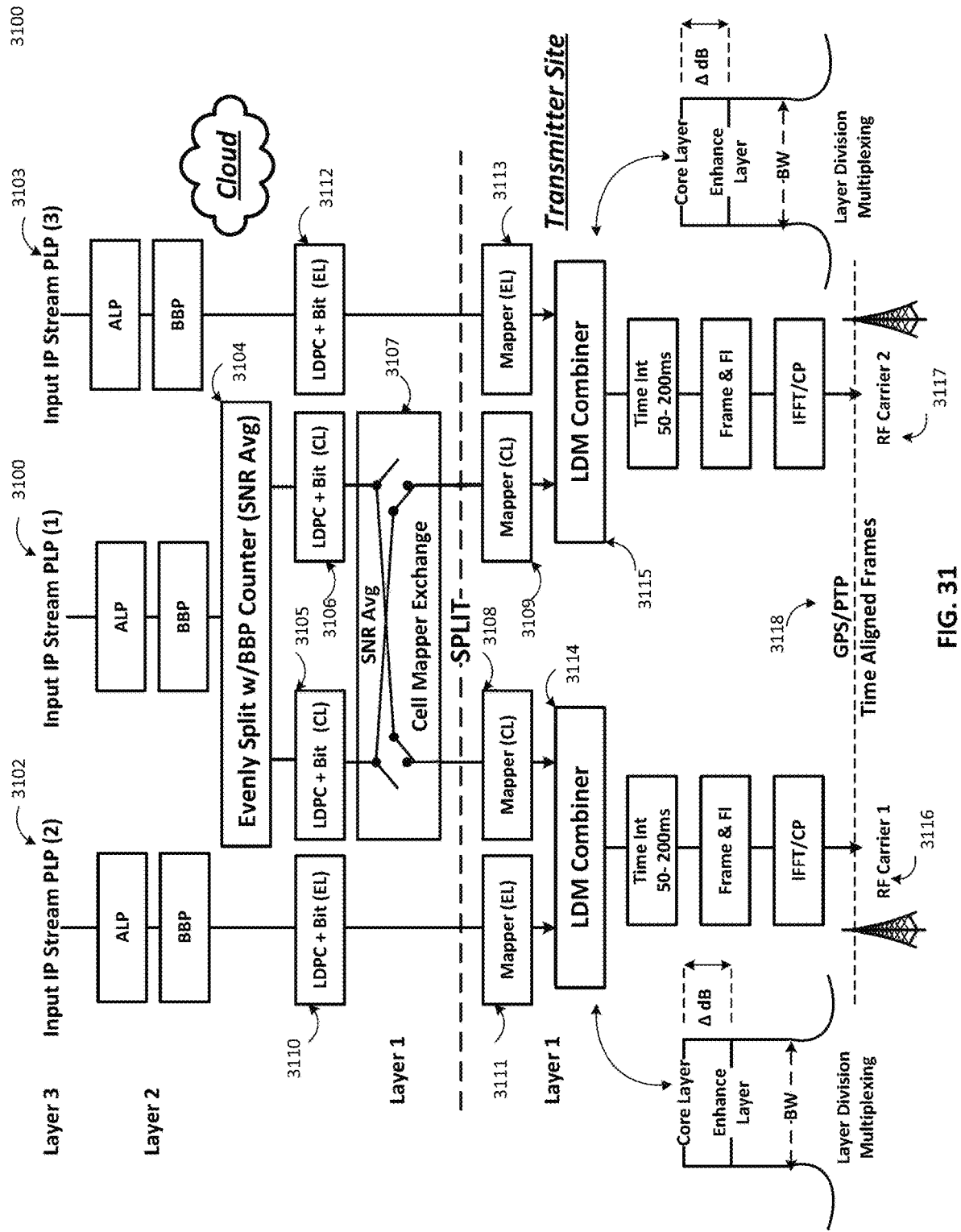
FIG. 31 illustrates combining channel bonding and layer division multiplex (LDM) transmitter side, in accordance with some aspects.
Figure 32:
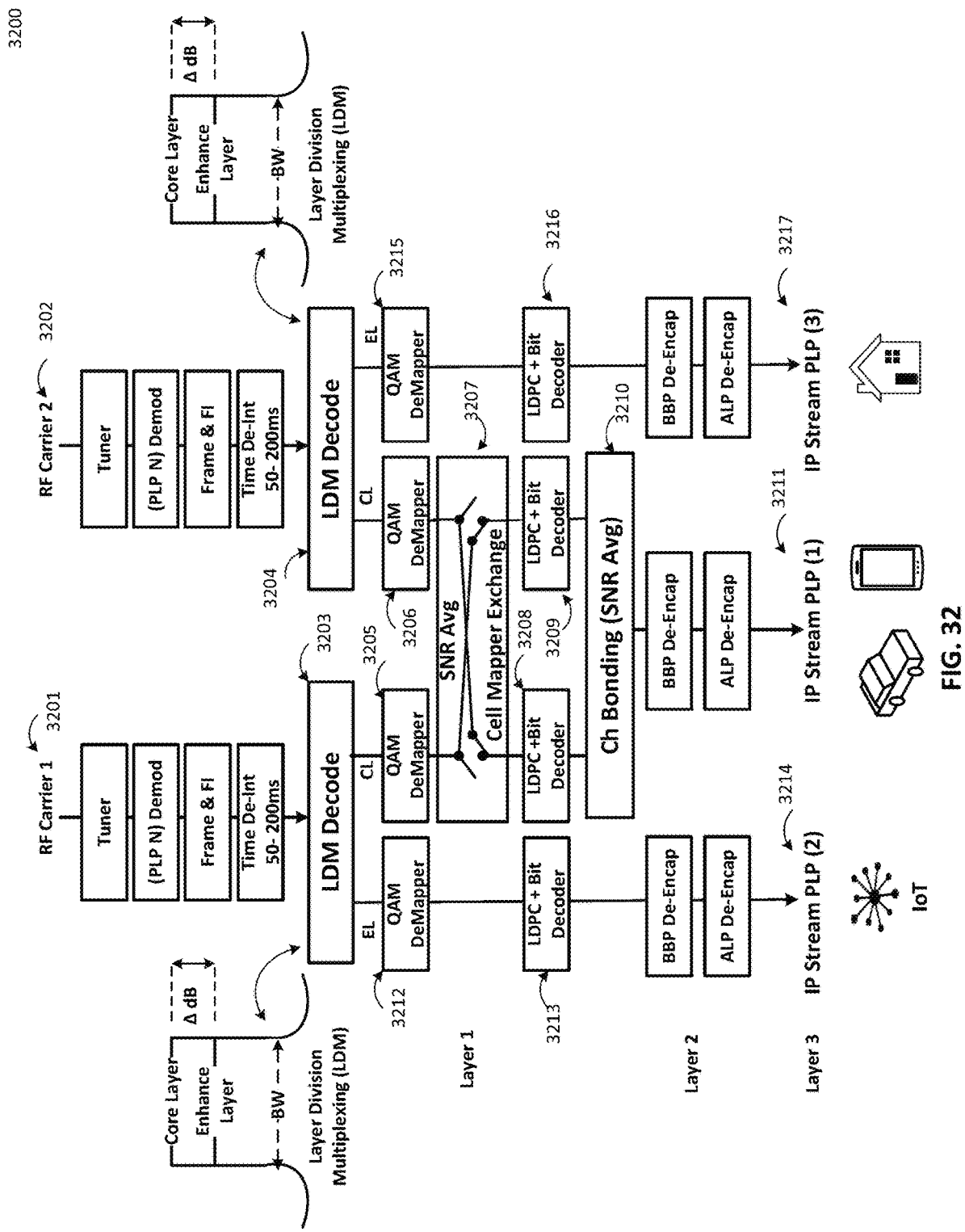
FIG. 32 illustrates combining channel bonding and layer division multiplex (LDM) receiver side, in accordance with some aspects.

FIG. 31 illustrates combining channel bonding (SNR average) and layer division multiplexing (LDM) at a transmitter side as 3100 for use cases shown with reference to FIG. 32 using a programmable ATSC 3.0 neutral host network shown in FIG. 22, in accordance with some aspects.

In some aspects, an input IP stream PLP 1 3100 is evenly split at 3104 for SNR averaging as discussed with reference to FIG. 28. The outputs of the evenly split 3104 are provided as an input to LDPC 3105, 3106, which then are provided as an input to a cell mapper exchange 3107, and outputs to mappers 3108, 3109 are used as core layer (CL) inputs to the LDM combiner 3114, 3115, as discussed with reference to FIG. 28. used for mobile use cases 3200.

An input IP stream PLP 2 3102 and an input IP stream PLP 3 3103 are intended for fixed use cases discussed below with reference to 3200. The LDPC 3110, 3112, and Mapper 3111, 3113 parameters are selected independently for each use case discussed using FIG. 32 and input as enhancement layer (EL) to the LDM combiner 3114, 3115. The RF carrier 1 3116 and RF carrier 2 3117 frames are time aligned 3118, and these signals are transmitted using the antenna interfaces.

FIG. 32 illustrates combining channel bonding (SNR average) and layer division multiplexing (LDM) at a receiver 3200 using a programmable ATSC 3.0 neutral host network discussed earlier with reference to FIG. 22, in accordance with some aspects.

In accordance with some aspects, receiver 3200 has a tuner and a receiver chain for RF carrier 1 3201 and RF carrier 2 3202. The signals are input to LDM decoder 3203, 3204 and the CL and EL are recovered. The CL is QAM demapped 3205, 3206 and provided as an input to cell mapper exchange 3207 to cause frequency diversity and LDPC frames are decoded 3208, 3209 and bonded using SNR averaging 3210 and an IP stream PLP 1 3211 is recovered for mobile use cases, as described herein.

The EL output 3203 is QAM demapped 3212, and an LDPC frame decoded 3217, and an IP stream PLP 2 3214 is recovered for a fixed use case, as described herein.

The EL output 3204 is QAM demapped 3215, and an LDPC frame decoded 3216, and an IP stream PLP 3 3217 is recovered for a fixed use case, as described herein using a programmable ATSC 3.0 neutral host network discussed earlier with reference to FIG. 22.

What is claimed is:

1. A method for broadcast spectrum sharing, the method comprising:
   receiving data from a plurality of data sources in a broadcast core network for transmission over a radio access network (RAN);
   assigning radio spectrum resources for transmitting the data over the RAN according to a policy guidance set by a plurality of network operators for sharing the radio spectrum resources;
   generating a baseband packet corresponding to the data at a distributed unit (DU) in the RAN;
   collecting transmission data from a plurality of user equipments (UEs) in the RAN for training a machine learning algorithm; and
   scheduling transmission of the baseband packet to a remote unit (RU) over a fronthaul in a radio topology of a plurality of radio topologies stored in a database under control of the machine learning algorithm according to the policy guidance,
   wherein the baseband packet is compatible for transmission in the plurality of radio technologies to optimize sharing of the radio spectrum resources of the plurality of radio topologies among the plurality of network operators.

2. The method of claim 1, wherein the scheduling transmission of the baseband packet further comprises selecting the radio topology according to a type of data content of the baseband packet.

3. The method of claim 2, further comprising selecting a single frequency network as the radio topology for the type of data content comprising one of video content and real-time event content.

4. The method of claim 1, further comprising steering radio traffic for a UE of the plurality of UEs from a first radio topology to a second radio topology based on comparison of a first measured radio signal strength of a first radio signal from a first radio frequency carrier in the first radio topology with a second measured radio signal strength of a second radio signal from a second radio frequency carrier in the second radio topology.

5. The method of claim 4, wherein the first radio topology is a Third Generation Partnership Project (3GPP) Fifth Generation (5G) network, and the second radio topology is an Advanced Television Systems Committee (ATSC) standard based network.

6. The method of claim 4, wherein the first radio topology and the second radio topology are multi-frequency networks.

7. The method of claim 1, further comprising communicating the policy guidance from a RAN interface controller using an open application programming interface.

8. A system, comprising:
   a plurality of distributed computing devices, each computing device of the plurality of distributed computing devices coupled with a memory configured to store instructions; and
   a plurality of transmitters in a radio access network (RAN),
   wherein the instructions, when executed by the system, cause the system to perform operations comprising:
      receiving, at a first computing device of the plurality of distributed computing devices, data from a plurality of data sources in a broadcast core network for transmission over the RAN,
      assigning, at the first computing device, radio spectrum resources for transmitting the data over the RAN according to a policy guidance set by a plurality of network operators for sharing the radio spectrum resources,
      generating, at a second computing device of the plurality of distributed computing devices, a baseband packet corresponding to the data,
      collecting, at a third computing device of the plurality of distributed computing devices, transmission data from a plurality of user equipments (UEs) in the RAN for training a machine learning algorithm, and
      scheduling, at a fourth computing device of the plurality of distributed computing devices, transmission of the baseband packet to a fifth computing device over a fronthaul in a radio topology of a plurality of radio topologies stored in a database under control of the machine learning algorithm according to the policy guidance,
      wherein the baseband packet is compatible for transmission in the plurality of radio technologies to optimize sharing of the radio spectrum resources of the plurality of radio topologies among the plurality of network operators.

9. The system of claim 8, wherein the first computing device comprises a broadcast media exchange (BMX) orchestration device.

10. The system of claim 8, wherein the second computing device comprises a distributed unit (DU) or a central unit (CU).

11. The system of claim 8, wherein for scheduling transmission of the baseband packet, the operations further comprise selecting the radio topology according to a type of data content of the baseband packet.

12. The system of claim 11, wherein the operations further comprise selecting a single frequency network as the radio topology for the type of data content comprising one of video content and real-time event content.

13. The system of claim 11, wherein the operations further comprise selecting a single frequency network as the radio topology for the type of data content comprising one of video content and real-time event content.

14. The system of claim 8, wherein the operations further comprise steering radio traffic for a UE of the plurality of UEs from a first radio topology to a second radio topology based on comparison of a first measured radio signal strength of a first radio signal from a first radio frequency carrier in the first radio topology with a second measured radio signal strength of a second radio signal from a second radio frequency carrier in the second radio topology.

15. The system of claim 14, wherein the first radio topology is a Third Generation Partnership Project (3GPP) Fifth Generation (5G) network, and the second radio topology is an Advanced Television Systems Committee (ATSC) standard based network.

16. The system of claim 14, wherein the first radio topology and the second radio topology are multi-frequency networks.

17. The system of claim 8, wherein the operations further comprise communicating the policy guidance from a RAN interface controller using an open application programming interface.

18. A method, comprising:
   distributing a plurality of baseband packets (BBPs) according to a predetermined order between a plurality of radio frequency (RF) carriers;
   selecting an RF carrier of the plurality of RF carriers based on a signal-to-noise ratio (SNR) average for the RF carrier; and transmitting a BBP of the plurality of BBPs over the RF carrier,
wherein the BBP is time aligned with another RF carrier of the plurality of RF carriers.

19. A method, comprising:
receiving a plurality of baseband packets (BBPs) over a plurality of RF carriers;
selecting a first BBP of the plurality of BBPs received over a first RF carrier of the plurality of RF carriers based on a first value of signal-to-noise ratio (SNR) of the first RF carrier, wherein the first value of SNR for the first RF carrier is better than a first value of SNR of a second RF carrier of the plurality of carriers;
selecting a second BBP of the plurality of BBPs received over the second RF carrier based on a second value of SNR of the second RF carrier, wherein the second value of SNR for the second RF carrier is better than a second value of SNR of the first RF carrier; and
generating a data stream based on the first BBP and the second BBP.

20. The method of claim 19, further comprising time aligning the first RF carrier with the second RF carrier.

\* \* \* \* \*